United States Patent
Cohen et al.

(10) Patent No.: US 10,745,279 B2
(45) Date of Patent: Aug. 18, 2020

(54) PRODUCTION OF PHOSPHATE COMPOUNDS FROM MATERIALS CONTAINING PHOSPHORUS AND AT LEAST ONE OF IRON AND ALUMINIUM

(71) Applicant: EASYMINING SWEDEN AB, Uppsala (SE)

(72) Inventors: Yariv Cohen, Uppsala (SE); Patrik Enfält, Uppsala (SE)

(73) Assignee: EASYMINING SWEDEN AB, Uppsala (SE)

( * ) Notice: Subject to any disclaimer, the term of this patent is extended or adjusted under 35 U.S.C. 154(b) by 25 days.

(21) Appl. No.: 16/017,839

(22) Filed: Jun. 25, 2018

(65) Prior Publication Data
US 2018/0297846 A1    Oct. 18, 2018

Related U.S. Application Data

(63) Continuation of application No. 14/888,232, filed as application No. PCT/SE2014/050545 on May 2, 2014, now Pat. No. 10,023,464.

(30) Foreign Application Priority Data

May 2, 2013  (SE) ...................................... 1350538

(51) Int. Cl.
*C01B 25/32*   (2006.01)
*C01B 25/28*   (2006.01)
(Continued)

(52) U.S. Cl.
CPC .............. *C01B 25/32* (2013.01); *C01B 25/28* (2013.01); *C01B 25/36* (2013.01); *C01B 25/375* (2013.01);
(Continued)

(58) Field of Classification Search
None
See application file for complete search history.

(56) References Cited

U.S. PATENT DOCUMENTS

| | | | |
|---|---|---|---|
| 3,310,374 A | 3/1967 | Posey, Jr. et al. |
| 3,375,068 A | 3/1968 | Frohlich et al. |
| 4,888,053 A | 12/1989 | Grayson et al. |

FOREIGN PATENT DOCUMENTS

| | | |
|---|---|---|
| CH | 697083 A5 | 4/2008 |
| CN | 1648076 A | 8/2005 |

(Continued)

OTHER PUBLICATIONS

Rückgewinnung von Pflanzennährstoffen, insbesondere Phosphor aus der Asche von Klärschlamm, Umwelt Forum, Abschlussvericht PASCH, 2010, RWTH Aachen University. See particularly, p. 97, lines 1-12 and Table 5.7 on p. 108, and PDF p. 30 for English Abstract.

(Continued)

*Primary Examiner* — Melissa S Swain
(74) *Attorney, Agent, or Firm* — Porter Wright Morris & Arthur LLP

(57) ABSTRACT

A method for production of phosphate compounds comprises dissolving of a raw material comprising phosphorus, aluminium and iron, in a mineral acid. Insoluble residues from the dissolving step are separated. Iron hydroxide is added causing precipitation of phosphate compounds. The precipitated phosphate compounds are removed. The phosphate compounds are dissolved by an alkaline solution. Iron hydroxide is filtered out. Lime is added, causing precipitation of calcium phosphate. The precipitated calcium phosphate is separated. The leach solution after the separating of precipitated calcium phosphate is recycled to be used for dissolving phosphate compounds by an alkaline solution.

6 Claims, 26 Drawing Sheets

(51) Int. Cl.
| | |
|---|---|
| C01B 25/36 | (2006.01) |
| C01B 25/37 | (2006.01) |
| C01G 49/02 | (2006.01) |
| C01G 49/10 | (2006.01) |
| C01G 49/14 | (2006.01) |
| C01F 7/34 | (2006.01) |
| C01F 7/56 | (2006.01) |
| C01F 7/74 | (2006.01) |
| C01G 45/02 | (2006.01) |
| C01G 49/00 | (2006.01) |
| C01G 1/12 | (2006.01) |
| C05B 11/12 | (2006.01) |
| C05B 11/16 | (2006.01) |
| C05F 7/00 | (2006.01) |
| C02F 11/00 | (2006.01) |
| C01F 11/46 | (2006.01) |
| C02F 1/66 | (2006.01) |
| C02F 101/10 | (2006.01) |

(52) U.S. Cl.
CPC ............... *C01F 7/34* (2013.01); *C01F 7/56* (2013.01); *C01F 7/74* (2013.01); *C01F 11/46* (2013.01); *C01G 1/12* (2013.01); *C01G 45/02* (2013.01); *C01G 49/0009* (2013.01); *C01G 49/02* (2013.01); *C01G 49/10* (2013.01); *C01G 49/14* (2013.01); *C02F 11/00* (2013.01); *C05B 11/12* (2013.01); *C05B 11/16* (2013.01); *C05F 7/00* (2013.01); *C02F 1/66* (2013.01); *C02F 2101/105* (2013.01); *Y02A 40/213* (2018.01)

(56) References Cited

FOREIGN PATENT DOCUMENTS

| | | |
|---|---|---|
| CN | 101654238 A | 2/2010 |
| CN | 101774556 A | 7/2010 |
| CN | 102320583 A | 1/2012 |
| CN | 102503060 A | 6/2012 |
| CN | 102815824 A | 12/2012 |
| DE | 10206347 A1 | 9/2003 |
| EP | 2016203 A | 1/2009 |
| JP | 54-14398 A | 2/1979 |
| JP | 09/145038 A | 6/1997 |
| JP | 2004-203641 A | 7/2004 |
| JP | 4243649 B2 | 3/2009 |
| RU | 2456248 C1 | 7/2012 |
| SE | 0950622 A1 | 3/2011 |
| WO | 83/02446 A1 | 7/1983 |
| WO | 95/06004 A1 | 3/1995 |
| WO | 96/20894 A1 | 7/1996 |
| WO | 00/50343 A2 | 8/2000 |
| WO | 03/000620 A1 | 1/2003 |
| WO | 2007/124527 A1 | 8/2007 |
| WO | 2008/115121 A1 | 9/2008 |
| WO | 2011/025440 A1 | 3/2011 |

OTHER PUBLICATIONS

Dittrich et al., Phosphorus recovery from sewage sludge ash by a wet-chemical process, International Conference on Nutrient Recovery from Wastewater Streams, Vancouver, BC, Canada, pp. 645-658 (2009).

M. Franz, Phosphate fertilizer from sewage sludge ash (SSA), Waste Management 28(10):1809-1818 (2008).

Schaum et al., Possibilities for a Phosphorus Recovery from Sewage Sludge Ash, Abstract, Conference on the Management of Residues Emanating from Water and Wastewater Treatment, Johannesburg, South-Africa, Abstract (Jan. 2005).

Jenni Nieminen, Phosphorus Recovery and Recycling from Municipal Wastewater Sludge, M.Sc. thesis, Aalto University, School of Science and Technology, May 7, 2010. See particularly, pp. 71-73.

Search Report dated Jan. 24, 2019 from corresponding Chinese Application No. 2017106263216.

Search Report dated Feb. 14, 2020 from corresponding European Application No. 19204334.7.

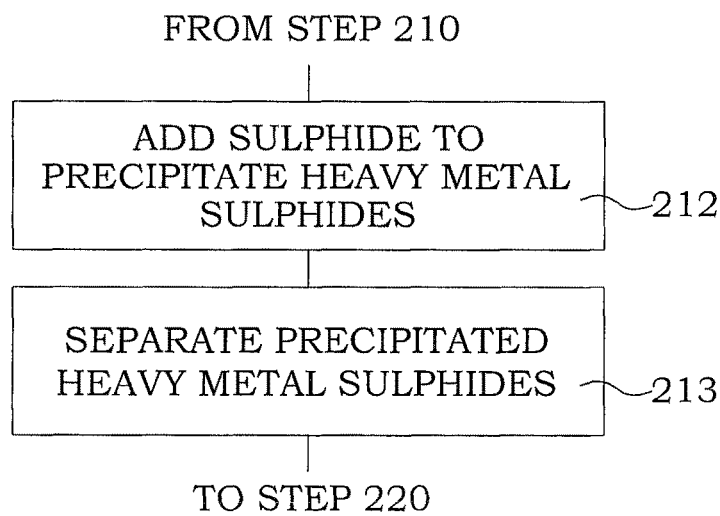
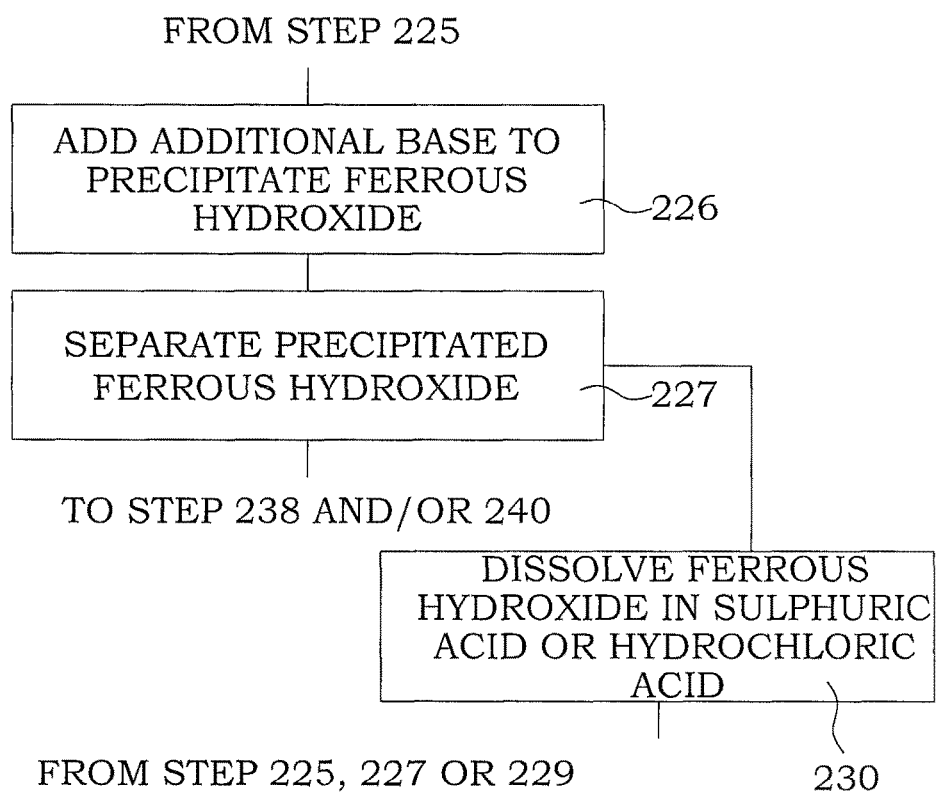
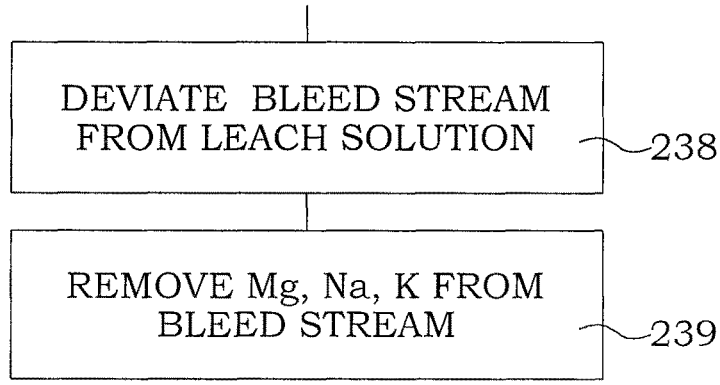

Fig. 9

FROM STEP 210

ADAPT ION PROPORTION IN LEACH SOLUTION — 214

ADD OXIDANT TO OXIDIZE FERROUS IRON INTO FERRIC IRON — 216

TO STEP 220

Fig. 12

FROM STEP 233

ADD LIME TO PRECIPITATE CALCIUM PHOSPHATE — 234

REMOVE PRECIPITATED CALCIUM PHOSPHATE — 235

TO STEP 238 AND/OR 240

Fig. 29

FROM STEP 270

ADD BASE TO FEED SOLUTION TO pH > 1.5 — 330

SEPARATE PRECIPITATED ALUMINIUM PHOSPHATE — 332

ADD LIME TO FEED SOLUTION TO PH > 4 — 334

TO STEP 302

SEPARATE PRECIPITATED CALCIUM PHOSPHATE — 336

TO STEP 260 AND/OR 294

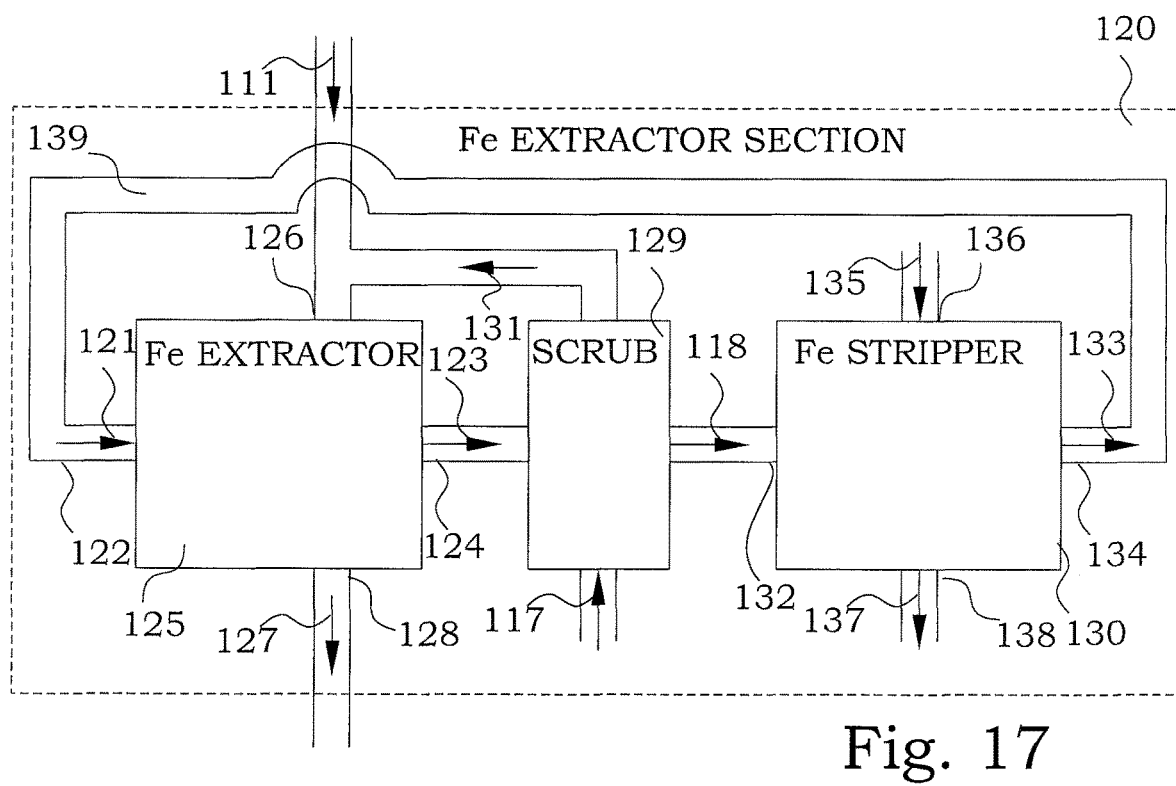
Fig. 17
Fig. 18
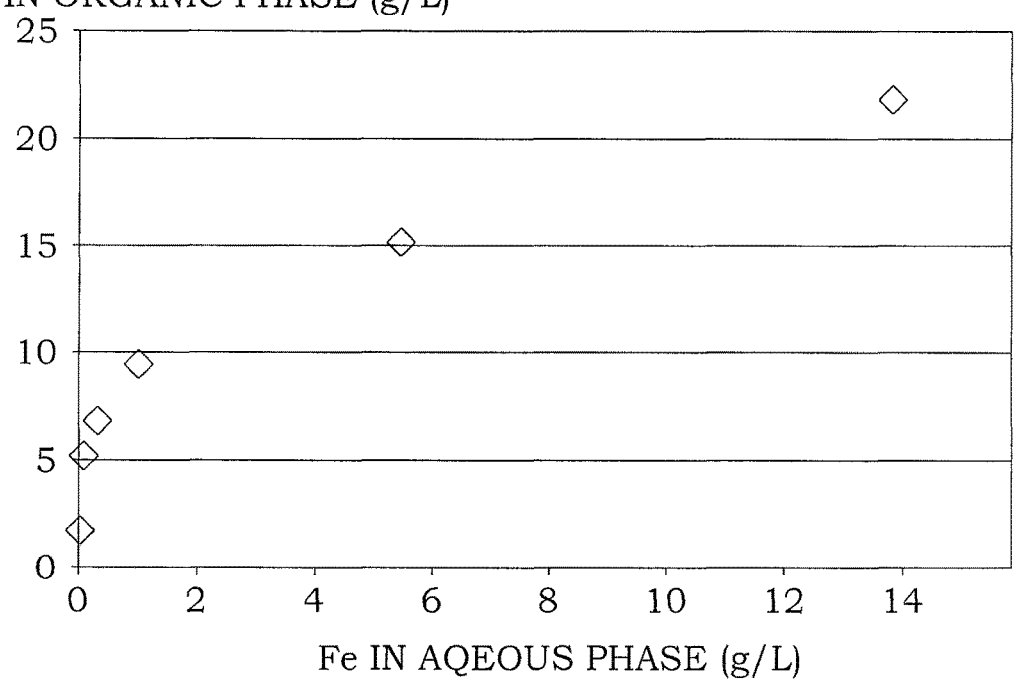

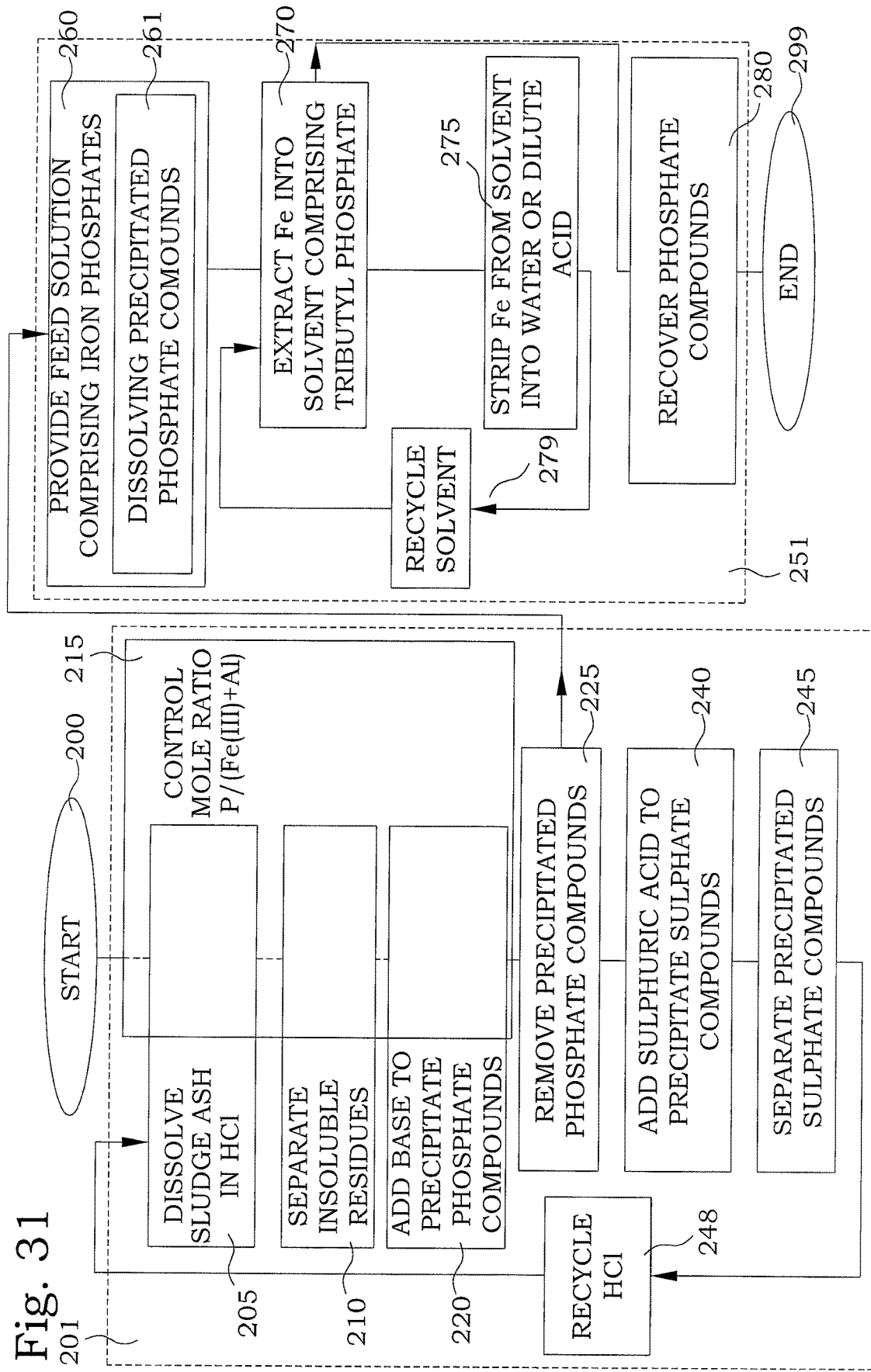

PRODUCTION OF PHOSPHATE COMPOUNDS FROM MATERIALS CONTAINING PHOSPHORUS AND AT LEAST ONE OF IRON AND ALUMINIUM

TECHNICAL FIELD

The present invention relates in general to processing materials containing phosphorous and at least one of iron and aluminium, and in particular to such processing focussing on recycling.

BACKGROUND

Phosphorus is an important element, and indeed essential to life. However, the release of phosphorous to surface waters, and its consequent contribution to eutrophication, has also led to increasing concerns about water quality. Policies were therefore implemented throughout the world, to reduce the levels of phosphorus entering surface waters, by the implementation of technologies to remove phosphorus from domestic and industrial wastewater. As a consequence, phosphorus accumulates in sewage sludge which is a major by-product of wastewater treatment plants.

Mineral phosphorus resources are considered limited and finite. Therefore, there is an increasing interest for technologies that can facilitate the recycling and beneficial re-use of the phosphorus present in wastes such as sewage sludge.

Fertilization with sewage sludge has decreased in an increasing number of countries due to difficulties of finding agricultural land around big cities that can accept large volumes of sludge but also due to concern regarding contents of pollutants such as heavy metals, organic contaminants, and pathogens in sewage sludge. Incineration is practiced as a solution to reduce the volume of sewage sludge and to destroy organic contaminants and pathogens before disposal.

Dewatered sewage sludge still contain considerable amount of water (about 70-80 percent), a main part as intracellular water in micro-organisms. Therefore, sewage sludge has to be dried to about 40 percent dry matter in order to enable incineration. Dedicated plants for mono-incineration of sewage sludge have been built in several countries. In these plants, the incoming sewage sludge is dried with recycled heat prior to the incineration.

Ash of mono-incinerated sewage sludge contains about 6-14 percent phosphorus by weight, which is slightly lower than the concentration of phosphorus in phosphate rock (e.g. 12-16 percent phosphorus by weight) which is the typical raw material for production of inorganic phosphorus fertilizers. More than 90 percent of the phosphorus being present in the sewage water is also found in the ash. The phosphorus present in the ash is insoluble in water due to bindings with calcium, iron or aluminium. Therefore, the phosphorus-fertilizer value of ash is low. Furthermore, heavy metals are enriched in ash and hinder the direct recirculation of ash to cropped land.

In addition to mono-incineration, sewage sludge can also be co-incinerated with biomass such as wood chips, etc. The advantage of such an approach is that dedicated plants for incineration of sewage sludge are not required. A mixture of sewage sludge and biomass can be incinerated in conventional plants for waste incineration without pre-drying of the mixture. However, the consequence of co-incinerating sewage sludge with biomass is that the phosphorus concentration in the ash is reduced, commonly to below 5 percent.

A number of methods have been developed to recover phosphorus from mono-incinerated sewage sludge, as its phosphorus content is high.

Japanese patent 9145038 describes a process based on heating the ash up to 1,400° C. to vaporize elemental phosphorus, which is condensed in water and oxidized to phosphoric acid. The drawbacks of this approach are that heating sludge ash to evaporate phosphorus requires large amounts of energy and the efficiency of phosphorus recovery is moderate due to formation of iron phosphate slag.

The published European patent application EP2016203 (A1) describes a process for thermochemical removal of heavy metals from sludge ash. The process is based on addition of earth metal chlorides to the ash and heating to above 900° C. to evaporate heavy metal chlorides. The drawbacks of this approach are large energy requirement for heating, phosphorus in the residue remains water-insoluble (low fertilizer value), and the phosphorus concentration in the residue is reduced due to dilution with elements remaining in the ash and with added chemicals. Processing of co-incinerated sludge ash which originally has a relatively low phosphorus concentration will probably result in too low phosphorus content in the product.

The published international patent application WO 00/50343 describes a process for recovering iron, aluminium and phosphorus from ash leach solution using ion exchange. The drawbacks of the process include high costs due to the need for large excess of regeneration chemicals and recovery of solutions with a relatively low concentration.

In the published international patent application WO 2008/115121, a method and an arrangement for phosphorus recovery are disclosed. The method is applicable to recovery of phosphorus from ash leach solutions. Separation of iron and aluminium is performed with a strong cation exchange resin regenerated with a mineral acid. The disadvantages are similar to disclosure WO 00/50343 and include high costs due to the need for a large excess of regeneration chemicals, limited value of recovered iron and aluminium products due to contamination with acid, low concentration, and that it is not possible to recover iron and aluminium separately.

Schaum et al. described in a conference (Conference on the Management of Residues Emanating from Water and Wastewater Treatment, Dec. 8, 2005, Johannesburg, South-Africa) a process for phosphorus recovery from sludge ash. The process is based on dissolution of mono-incinerated sludge ash in sulphuric acid followed by addition of sodium hydroxide to the leach solution to precipitate a product composed of mainly aluminium phosphate. The drawbacks of the process include a high cost due to the use of expensive sodium hydroxide and limited value for the recovered aluminium phosphate product. Aluminium phosphate has a very low solubility in water and thus cannot release phosphorus at rates sufficient for crops when used as a fertilizer. Furthermore, aluminium is toxic for plants. The fertilizer value of aluminium phosphate is therefore very low.

Franz described in a scientific publication (Waste Manag. 2008; 28(10):1809-18) a process for phosphorus recovery based on dissolution of sludge ash in sulphuric acid followed by precipitation of phosphorus from the leach solution with lime. The drawbacks of the process include low P content in the recovered product due to dilution with formed gypsum, considerable amounts of toxic aluminium in the product, and low plant availability of phosphorus due to binding in a water-insoluble form. The fertilizer value of the product is therefore very low.

Dittrich et al. described in a conference (International Conference on Nutrient Recovery from Wastewater Streams, Vancouver, 2009) a process for phosphorus recovery from sludge ash based on dissolution of sludge ash in hydrochloric acid followed by extraction of iron and heavy metals with alamine 336 solvent and thereafter precipitation of phosphorus in form of aluminium phosphate and calcium phosphate with lime. The drawbacks of the process include a higher cost for hydrochloric acid compared to sulphuric acid, regeneration of the alamine 336 solvent requires use of both ammonium carbonate and hydrochloric acid which is costly, production of large quantities of precipitated iron together with heavy metals which has to be disposed, recovery of phosphorus as a mixture of water-insoluble calcium phosphate with aluminium phosphate having a low fertilizer value.

The published international patent application WO 03000620 describes a process for treatment of sludge comprising the steps of putting the sludge into conditions being supercritical for water, adding an oxidant particularly oxygen to the sludge, separating the phosphorus from water and from carbon dioxide formed during the oxidation and recovering phosphorus by means of dissolving phosphorus in alkali. The main drawback of the process is the requirement of treating sludge by supercritical water oxidation which is complex. If the principles of dissolving phosphorus in alkali are applied to sludge ash, the recovery rate is very low, commonly below ten percent.

There is a need for a method for phosphorus recovery from materials containing phosphorous and at least one of iron and aluminium, e.g. sludge ash, in which a major part of the phosphorus can be recovered in a valuable form, clean from heavy metals, which can be used to produce fertilizers with high plant availability or as feed phosphates. Furthermore, the method should enable processing of any type of sludge ash independent on the precipitation chemical used in the wastewater treatment plant. Phosphorus recovery should be cost efficient and enable processing of ashes with low phosphorus content such as co-incinerated sludge ash. Furthermore, separation and recovery of other elements present in ash such as calcium, iron, aluminium, heavy metals, etc. is desired in order to increase recirculation of elements in society and to reduce the need for disposal of ash residues.

SUMMARY

A general object of the present invention is to provide a method for processing materials containing phosphorous and at least one of iron and aluminium for recovery of elements for reuse. A further object of the present invention is to enable recovery of phosphorus from materials containing phosphorous and at least one of iron and aluminium in a concentrated form that reduces costs of transportation. Yet a further object of the present invention is to enable processing of recovered phosphorus into pure and valuable forms in an environmentally friendly and cost effective way.

The above objects are achieved by methods and devices according to the enclosed patent claims. In general words, in a first aspect, a method for the production of phosphate compounds comprises dissolving of a raw material comprising sludge ash, comprising phosphorus, aluminium and iron, in a liquid comprising at least mineral acid. Insoluble residues from the dissolving step are separated, thereby forming a primary leach solution. A base comprising iron hydroxide is added to the primary leach solution, after the separating of insoluble residues, causing precipitation of phosphate compounds comprising iron and aluminium from the primary leach solution. The precipitated phosphate compounds are removed from the primary leach solution. The phosphate compounds are dissolved by an alkaline solution into a second leach solution. Iron hydroxide is filtered from the second leach solution. Lime is added into the second leach solution after the filtering of iron hydroxide, causing precipitation of calcium phosphate. The precipitated calcium phosphate is separated from the leach solution. The leach solution after the separating of precipitated calcium phosphate is recycled to be used in the dissolving of phosphate compounds by an alkaline solution.

In a second aspect, a system for production of phosphate compounds comprises an ash leaching reactor, having an inlet for receiving raw material comprising a sludge ash comprising phosphorus, aluminium and iron and an inlet for dissolving acid comprising mineral acid. The ash leaching reactor is arranged for dissolving the raw material in the mineral acid. A residue separator is connected to an outlet of the ash leaching reactor and is arranged for separating insoluble residues from the ash leaching reactor, thereby forming a primary leach solution. A base mixing arrangement is connected after an outlet from the residue separator and is arranged for adding a base comprising at least iron hydroxide to the primary leach solution through an inlet. A phosphate separator is connected to an outlet of the base mixing arrangement and is arranged for removing precipitated phosphate compounds from the primary leach solution through a precipitated phosphate compound outlet. The phosphate separator has an outlet through which remaining amount of the primary leach solution exits. A dissolution reactor is arranged for dissolving the precipitated phosphate compounds in an alkaline solution into a second leach solution. A first solid/liquid separator is connected to the dissolution reactor and is arranged for separating residue from the second leach solution. A mixing volume is connected to the first solid/liquid separator and is arranged for adding lime into the second leach solution causing precipitation of calcium phosphate. A second solid/liquid separator is connected to the mixing volume and is arranged for separating the calcium phosphate precipitated in the mixing volume from the second leach solution. A recycling arrangement is connected between the mixing volume and the dissolution reactor and is arranged for recycling at least a part of the second leach solution after the second solid/liquid separator to be used in the dissolution reactor as at least a part of the alkaline solution.

One advantage with the present invention is that it allows for extraction of phosphorus, calcium, aluminium, iron, and heavy metals from e.g. sludge ash in form of high quality products such as phosphoric acid, calcium phosphate, ammonium phosphate, gypsum, iron chloride, iron sulphate, aluminium hydroxide, iron hydroxide, heavy metal sulphides, etc. in an environmentally friendly and cost effective way. Another advantage of the present invention is that phosphorus can be recovered as a concentrated, water-soluble, inorganic product of a high quality, i.e. high phosphorus availability to plants and minor heavy metal contamination for use as a fertilizer or as pure phosphate salts for use as feed supplements. Further objects and advantages are discussed in connection with the different embodiments in the detailed description.

BRIEF DESCRIPTION OF THE DRAWINGS

The invention, together with further objects and advantages thereof, may best be understood by making reference to the following description taken together with the accompanying drawings, in which:

FIG. 5A-D are part flow diagrams of embodiments of methods for concentration of phosphate compounds;

FIG. 9 is a part flow diagram of an embodiment of a method for concentration of phosphate compounds;

FIG. 12 is a part flow diagram of an embodiment of a method for concentration of phosphate compounds;

FIG. 17 is a partial block scheme of an embodiment of a recoverer arrangement;

FIG. 18 is an extraction isotherm for ferric iron from an artificial feed solution using a solvent composed of 30% TBP, 30% dodecanol in kerosene;

FIG. 29 is a part flow diagram of an embodiment of a method for recovery of phosphate compounds;

FIG. 31 is a flow diagram of an embodiment of a method for the production of phosphate compounds;

DETAILED DESCRIPTION

Some often used terminology in the present disclosure is to be interpreted as follows:

Solvent—A liquid phase, typically organic, which preferentially dissolves extractable solute species from an aqueous solution.

Extractant—An active component, typically organic, of a solvent enabling extraction.

Liquid-liquid extraction—The separation of one or more solutes from a mixture by mass transfer between immiscible phases in which at least one phase typically is an organic liquid.

Diluent—A liquid, typically organic, in which an extractant and a modifier are dissolved to form a solvent.

Modifier—A substance added to a solvent to increase the solubility of the extractant, salts of the extractant, or ion species derived from extraction or stripping. Also added to suppress emulsion formation.

Stripping—Elution from a loaded solvent.

Scrubbing—The selective removal of impurities from a loaded solvent prior to stripping.

Raffinate—An aqueous phase from which a solute has been removed by extraction.

Throughout the drawings, the same reference numbers are used for similar or corresponding elements.

When processing a raw material comprising relatively low concentrations of phosphorus there are evidently a lot of residue substances that have to be recovered, processed or deposited in different ways. Such residual substances may in typical cases be of much larger volumes than the requested end phosphorus product. Due to such large volumes of rest or side products, the processing of such raw materials are in certain cases preferably performed at the site where the raw material becomes available. Transporting such low concentration raw material will evidently cause large costs as well as occupy large transport capabilities. This means that processing typically will take place at many different sites. However, most processes used for providing phosphorus compounds suitable for e.g. fertilizing purposes require relatively complex arrangements. For such processing, a more centralized handling would be preferred.

Figure 1:
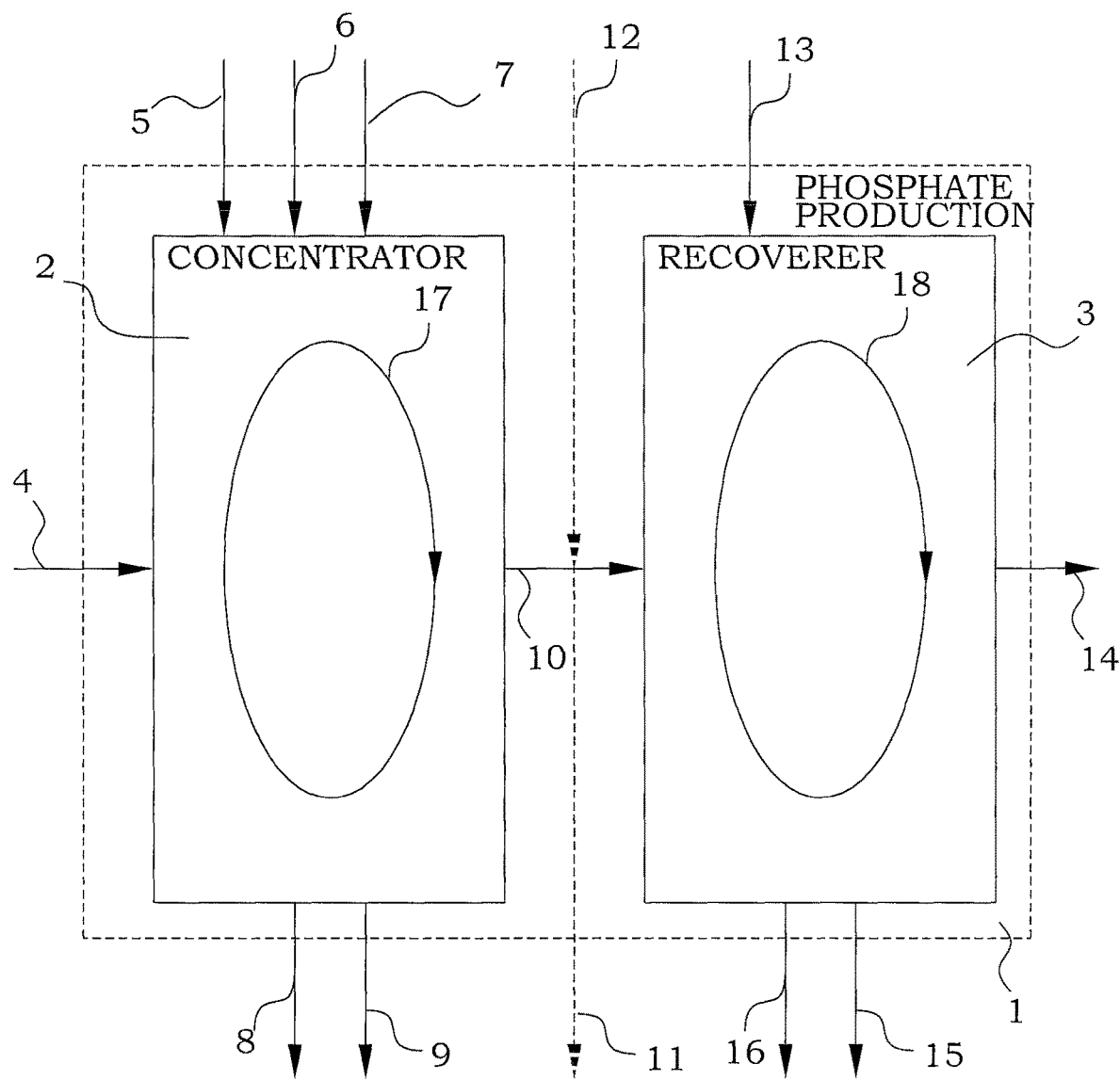
FIG. 1 is a block scheme of an embodiment of a system for production of phosphate compounds.

In order to at least partly meet both these preferences, a concept of utilizing an intermediate phosphorus product was developed. These basic ideas are schematically illustrated in FIG. 1. A system 1 for production of phosphate compounds is illustrated as having a first part comprising a concentrator 2, i.e. system for concentration of phosphate compounds, and a second part comprising a recoverer 3, i.e. a system for recovery of phosphate compounds. A raw material 4, typically with relatively low phosphorus content, is processed in the concentrator 2 giving an intermediate phosphate product 10.

The intermediate phosphate product 10 has a higher phosphate content than the raw material 4 and is thus easier to transport. In the present concept, the raw material 4, typically sludge ash, is treated with hydrochloric acid 5, a base 6 and sulphuric acid 7, producing an intermediate phosphate product comprising phosphates of iron and/or phosphates of aluminium and calcium. The concentrator 2 produces residues 8 in the form of compounds insoluble in hydrochloric acid and sulphates 9. The main part of the hydrochloric acid is recovered internally in the concentrator 2 as illustrated by the elliptical arrow 17. In preferred embodiments, the concentrator 2 removes at least the main part of heavy metals and ions like Mg, Mn, K and Na from the intermediate phosphate product, and the main part of the calcium is preferably recovered as gypsum. In particular embodiments, ferrous iron can be recovered in form of ferrous hydroxide.

The intermediate phosphate product 10 has a relatively high phosphate content. The intermediate phosphate product 10 may therefore be used as it is as raw material for various other processes as illustrated by the broken arrow 11. Similar types of intermediate phosphate products may also be provided elsewhere and entered in to the system 1 for production of phosphate compounds as illustrated by the broken arrow 12. The intermediate phosphate product 10 has also an iron content if it emanates from sludge ash, and is therefore typically not suitable as a fertilizer substance. The intermediate phosphate product 10 is therefore provided to the recoverer 3, giving a final phosphate compound product 14, which typically is directly usable e.g. as fertilizer or as feed phosphate.

In the present concept, two preferred ways for processing the intermediate precipitate are developed. However, any other method for recovery of phosphate compounds can also be utilized. In a first approach, the intermediate phosphate product 10 is provided into a feed solution, e.g. by solving with a liquid comprising at least hydrochloric acid 13. In an extraction process, iron compounds 15 and aluminium and/or calcium compounds 16 are extracted, leaving the final phosphate compound product 14. The extraction process operates preferably by recirculation of a solvent, as illustrated by the elliptical arrow 18.

In a second approach, the intermediate precipitate 10 is provided into a feed solution, e.g. by solving with a liquid comprising at least sodium hydroxide 13. In a precipitation process, iron compounds 15 and aluminium and/or calcium compounds 16 are separated from the final phosphate compound product 14. The precipitation process operates preferably by recirculation of an alkaline solution, as illustrated by the elliptical arrow 18.

From FIG. 1, one can understand that the concentrator 2 and recoverer 3 operate as producer and consumer, respectively, of the intermediate phosphate product 10 and are thus aspects of one and the same common inventive concept. In a typical system arrangement, a number of recoverers 3 receive an intermediate phosphate product 10 from a number of concentrators 2, typically larger than the number of recoverers 3.

Besides the general object of the present invention mentioned above, further general objects and objects of preferred embodiments are present. One additional object of one of several embodiments is to enable processing of recovered phosphorus into pure and valuable forms such as phosphoric acid, calcium phosphate, ammonium phosphate, etc. that can easily be utilized for fertilizing or feed purposes. Another object of one of several embodiments is to enable separation of heavy metals for further processing or disposal. A further object of one of several embodiments is to enable selective precipitation of heavy metals without significant co-precipitation of iron. Yet another object of one of several embodiments is to enable recovery of calcium from sludge ash in form of pure gypsum suitable for gypsum board production, fertilizer production, use as filler material in paper, etc. A further object of one of several embodiments is to reduce the weight of the residual ash after treatment to significantly below its original weight. An additional object of one of several embodiments is to enable partial recovery of ferric iron from sludge ash in form of ferric chloride or ferric sulphate suitable for use as a coagulant in wastewater treatment. Another object of one of several embodiments is to enable recovery of ferrous iron in form of ferrous hydroxide suitable for production of ferrous sulphate or ferrous chloride coagulants. Yet another object of one of several embodiments is to enable recovery of aluminium in form of aluminium hydroxide suitable for production of aluminium sulphate or aluminium chloride coagulants. An additional object of one of several embodiments is to enable use of low cost carbon dioxide for production of aluminium hydroxide. Another object of one of several embodiments is to enable the regeneration of hydrochloric acid with low cost sulphuric acid. Yet another object of one of several embodiments is to obtain complete dissociation of protons from sulphuric acid and thereby improve the chemical efficiency of sulphuric acid. Another object of one of several embodiments is to enable regeneration of sodium hydroxide with low cost lime. Yet another object of one of several embodiments is to enable a high chemical efficiency by enabling internal reuse of iron hydroxide for phosphorus removal and pH control. A further object of one of several embodiments is to enable subsequent selective extraction of iron and phosphorus with solvents having the same components (extractant, modifier, diluent) but only in different concentration and thereby avoid problems of contamination of one solvent with the other. Yet another object of one of several embodiments is to enable the use of dilute acid for ash dissolution and still obtain recovered products of high concentration. Use of dilute acid for dissolution enables an easy filtration of the residue and precipitated products due to a low viscosity as well as lower solubility for heavy metal precipitate at higher pH.

Here below, processes for recovery of phosphorus from sludge ash are described in detail. However, although being an advantageous approach, the present invention is not limited to recovery of phosphorus from sludge ash, but is applicable to many different systems providing phosphate ions, iron ions, and/or aluminium ions. A similar process with minor modifications can be used e.g. for extracting phosphorus from iron- and/or aluminium phosphate minerals, iron- and/or aluminium phosphate sludge, iron and/or aluminium phosphate containing industrial effluents, etc.

In general, any strong mineral acid can be used to dissolve sludge ash. The only requirement is that the pH during dissolution should be below 2, and preferably below 1.5 for obtaining significant phosphorus dissolution. Sulphuric acid is a low cost mineral acid and therefore usually chosen as a preferred acid for dissolution e.g. according to the above described prior state of the art. However, use of sulphuric acid for ash dissolution is coupled to several drawbacks. Ash of incinerated sewage sludge usually contains large amount of calcium up to about 20% of the weight. When sulphuric acid is used for ash dissolution the sulphate reacts with dissolved calcium forming gypsum dihydrate ($CaSO_4 \cdot 2H_2O$). The precipitated gypsum is in mixture with the insoluble matter in the ash such as iron oxides, silicates, etc. The gypsum residue mixture usually receives a strong colour of red, brown or dark grey. The gypsum is thus contaminated and it is difficult to find a use for it. Applications such as production of gypsum board, filler material in paper, etc. requires gypsum of higher quality. In summary, ash dissolution with sulphuric acid results in a low quality residue in an amount which can be even larger than the original amount of ash.

An additional disadvantage of using sulphuric acid for ash dissolution is that at low pH level (pH<4) sulphuric acid ($pK_{a2}$=1.99) does not dissociate completely and contribute with only one proton instead of two protons during ash dissolution. The efficiency of sulphuric acid use for dissolution is thereby reduced at low pH level.

Additional drawbacks of using sulphuric acid for ash dissolution are coupled to recovery of phosphorus from the leach solution. These drawbacks will be discussed later in the text.

Since the use of sulphuric acid for ash dissolution is coupled to several drawbacks one may consider using other acids for ash dissolution such as hydrochloric acid. The main drawback of using hydrochloric acid for ash dissolution is the higher cost of hydrochloric acid compared to sulphuric acid.

According to the present invention, liquids comprising at least hydrochloric acid is used for ash dissolution. However, instead of continuous consumption of hydrochloric acid, it is regenerated with sulphuric acid via gypsum precipitation after the separation of phosphorous compounds as will be described later in the description. In that manner, low cost sulphuric acid is the consumed substance, while regenerated hydrochloric acid is reused for ash dissolution. In such a way, the final efficiency of sulphuric acid use is high since both protons of sulphuric acid contribute indirectly to ash dissolution at low pH. The chemical efficiency during ash dissolution according to the invention is therefore considerably higher compared with state of the art.

Sludge ash is mainly comprised of the elements O, Si, P, Ca, Fe and Al. Table 1 shows elemental composition of five different examples of sludge ashes. Ashes A, B, and D are obtained from mono-incineration of sewage sludge, while ashes C and E are obtained from co-incineration of sewage sludge with wood chips. Table 1 also describes the kind of chemical used in the wastewater treatment plant for phosphorus precipitation. Three different groups of phosphorus precipitation chemicals are usually used:

1) precipitation chemicals based on iron (III) such as iron chloride ($FeCl_3$) or iron sulphate ($Fe_2(SO_4)_3$),
2) precipitation chemicals based on iron (II) such as iron sulphate ($FeSO_4$) or iron chloride ($FeCl_2$), and
3) precipitation chemicals based on aluminium such as aluminium chloride ($AlCl_3$) or aluminium sulphate ($Al_2(SO_4)_3$).

sulphuric acid is added and as mentioned here above, calcium in form of pure gypsum precipitates. At the same time hydrochloric acid is regenerated for reuse. A main advantage of ash dissolution with hydrochloric acid followed by precipitation with lime is that a concentrated phosphorus product is formed with low concentration of elements other than iron, aluminium or calcium.

In contrast, if sulphuric acid is used for ash dissolution followed by lime addition, e.g. according to Franz (see above), the concentration of phosphorus in the precipitate is lower. Calcium added with lime reacts with sulphate in the leach solution forming gypsum which precipitates together with phosphorus and thereby dilutes the precipitated phosphorus considerably. It is possible to avoid gypsum formation by using sodium hydroxide instead of lime, e.g. according to Schaum et al (see above). However, use of sodium hydroxide is more expensive and therefore not considered being the most economic option.

However, there are additional problems arising, when using the above intended approach. When the approach to dissolve sludge ash in hydrochloric acid and to precipitate phosphorus with lime was tested, it was surprisingly found that when ash A was dissolved in hydrochloric acid, e.g. 6 litres 1M HCl per kg ash, addition of lime to the filtrated leach solution resulted in formation of a thick gel binding all the water in the dissolution reactor. It was impossible to filter the gel, which led to a non-operational process.

Testing to dissolve ash A with sulphuric acid, e.g. 6 litres 1M $H_2SO_4$ per kg ash, and to precipitate phosphorus with lime, e.g. according to Franz, did not result in any similar gel formation. Instead, phosphorus precipitated in an easily filterable form. It was therefore concluded that the formation of the gel was associated with the use of hydrochloric acid for ash dissolution. Testing to dissolve ash C with hydrochloric acid and to precipitate phosphorus with lime resulted again in formation of a thick gel, which made the process non-operational. However, when ashes B, D and E where dissolved in hydrochloric acid and phosphorus precipitated with lime, a gel did not form. Instead, the precipitated phosphorus was in a form which was easy to filter.

Extensive experimentation with artificial solutions identified the conditions in which a gel forms. The experimental results are summarized in table 2.

Table 2 shows elemental composition of artificial leach solutions made by addition of pure chemicals (iron, alu-

TABLE 1

Elemental composition of ashes of incinerated sewage sludge (% of weight).

| | Al | Mn | Fe | Na | Mg | P | S | K | Ca | Precipitation chemical |
|---|---|---|---|---|---|---|---|---|---|---|
| Ash A | 6.51 | 0.14 | 2.97 | 0.49 | 0.48 | 6.93 | 0.12 | 0.78 | 4.47 | Al |
| Ash B | 4.20 | 0.05 | 10.60 | 1.36 | 1.05 | 8.38 | 0.57 | 0.94 | 7.52 | Fe (II) |
| Ash C | 4.42 | 0.15 | 2.78 | 1.06 | 0.77 | 3.57 | 0.10 | 2.11 | 4.56 | Al |
| Ash D | 5.10 | | 7.70 | 0.40 | 1.30 | 8.00 | 1.70 | 0.90 | 15.10 | Fe (III) |
| Ash E | 0.61 | 0.18 | 7.58 | 0.28 | 0.84 | 3.96 | 0.26 | 0.68 | 5.40 | Fe (II) |

From Table 1 it can be seen that the phosphorus concentration of co-incinerated sludge ash (about 4% P) is lower than that of mono-incinerated sludge ash (about 8% P).

The intended approach according to the present disclosure is to dissolve sludge ash with hydrochloric acid and thereafter to precipitate compounds comprising phosphorus. The precipitation is caused by adjusting the pH, in some embodiments preferably with the use of lime. Later in the process minium and phosphorus). Table 2 further shows the type of anion associated with the added metals (chloride or sulphate), as well as, the form of iron (II or III valence). Lime was added to the artificial solutions and table 2 further shows if a gel was formed or not.

From Table 2 it can be seen that a gel forms when the P/[Fe(III)+Al] mol ratio in the artificial solution is ≤1 and when chloride is the anion. At P/[Fe(III)+Al] mol ratio >1, gel is not formed even when chloride is the anion. If sulphate is the anion, gel is not formed independent of the above described ratio. Iron (II) is not contributing to gel formation, as gel is not formed even at P/[Fe(II)+Al] mol ratio <1. Further, it was concluded that gel can be formed in solutions lacking phosphorus composed of only Fe(III) or Al in chloride forms, if the concentration of the metals is large enough. However, the presence of phosphorus enhances the formation of the gel.

The experiments are summarized in Table 3 which shows elemental composition of ash leach solutions, type of additive, kind of acid used for dissolution (type of anion: chloride or sulphate), as well as, if gel was formed or not upon lime addition.

From table 3 it can be seen that addition of phosphorus to ashes which originally formed gel upon lime addition (ash A and C) solved the problem and gel was not formed. The P/[Fe(III)+Al] mol ratio in which gel is not formed (>1.6

TABLE 2

Elemental composition of artificial leach solutions and notification whether gel is formed or not upon lime addition.

| P (M) | Al (M) | Fe III (M) | FeII (M) | P/(Al + Fe) | Gel | Anion | Comment |
|---|---|---|---|---|---|---|---|
| 0.3 | 0.14 | 0 | 0 | 2.1 | No | Cl | |
| 0.3 | 0.14 | 0.05 | 0 | 1.6 | No | Cl | |
| 0.3 | 0.14 | 0.1 | 0 | 1.3 | No | Cl | |
| 0.3 | 0.14 | 0.15 | 0 | 1.0 | Yes | Cl | |
| 0.3 | 0.14 | 0.3 | 0 | 0.7 | Yes | Cl | |
| 0.3 | 0.03 | 0.1 | 0 | 2.3 | No | Cl | |
| 0.3 | 0.1 | 0.1 | 0 | 1.5 | No | Cl | |
| 0.3 | 0.15 | 0.1 | 0 | 1.2 | No | Cl | |
| 0.3 | 0.2 | 0.1 | 0 | 1.0 | Yes | Cl | |
| 0.3 | 0.4 | 0.1 | 0 | 0.6 | Yes | Cl | |
| 0.3 | 0.07 | 0.05 | 0 | 2.5 | No | Cl | |
| 0.3 | 0.07 | 0.1 | 0 | 1.76 | No | Cl | |
| 0.3 | 0.07 | 0.15 | 0 | 1.36 | No | Cl | |
| 0.3 | 0.07 | 0.3 | 0 | 0.81 | Yes | Cl | |
| 0.3 | 0.07 | 0.45 | 0 | 0.58 | Yes | Cl | |
| 0.3 | 0.07 | 0.3 | 0 | 0.81 | No | SO4 | |
| 0.3 | 0.07 | 0.45 | 0 | 0.58 | No | SO4 | |
| 0.3 | 0.07 | 0 | 0.3 | 0.81 | No | Cl | |
| 0.3 | 0.07 | 0 | 0.45 | 0.58 | No | Cl | |
| 0.3 | 0 | 0.3 | 0 | 1 | Yes | Cl | |
| 0.3 | 0 | 0.375 | 0 | 0.8 | Yes | Cl | |
| 0.3 | 0 | 0.6 | 0 | 0.5 | Yes | Cl | |
| 0 | 0 | 0.3 | 0 | — | Yes | Cl | i |
| 0 | 0 | 0.375 | 0 | — | Yes | Cl | ii |
| 0 | 0 | 0.6 | 0 | — | No | Cl | iii |
| 0 | 0.03 | 0 | 0 | — | No | Cl | iv |
| 0 | 0.1 | 0 | 0 | — | No | Cl | v |
| 0 | 0.15 | 0 | 0 | — | No | Cl | vi |
| 0 | 0.2 | 0 | 0 | — | No | Cl | vii |
| 0 | 0.4 | 0 | 0 | — | No | Cl | viii |
| 0.15 | 0.3 | 0 | 0 | 0.5 | Yes | Cl | ix | i) Gel formed & dissolved, final pH = 10.7,
ii) Gel formed and dissolved, final pH = 8.02,
iii) Still no gel, pH = 1.3,
iv) Initial pH = 3.5, final pH = 12,
v) Initial pH = 3.1, final pH = 10.4,
vi) Initial pH = 2.96, final pH = 8.55,
vii) Initial pH = 2.86, final pH = 4.14,
viii) Initial pH = 2.51, final pH = 3.73,
ix) Gel formed and dissolved, final pH = 7.6.

It was further observed that the formation of the gel is also dependent on the pH of the solution. A gel forms at a pH level of about 2-5 and dissolves at alkaline pH. Since phosphorus precipitation usually occurs at a pH level of 2-5, the formation of gel makes the process non-operational.

The mechanism of the gel formation is not yet fully understood. However, since aluminium and iron (III) can form different hydrated ions in solution according to pH, it is believed that these ions cause the formation of the gel. Experimentation with leach solutions from sludge ash confirmed that gel formation is coupled to a P/[Fe(III)+Al] mol ratio.

Experiments were performed with ash leach solutions and with ash leach solutions in which different additives were added, such as phosphorus (in form of ammonium phosphate or phosphoric acid), iron (in form of $FeCl_3$), aluminium (in form of $AlCl_3$), or hydrogen peroxide ($H_2O_2$) to oxidize ferrous iron into ferric iron.

according to table 3) is higher than that obtained for artificial solutions (>1 according to table 2). It is believed that this can be an effect of other dissolved ions in solution. Since a ratio of 1.4 did not form a gel in one case, it is believed that the actual limit for gel formation in ash solution varies between 1 and 1.6 depending on the ionic composition of the solution.

TABLE 3 shows elemental composition of ash leach solution, kind of additive, and notification whether gel is formed or not upon lime addition.

| Ash | Additive | P (M) | Al (M) | Fe (M) | P/(Al + Fe) | Gel | Anion |
|---|---|---|---|---|---|---|---|
| A | Non | 0.27 | 0.14 | 0.02 | 1.60 | Yes | Cl |
| A | Non | 0.3 | 0.17 | 0.03 | 1.5 | No | SO4 |

TABLE 3-continued shows elemental composition of ash leach solution, kind of additive, and notification whether gel is formed or not upon lime addition.

| Ash | Additive | P (M) | Al (M) | Fe (M) | P/(Al + Fe) | Gel | Anion |
|-----|----------|-------|--------|--------|-------------|-----|-------|
| B | Non | 0.32 | 0.07 | 0.15 | 1.40* | No | Cl |
| D | Non | 0.20 | 0.08 | 0.01 | 2.17 | No | Cl |
| C | Non | 0.13 | 0.08 | 0.01 | 1.36 | Yes | Cl |
| B | Al | 0.28 | 0.16 | 0.15 | 0.92* | No | Cl |
| B | Fe(III) | 0.32 | 0.07 | 0.25 | 0.99* | No | Cl |
| B | Fe(III) | 0.32 | 0.07 | 0.11# | 1.78 | No | Cl |
| B | Al | 0.32 | 0.37 | 0.15 | 0.62* | Yes | Cl |
| B | Fe(III) | 0.32 | 0.07 | 0.36 | 0.75* | Yes | Cl |
| A | P | 0.67 | 0.14 | 0.02 | 4.19 | No | Cl |
| C | P | 0.38 | 0.10 | 0.02 | 3.22 | No | Cl |
| A | Fe(III) | 0.27 | 0.14 | 0.23 | 0.73 | Yes | Cl |
| E | Non | 0.16 | 0.02 | 0.06 | 1.82 | No | Cl |
| E | $H_2O_2$ | 0.16 | 0.02 | 0.06 | 1.82 | No | Cl |
| B | $H_2O_2$ | 0.32 | 0.07 | 0.15 | 1.40 | No | Cl |

*main part of Fe in form of Fe(II),
only added Fe(III) is presented.

In general, three main types of sludge ash can be identified based on the chemical used for phosphorus precipitation in the wastewater treatment plant (ferric iron, ferrous iron, or aluminium). The three different ash types behave differently during dissolution and phosphorus precipitation, and therefore different ash types may require slightly different detailed treatment.

Ferric iron ($Fe^{3+}$) in sludge ash exists mostly in an acid insoluble form. Therefore, iron dissolution from sludge ash, in which ferric iron was used as a phosphorus precipitation chemical, is minor, commonly below 10% on a weight basis. In contrast, ferrous iron ($Fe^{2+}$) in sludge ash has a significantly higher solubility in acid. Ferrous iron dissolution may reach up to 50% on a weight basis. Aluminium in sludge ash has usually solubility in acid reaching 60-80% dissolution on a weight basis.

The solubility of ferric phosphate, ferrous phosphate, aluminium phosphate and calcium phosphate differs at different pH levels. It was found that ferric phosphate and aluminium phosphate could be completely precipitated from ash leach solutions at a pH level of about 3. However, the solubility of ferrous phosphate and calcium phosphate is significantly higher. Complete precipitation of ferrous phosphate or calcium phosphate requires a higher pH level of about 5.

Solubility of heavy metal phosphates is also pH dependent. It was found, however, that phosphorus can be precipitated selectively in form of ferric phosphate or aluminium phosphate without co-precipitation of significant amount of heavy metals at a pH level below 3.5. The selectivity is generally increased at lower pH level.

It was also found that precipitation of iron sulphide from ash leach solution requires a pH level usually higher than 4, while heavy metals such as Cu, Zn, Cd, Pb, As, Ni, etc. precipitate to a larger part as sulphides at pH<4. This phenomenon enables selective precipitation of heavy metal sulphides even in the presence of high concentration of iron in solution. Therefore it is possible in preferred embodiments to selectively precipitate heavy metals as sulphides directly from ash leach solution at pH<1.5 without significant co-precipitation of ferric or ferrous iron as sulphides. It was also found that it is possible to selectively precipitate heavy metals after precipitation of phosphorus at pH<3.5, again without significant co-precipitation of ferrous iron. This enables subsequent precipitation of ferrous iron with low heavy metal content as will be described further in the text in connection with different embodiments.

According to the present disclosure, there are three main treatment alternatives for separating heavy metals from recovered phosphorus as discussed above. The first alternative is to precipitate ferric phosphate and aluminium phosphate selectively with e.g. lime at a pH level below 3.5 without significant co-precipitation of heavy metals. The second alternative is to precipitate heavy metals in form of heavy metal sulphides by adding a sulphide source such as sodium sulphide before precipitation of phosphorus. In this alternative, the pH in which phosphorus precipitation takes place is not limited to below 3.5. The third alternative is to precipitate phosphorus together with heavy metals at a pH level higher than 3.5 and to separate heavy metals at a later processing step as will be described later in the disclosure.

Figure 2:
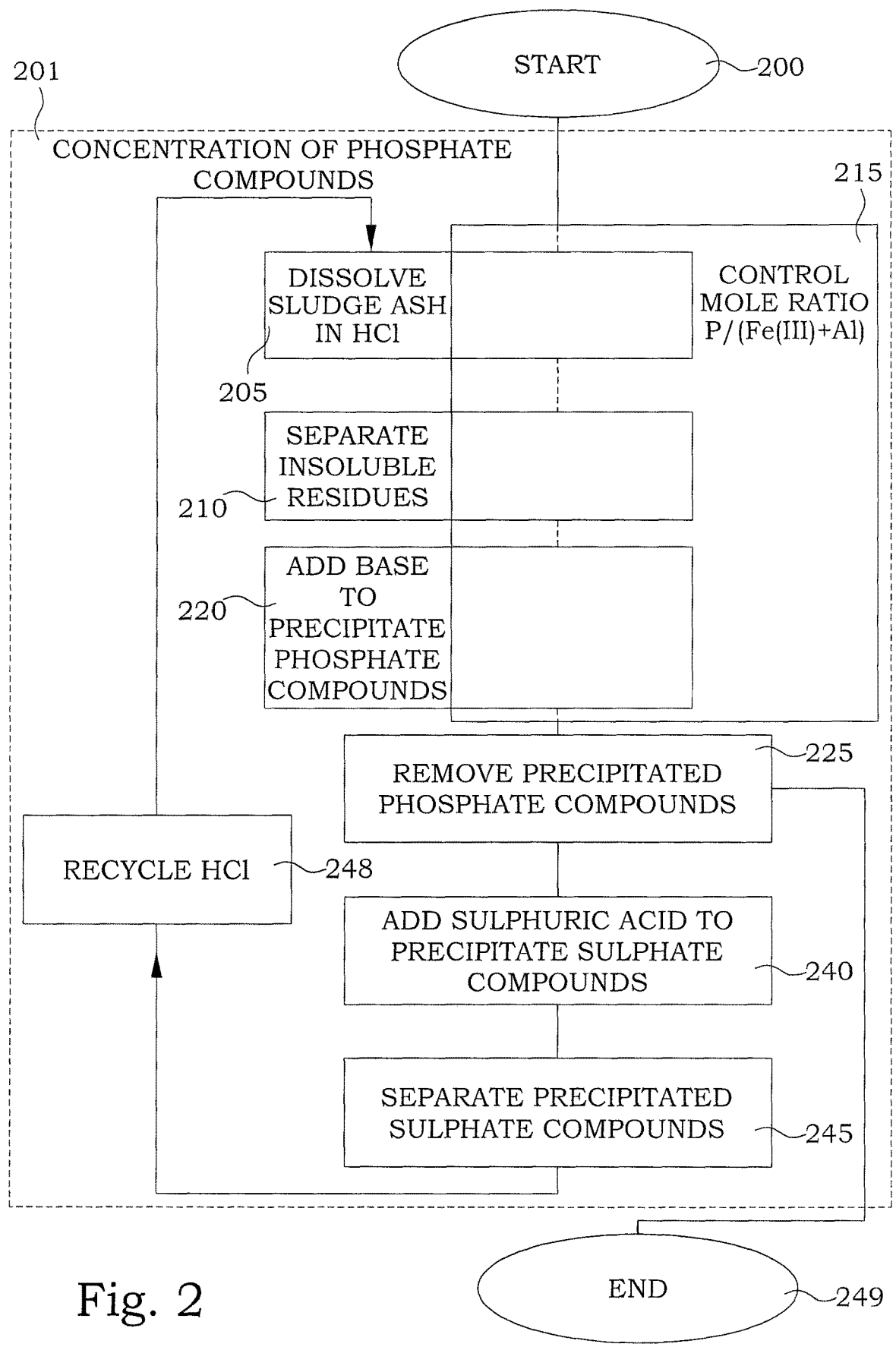
FIG. 2 is a flow diagram of steps of an embodiment of a method for concentration of phosphate compounds.

One embodiment of a method for concentration of phosphate compounds is illustrated by a flow diagram of steps in FIG. 2. The procedure starts in step 200. In step 205, a raw material comprising sludge ash is dissolved in hydrochloric acid. The sludge ash comprises phosphorus and at least one of iron and aluminium. Insoluble residues from the dissolving step are separated in step 210. Thereby a first leach solution is formed. The first leach solution has a mole ratio of phosphorus to a sum of ferric iron and aluminium. In step 215, that mole ratio is controlled to be larger than 1, and preferably larger than 1.6. Step 215 can occur before, simultaneous as, and/or after the steps 205 and 210 and before and/or simultaneous as step 220, as will be discussed further below. In step 220, a base is added to the first leach solution, after the step of separating insoluble residues. The addition of the base causes precipitation of phosphate compounds comprising at least one of iron and aluminium from the first leach solution. In a particular embodiment, lime is used as the base but other alternatives exist as discussed later in the text. In step 225, the precipitated phosphate compounds are removed from the first leach solution. These precipitated phosphate compounds form in this embodiment the earlier discussed intermediate phosphate compounds. Sulphuric acid is added in step 240 to the first leach solution, after the step of removing the precipitated phosphate compounds. This sulphuric acid addition causes precipitation of sulphate compounds. In particular embodiments, these sulphuric compounds comprise mainly gypsum. In step 245, the precipitated sulphate compounds are separated from the first leach solution. In step 248, at least a part of the leach solution is recycled after the step 245 of separating the precipitated sulphate compounds. The leach solution is recycled as the hydrochloric acid in the step 205 of dissolving sludge ash. The process is illustrated to end in step 249, although the process in reality is to be considered as a cyclic process, where the hydrochloric acid is recovered to be used again. The entire block of steps 205-249 can be considered as an ensemble 201 of activities for concentration of phosphate compounds.

The controlling of the mole ratio can be performed in at least four different ways, or combinations thereof. A first alternative is to add phosphorus into the first leach solution during the step of dissolving a raw material. A second alternative is to add phosphorus into the first leach solution after the step of dissolving a raw material. A third alternative is to add phosphorus into the raw material. A fourth alternative is not to completely precipitate phosphorus but leave an excess of dissolved phosphorus in the circulating leach solution. The alternative to select depends on the availability of chemicals and the composition prediction accuracy of the raw material.

Fluorine is a substance that may influence many solubility conditions. Using sludge ash as raw material gives the advantage that one knows that the first leach solution becomes essentially free from fluorine, since the fluorine content in sludge ash is very small indeed.

The precipitated phosphate compounds from the above described method are provided in a relatively concentrated form. A typical combined iron and aluminium content is above 5% dry weight and can reach up to 17%. Phosphorous content is generally above 13% dry weight and can reach up to 20%, which is favourable considering transporting conditions.

Figure 3:
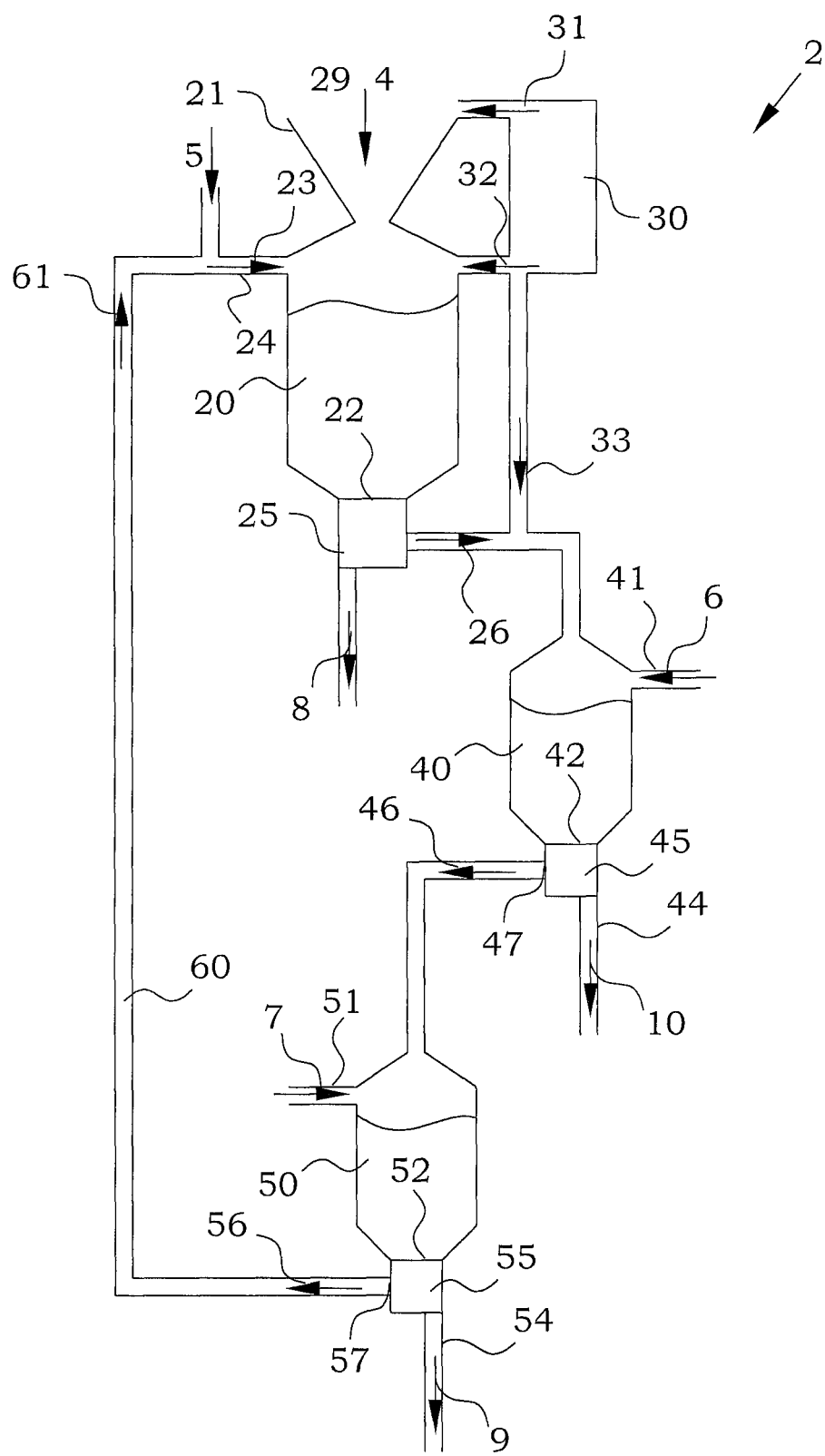
FIG. 3 is a block scheme of an embodiment of a concentrator arrangement.

FIG. 3 illustrates a block scheme of an embodiment of a system 2 for concentration of phosphate compounds. The system 2 for concentration of phosphate compounds comprises an ash leaching reactor 20. The ash leaching reactor 20 has an inlet 21 for a raw material 4 and an inlet 24 for dissolving acid. The dissolving acid is hydrochloric acid 23. The raw material 4 comprises a sludge ash 29, which in turn comprises phosphorus and iron and/or aluminium. The ash leaching reactor 20 is arranged for dissolving the raw material 4 in the hydrochloric acid 23. A residue separator 25 is connected to an outlet 22 of the leaching reactor 20. The residue separator 25 is arranged for separating insoluble residues 8 from the ash leaching reactor 20. A first leach solution 26 is thereby formed. The first leach solution 26 has a mole ratio of phosphorus to a sum of ferric iron and aluminium.

The system 2 for concentration of phosphate compounds further comprises means 30 for controlling the mole ratio to be larger than 1, preferably larger than 1.6. The means 30 for controlling the mole ratio preferably comprises inlets of additional phosphorous containing material. In one particular embodiment, the means 30 for controlling the mole ratio comprises an inlet of additional raw material 31 into the stream of raw material 4 and provides phosphorous containing raw material that together with the raw material 4 gives a ratio larger than 1, preferably larger than 1.6, in the first leach solution 26. In another particular embodiment, the means 30 for controlling the mole ratio comprises an inlet of additional material 32 and provides phosphorous containing material directly into the ash leaching reactor 20 that together with the raw material 4 gives a ratio larger than 1, preferably larger than 1.6, in the first leach solution 26. In yet another particular embodiment, the means 30 for controlling the mole ratio comprises an inlet of additional ion substances 33 and provides phosphorous containing substances directly into the first leach solution 26 that gives a ratio larger than 1, preferably larger than 1.6, in the first leach solution 26. In an additional particular embodiment, the means for controlling the mole ratio comprises the provision of phosphate ions in the recirculating acid solution by not removing phosphorus completely from the recirculating solution.

A base mixing arrangement 40 is connected after an outlet from the residue separator 25. The base mixing arrangement 40 is arranged for adding a base 6, in some embodiments preferably lime, to the first leach solution 26 through an inlet 41. The addition of the base 6 causes precipitation of phosphate compounds comprising iron and/or aluminium from the leach solution within the base mixing arrangement 40. A phosphate separator 45 is connected to an outlet 42 of the base mixing arrangement 40. The phosphate separator 45 is arranged for removing the precipitated phosphate compounds 10 from the leach solution through a precipitated phosphate compound outlet 44. The remaining leach solution 46 is in some embodiments substantially free from phosphate. However, in alternative embodiments, phosphorus precipitation is not carried out to completeness as discussed before, which leaves some phosphate ions to be recirculated in the remaining acid solution.

A sulphur mixing arrangement 50 is connected after an outlet 47 for the leach solution 46 from the phosphate separator 45. The sulphur mixing arrangement 50 is arranged for adding sulphuric acid 7 to the leach solution 46 through an inlet 51. The sulphuric acid addition causes precipitation of sulphate compounds, typically gypsum. A sulphate separator 55 is connected to an outlet 52 of the sulphur mixing arrangement 50. The sulphate separator 55 is arranged for separating the precipitated sulphate compounds 9 from the leach solution 56 through a precipitated sulphate compound outlet 54.

A recycling arrangement 60 is connected between an outlet 57 of the sulphate separator 55 and the inlet 24 for providing acid to the ash leaching reactor 20. The recycling arrangement 60 is arranged for recycling at least a part of the leach solution 56 from the sulphate separator 55 as recycled dissolving acid 61. Any losses of hydrochloric acid during the process are made up by an additional provision of preferably hydrochloric acid 5, however, any mineral acid can be used for this purpose.

According to the present disclosure, there are several detailed processing options for sludge ash depending on ash type, desired products, and way of separating heavy metals. Several examples are given below in accordance with different embodiments.

First some examples are described, based on ash originating from sludge in which ferrous iron was used as a precipitation chemical. Ash B (c.f. Table 1) was obtained from mono-incineration of sludge in which ferrous iron was used as a precipitation chemical. It was surprisingly found that even though incineration at 800-1100° C. oxidized organic matter effectively, substantial amount of ferrous iron remained in the ash. Ferrous iron did not oxidize completely into ferric iron during incineration.

Returning to FIG. 3 as a reference, the ash 29 is dissolved in hydrochloric acid 23. The liquid to solid ratio is preferably between 2 l/kg and 15 l/kg, more preferably between 5 l/kg and 7 l/kg. The concentration of hydrochloric acid 23 is set to obtain a pH level which is below pH 2, and more preferably below pH 1.5. Dissolution takes place at room temperature. Dissolution time is usually between 15 and 120 minutes. After dissolution, the insoluble material 8 is separated by a suitable solid/liquid separation technique such as filtration, decantation, centrifugation, etc. in the residue separator 25.

The P/[Fe+Al] mol ratio in the obtained ash leach solution 26, in the present example regarding ash B, is above 1, and a main part of the iron is in ferrous form. This means that the ash leach solution 26 will not form any gel upon lime addition. Therefore, there is no need to add a phosphorus source 32 to the ash leaching reactor 20. The means 30 for controlling the mole ratio typically just supervises the leach solution 26.

There are several alternatives for processing ash B, according to the present disclosure, e.g. depending on way of separating heavy metals, pH used for phosphorus precipitation, and way of recovering ferrous iron. Some different possibilities are discussed in the following.

Table 4 shows elemental composition of solutions formed by dissolving ash B in hydrochloric acid and adjusting the pH with lime ($Ca(OH)_2$). From Table 4 it can be seen that complete precipitation of phosphorus cannot be achieved at pH 3.5. Only about 60% of phosphorus precipitates at pH 3.5, since a main part of iron is in ferrous form. The precipitate at pH 3.5 is composed of mainly iron phosphate and aluminium phosphate having a phosphorus content of about 20% by weight (see table 5).

Table 4 further shows that at a higher pH, of above 5, phosphorus is completely precipitated. At pH of about 5, the precipitate is composed of mainly calcium phosphate and ferrous phosphate with a phosphorus content of about 16.5% (see table 5). It was surprisingly found that above pH 3.5, phosphorus is preferentially precipitated in form of calcium phosphate compared to ferrous phosphate (see table 5, precipitate composed of 24% Ca and 4.5% iron). It is therefore possible to precipitate phosphorus with ferric iron, aluminium and calcium leaving dissolved ferrous iron in solution. Table 4 further shows that if the pH is additionally increased to about pH 7, remaining ferrous iron is then completely precipitated. The precipitate is then composed of mainly ferrous hydroxide (see Table 5).

TABLE 4

Elemental composition of leach solution (g/L) obtained by dissolving sludge ash (B) in hydrochloric acid and thereafter adjusting pH with lime.

| pH | Al | Mn | Fe | Na | Mg | P | S | K | Ca |
|---|---|---|---|---|---|---|---|---|---|
| 1.5 | 0.64 | 0.23 | 3.63 | 0.44 | 1.11 | 5.01 | 0.37 | 1.14 | 8.12 |
| 3.5 | 0.00 | 0.20 | 2.21 | 0.42 | 1.12 | 2.10 | 0.36 | 0.87 | 13.91 |
| 5.4 | 0.00 | 0.16 | 1.62 | 0.41 | 1.12 | 0.01 | 0.28 | 0.85 | 12.79 |
| 7.16 | 0.00 | 0.09 | 0.07 | 0.42 | 1.06 | 0.05 | 0.28 | 0.88 | 13.89 |

TABLE 5

Elemental composition of precipitates (% of weight) obtained by dissolving sludge ash (B) in hydrochloric acid and thereafter adjusting pH with lime.

| pH | Al | Mn | Fe | Na | Mg | P | S | K | Ca |
|---|---|---|---|---|---|---|---|---|---|
| at 3.5 | 4.81 | 0.18 | 9.46 | 0.11 | 0.25 | 21.44 | 0.01 | 1.91 | 6.92 |
| 3.5-5.4 | 0.00 | 0.24 | 4.53 | 0.11 | 0.12 | 16.42 | | 0.03 | 24.03 |
| 5.4-7.16 | 0.00 | 0.75 | 17.13 | 0.11 | 0.36 | 0.61 | | 0.03 | 2.57 |

In that manner, there are generally three different alternatives for precipitating phosphorus according to pH. The first alternative is to precipitate phosphorus at a pH of 2-3.5 without significant co-precipitation of heavy metals. The second alternative is to precipitate phosphorus completely at pH ≤5. In that case the precipitation occurs with significant co-precipitation of heavy metals (if heavy metals are not removed before precipitation). The third alternative is to precipitate phosphorus in two fractions: a) at pH 2-3.5 without significant co-precipitation of heavy metals, and b) at pH<3.5-5 with co-precipitation of heavy metals. After precipitation of phosphorus, remaining ferrous iron can be recovered by precipitation with lime at pH of about 7 in form of ferrous hydroxide.

Different approaches for removing the heavy metals are discussed further above.

Figure 4:
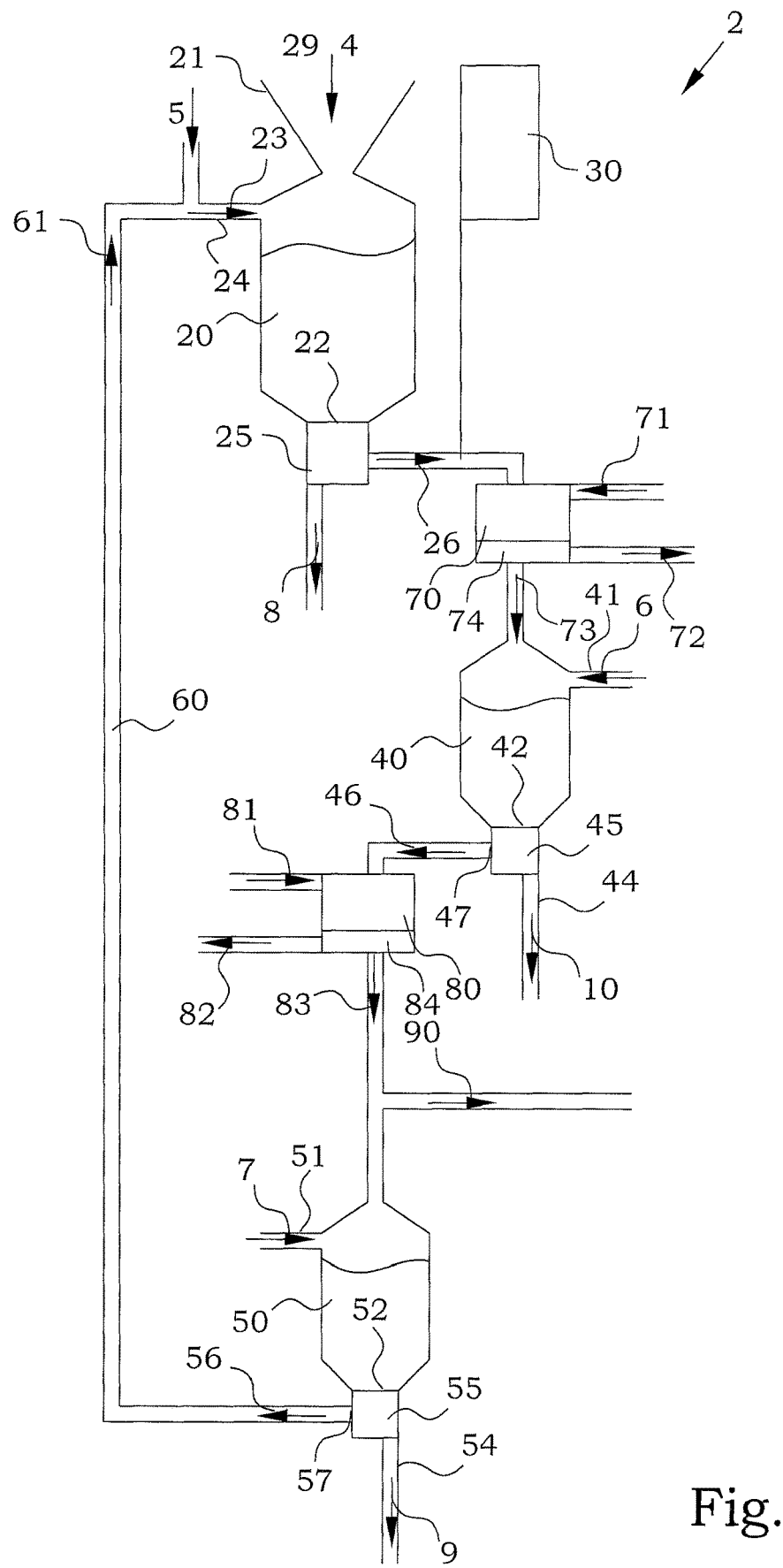
FIG. 4 is a block scheme of another embodiment of a concentrator arrangement.

In a particular embodiment, phosphorous precipitation at pH ≤5 and recovery of ferrous iron are considered, with reference to FIG. 4. The ash is dissolved in hydrochloric acid and insoluble material is separated in the ways described further above.

In this embodiment, a sulphide source 71, such as sodium sulphide, is added to the leach solution 26 in a heavy metal removing arrangement 70, resulting in the precipitation of heavy metal sulphides 72. The heavy metal sulphides 72 are separated from the leach solution 73 by a suitable solid/liquid separator 74.

In FIG. 5A, a flow diagram of steps of this embodiment is illustrated. The flow starts from step 210 in FIG. 2. In step 212 sulphide is added to the leach solution to precipitate heavy metal sulphides. The precipitated heavy metal sulphides are separated from the leach solution in step 213. The flow then continues with step 220. In other words, the steps of adding sulphide 212 and separating 213 the precipitated sulphides are performed before the step of adding a base 220 to the first leach solution. Preferably, the added sulphide comprises sodium sulphide.

Thereafter, with reference to FIG. 4 and FIG. 2, a base 6, in this embodiment lime, is added to the filtered leach solution. In the present embodiment, the amount of base 6 is selected to adjust the pH to a level of pH<7, preferably pH<5. Phosphorus precipitates as a mixture of iron phosphate, aluminium phosphate and calcium phosphate. The precipitated phosphorus 10 is separated from the solution by a suitable solid/liquid separator such as the phosphate separator 45.

In the present embodiment, with reference to FIG. 4, the leach solution 46, after phosphorus separation, is treated with an additional base. To this end, lime 81 is added into a ferrous iron removing arrangement 80 to adjust the pH to a level above pH 5, and of pH<12 preferably pH<7. Remaining dissolved ferrous iron then precipitates mainly as ferrous hydroxide 82 which is separated from the remaining leach solution 83 by a suitable solid/liquid separator 84. Recovered ferrous hydroxide 82 can thereafter (not shown) be dissolved in sulphuric acid or hydrochloric acid forming ferrous sulphate or ferrous chloride suitable for use as phosphorus precipitation chemical in wastewater treatment plants.

In FIG. 5B, a flow diagram of steps of this part embodiment is illustrated. The flow starts from step 225 of FIG. 2. In step 226 additional base, e.g. lime, is added to the leach solution to precipitate ferrous hydroxide, or as an alternative ferrous phosphate. The addition is made after the step of removing the precipitated phosphate compounds, and in an amount giving the first leach solution a pH between 4 and 11. The precipitated ferrous hydroxide (or ferrous phosphate) is separated from the leach solution in step 227. The main flow then continues with step 238 and/or 240. In step 230, the separated ferrous hydroxide is dissolved in sulphuric acid or hydrochloric acid.

In an alternative embodiment for recovering ferrous iron, an oxidant, such as hydrogen peroxide, is added to the filtered leach solution directly after phosphorus precipitation. Dissolved ferrous iron is thereby oxidized to ferric iron, which is precipitated at the lower pH as ferric hydroxide, which can be separated from the solution by a suitable solid/liquid separator. Recovered ferric hydroxide can thereafter be dissolved in sulphuric acid or hydrochloric acid forming ferric sulphate or ferric chloride suitable for use as phosphorus precipitation chemical in wastewater treatment plants. A similar arrangement as in FIG. 4 can be used for this alternative.

Figure 5C:
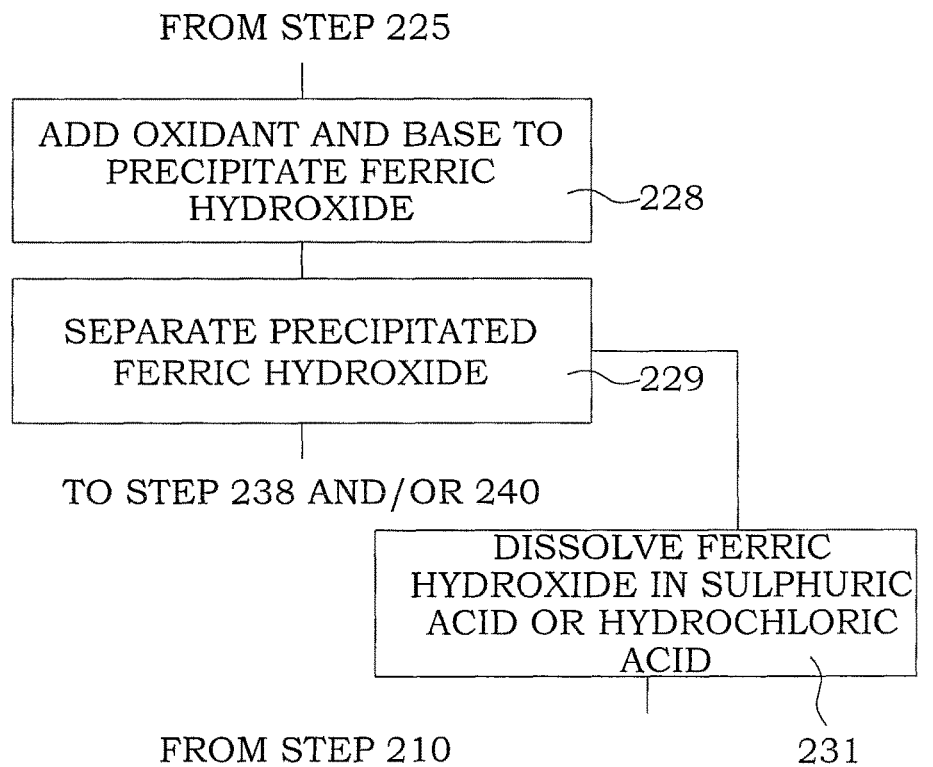

The alternative is also described in FIG. 5C, where a flow diagram of steps of this part embodiment is illustrated. The flow starts from step 225 of FIG. 2. In step 228 an oxidant is added to the leach solution to oxidize ferrous iron into ferric iron, which subsequently is precipitated as ferric hydroxide. The precipitated ferric hydroxide is separated from the leach solution in step 229. The main flow then continues with step 238 and/or 240. In step 231, the separated ferric hydroxide is dissolved in sulphuric acid or hydrochloric acid.

The leach solution 83 after separation of phosphorus, aluminium, ferric and ferrous iron is composed of calcium chloride with low concentration of other ions such as Mg, Na, K, etc. Any build-up of high concentration of the other ions such as Mg, Na, K, etc. is prevented by removing ions in a bleed 90 from the circulating liquid.

In FIG. 5D, a flow diagram of steps of this part embodiment is illustrated. The flow starts from step 225, 227 or 229. In step 238 a bleed stream is deviated from the leach solution. Ions, such as Mg, Na, K, etc., are removed from the bleed stream in step 239. In a particular embodiment, lime is added to the first leach solution and/or the bleed solution, after the step of removing the precipitated phosphate compounds, in an amount causing magnesium hydroxide and/or manganese hydroxide to precipitate. The precipitated magnesium hydroxide and/or manganese hydroxide is separated from the first leach solution and/or the bleed solution.

Sulphuric acid 7 is as described above thereafter added to the leach solution in order to precipitate sulphate compounds 9, in this embodiment mainly calcium in form of gypsum, and to regenerate hydrochloric acid 61 for reuse for ash dissolution. The sulphate compounds 9, i.e. the gypsum, are separated from the leach solution 56. The obtained gypsum was found to be of very high quality. The gypsum can be used as filler material in paper industry, for production of gypsum boards, etc.

Figure 6:
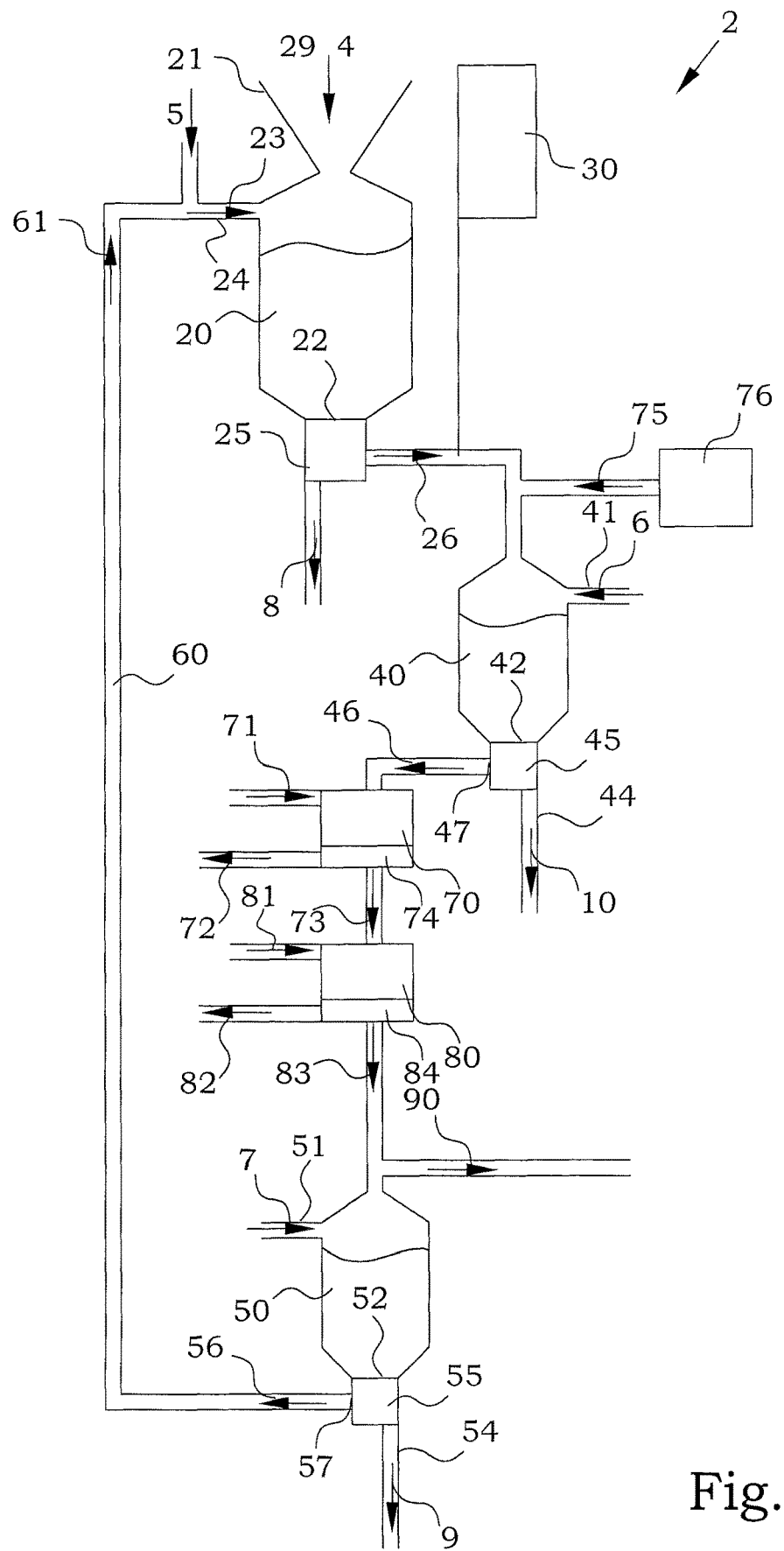
FIG. 6 is a block scheme of another embodiment of a concentrator arrangement.

In another particular embodiment, addition of ferric iron and phosphorous precipitation at pH<3.5 are considered, with reference to FIG. 6. The ash is dissolved in hydrochloric acid and insoluble material is separated in the ways described further above.

Thereafter, an ion adaptor flow 75, in this embodiment a ferric iron source, such as iron chloride, is added by an ion adaptor 76 to the leach solution 26. The ferric iron source 75 is added in an amount sufficient to precipitate the main part of phosphorus at a pH of <3.5 but in an amount less than that will lead to gel formation upon lime addition.

Figure 7A:
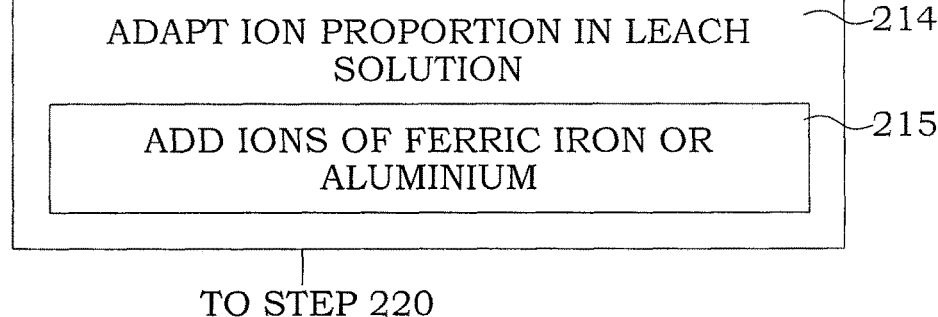
FIG. 7A-B are part flow diagrams of embodiments of methods for concentration of phosphate compounds.

In FIG. 7A, a flow diagram of steps of this embodiment is illustrated. The flow starts from step 210. In step 214 an ion proportion in the leach solution is adapted so that a main part of the phosphorus precipitates at a pH of <3.5 while maintaining the earlier discussed mole ratio above 1. In other words, the method comprises a step of adapting an ion proportion in the first leach solution, whereby a ratio between cations precipitable as phosphate compounds and phosphate ions is increased when a phosphate mole content in the first leach solution is higher than a mole amount expected to be precipitated in the step of adding a base to the first leach solution, keeping the mole ratio to be larger than 1. In this embodiment, step 214 comprises the step 215 of adding ions of ferric iron or aluminium into the leach solution before the step of adding a base to the first leach solution. The flow then continues with step 220.

Returning to FIG. 6, a base 6, in this embodiment lime, is thereafter added to the leach solution to adjust the pH. In this embodiment the pH is adjusted to a level of pH 2-3.5, preferably pH 2-3. Phosphorus then precipitates mainly in form of iron phosphate and aluminium phosphate without significant co-precipitation of heavy metals and calcium. The precipitated phosphorus 10 is separated from the leach solution 46.

Table 6 shows elemental composition of solutions formed by dissolving ash B in hydrochloric acid, adding ferric chloride and adjusting the pH with lime ($Ca(OH)_2$). From Table 6 it can be seen that by adding ferric iron, the major part of phosphorus can precipitate already at pH 2.78 together with ferric iron and aluminium.

TABLE 6

Elemental composition (g/l) of leach solution obtained by dissolving sludge ash (B) in hydrochloric acid followed by addition of ferric chloride and thereafter adjustment of pH with lime.

| pH | Al | Mn | Fe | Na | Mg | P | S | K | Ca | Notes |
|---|---|---|---|---|---|---|---|---|---|---|
| 1.5 | 1.98 | 0.05 | 8.60 | 0.48 | 1.28 | 9.88 | 0.44 | 0.29 | 9.15 | |
| 0.97 | 2.00 | 0.07 | 14.15 | 0.49 | 1.28 | 10.01 | 0.44 | 0.29 | 9.25 | * |
| 2.78 | 0.00 | 0.06 | 6.20 | 0.43 | 1.33 | 1.58 | 0.44 | | 16.96 | |
| 10.87 | 0.00 | 0.00 | 0.00 | 0.36 | 0.00 | 0.00 | 0.19 | | 20.79 | |

* after Fe(III) addition.

In this embodiment, a sulphide source 71, such as sodium sulphide, is added to the leach solution 46, after precipitation of phosphate compounds, in a heavy metal removing arrangement 70, resulting in the precipitation of heavy metal sulphides 72. The heavy metal sulphides 72 are separated from the leach solution 73 by a suitable solid/liquid separator 74. This heavy metal removing arrangement 70 resembles the heavy metal removing arrangement in FIG. 4, but is arranged in another part of the system, i.e. after the precipitation of phosphate compounds.

Figure 7B:
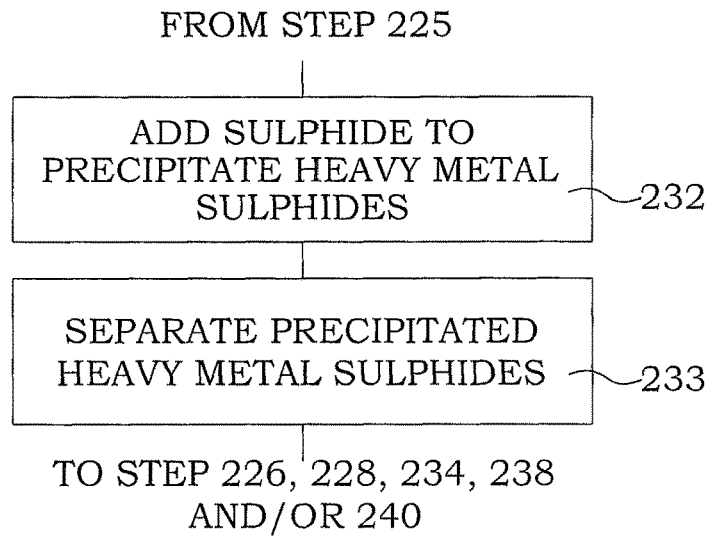

In FIG. 7B, a flow diagram of steps of this embodiment is illustrated. The flow starts from step 225. In step 232 sulphide is added to the leach solution to precipitate heavy metal sulphides. The precipitated heavy metal sulphides are separated from the leach solution in step 233. The flow then continues with step 226, 228, 234, 238 or 240. In other words, the steps of adding sulphide 232 and separating 233 the precipitated sulphides are performed after the step of removing 235 the precipitated phosphate compounds from the first leach solution. As mentioned before, the step of adding 220 a base to the first leach solution is controlled to give a pH in the range between 2 and 3.5, counteracting co-precipitation of heavy metal phosphate compounds, and the heavy metals can thus be taken care of after the phosphate precipitation.

After separation of heavy metals the remaining process can be performed in analogy with the procedures as discussed in connection with FIG. 4.

In another particular embodiment, addition of aluminium and phosphorous precipitation at pH<3.5 are considered. FIG. 6 is used as a reference, since most parts are the same, and only differences are discussed.

Dissolution and separation of insoluble material is made as described above.

Thereafter, an ion adaptor flow 75, in this embodiment an aluminium source, such as aluminium chloride, is added to the leach solution 26. The aluminium source 75 is, in analogy with previous embodiment, added in an amount sufficient to precipitate the main part of phosphorus at a pH of <3.5 but in an amount less than that will lead to gel formation upon lime addition. FIG. 7A is applicable also to this embodiment.

Lime is thereafter added to the leach solution as in the previous embodiment.

TABLE 7

Elemental composition (g/l) of leach solutions and of precipitates (% of weight) formed after dissolving sludge ash (B) in hydrochloric acid followed by addition of aluminium chloride and thereafter adjustment of pH with lime.

| Elemental composition of leach solution (g/l) | | | | | | | | | | |
|---|---|---|---|---|---|---|---|---|---|---|
| pH | Al | Mn | P | S | K | Ca | Fe | Na | Mg | Notes |
| 1.06 | 4.31 | 0.06 | 8.67 | 0.40 | 0.43 | 8.90 | 8.17 | 0.57 | 1.17 | * |
| 3.53 | 0.00 | 0.05 | 1.22 | 0.40 | 0.17 | 16.85 | 5.93 | 0.52 | 1.23 | |
| 11.7 | 0.00 | 0.00 | 0.00 | 0.27 | 0.12 | 20.87 | 0.00 | 0.41 | 0.00 | |

| Elemental composition of precipitates (% of weight) | | | | | | | | | |
|---|---|---|---|---|---|---|---|---|---|
| pH | Al | Mn | P | S | K | Ca | Fe | Na | Mg |
| at 3.53 | 10.57 | 0.01 | 19.49 | 0.02 | 0.48 | 3.00 | 6.49 | 0.01 | 0.00 |
| 3.53-11.7 | 0.07 | 0.20 | 4.20 | 0.37 | 0.08 | 12.02 | 21.11 | 0.21 | 4.65 |

* after Al addition.

Table 7 shows elemental composition of solutions formed by dissolving ash B in hydrochloric acid, adding aluminium chloride and adjusting the pH with lime (Ca(OH)$_2$). From Table 7 it can be seen that by adding aluminium the major part of phosphorus can precipitate already at pH 3.5 together with aluminium and ferric iron.

Separation of heavy metals, recovery of ferrous iron, precipitation of calcium in form of gypsum, leach removal of Mg, Na, K, etc. and regeneration hydrochloric acid for reuse for ash dissolution is performed according to previously presented processes.

Figure 8:
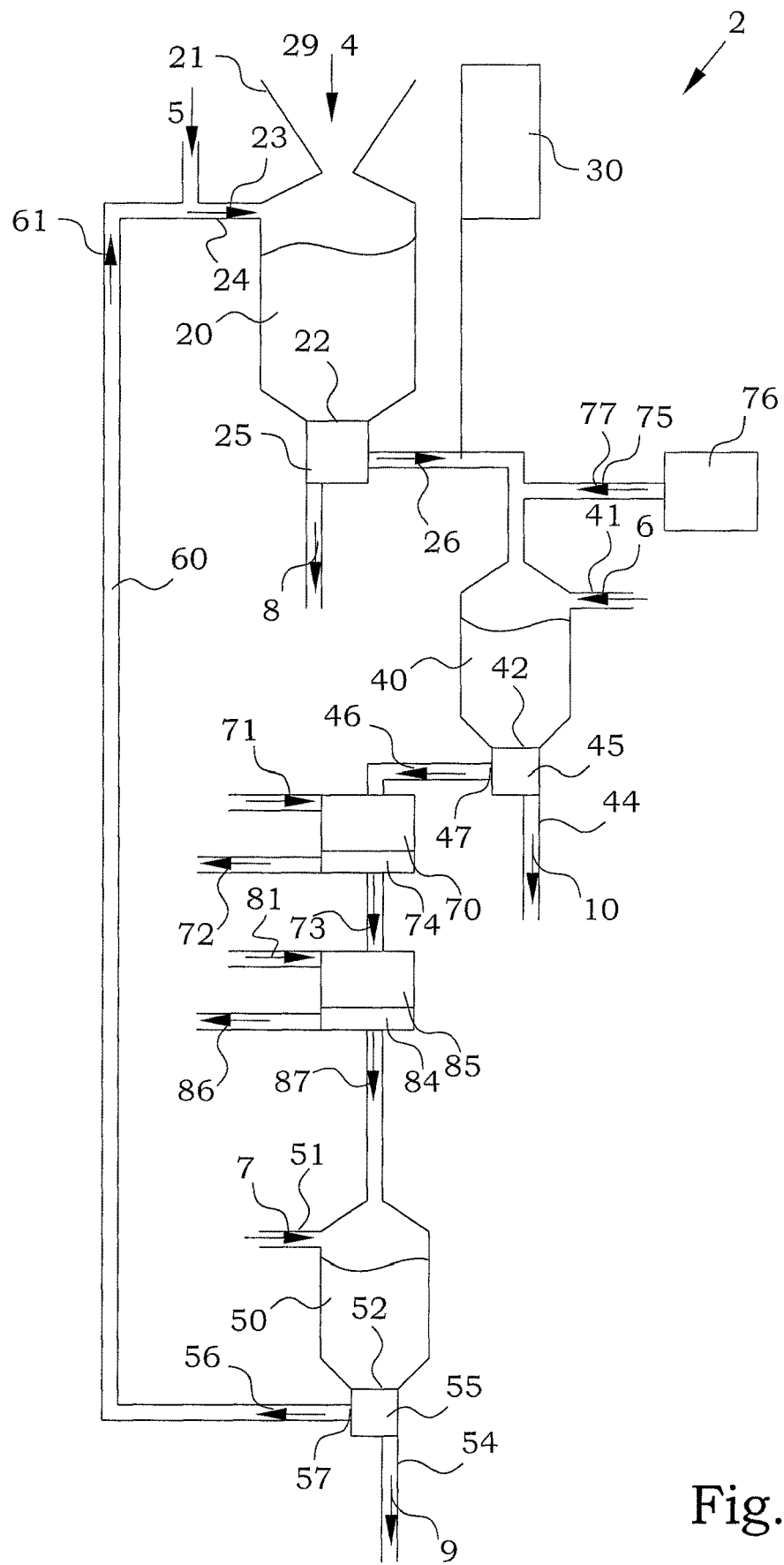
FIG. 8 is a block scheme of another embodiment of a concentrator arrangement.

In another particular embodiment, addition of hydrogen peroxide and phosphorous precipitation at pH<3.5 are considered, with reference to FIG. 8.

Dissolution and separation of insoluble material is made as described above.

Thereafter, an ion adaptor flow 75, in this embodiment an oxidant 77, such as hydrogen peroxide, is added to the leach solution 26. The oxidant 77 is, in analogy with previous embodiment, added in an amount sufficient to oxidize ferrous iron into ferric iron so that the main part of phosphorus precipitate at a pH of <3.5 but in an amount less than that will lead to gel formation upon lime addition. In acidic solutions $Fe^{2+}$ is oxidized to $Fe^{3+}$ very efficiently according to the following chemical equation:

$$2Fe^{2+} + H_2O_2 + 2H^+ \rightarrow 2Fe^{3+} + 2H_2O$$

Consumption of hydrogen peroxide for ash B was found to be in the order of 2 ml 30% $H_2O_2$ per litre ash leach solution.

In FIG. 9, a flow diagram of steps of this embodiment is illustrated. The flow starts from step 210. In step 214 an ion proportion in the leach solution is adapted so that a main part of the phosphorus precipitates at a pH of <3.5 while maintaining the earlier discussed mole ratio above 1. In this embodiment, step 214 comprises the step 216 of adding oxidants to the first leach solution before the step of adding a base to the first leach solution to oxidize ferrous iron into ferric iron. The flow then continues with step 220. The oxidant preferably comprises hydrogen peroxide.

Lime is thereafter added to the leach solution as in the previous embodiments.

Table 8 shows elemental composition of a solution formed by dissolving ash B in hydrochloric acid, adding hydrogen peroxide and adjusting the pH to pH 3.19 with lime (Ca(OH)$_2$), as well as, elemental composition of the precipitate formed at pH 3.19. From Table 6 it can be seen that by adding hydrogen peroxide the major part of phosphorus can precipitate already at pH 3.19 together with ferric iron and aluminium. The heavy metal content in the intermediate precipitate is low as can be seen in Table 9.

TABLE 8

Elemental composition of leach solution (g/l) and of precipitate (% of weight) formed after dissolving sludge ash (B) in hydrochloric acid followed by addition of hydrogen peroxide and thereafter adjustment of pH with lime.

| pH | Al | Mn | Fe | Na | Mg | P | S | K | Ca |
|---|---|---|---|---|---|---|---|---|---|
| Elemental composition of leach solution (g/l) | | | | | | | | | |
| 3.19 | 0.00 | 0.04 | 0.00 | 0.42 | 0.99 | 0.68 | 0.35 | 0.12 | 12.10 |
| Elemental composition of precipitate (% of weight) | | | | | | | | | |
| at 3.19 | 2.29 | 0.01 | 15.35 | 0.09 | 0.07 | 15.21 | 0.03 | 0.59 | 1.29 |

TABLE 9

Content of heavy metals in phosphorus precipitate from sludge ash at pH = 3.3 compared with mean heavy metal content in Swedish sewage sludge (mg/kg P).

| Element | Precipitate | Sludge |
|---|---|---|
| Cu | 164 | 12087 |
| Zn | 76 | 19621 |
| Ni | 14 | 609 |
| Cd | 0.02 | 29 |

Separation of heavy metals, precipitation of calcium in form of gypsum, leach removal of Mg, Na, K, etc. and regeneration hydrochloric acid for reuse for ash dissolution can be performed according to previously presented processes.

Since no ferrous iron remains after the precipitation of the phosphate compounds, build-up of high concentration of other ions such as Mg, Mn, Na, K, etc. can as mentioned above be prevented by removing ions in a bleed from the circulating liquid. Alternatively, as illustrated in FIG. 8, ions can be removed by precipitation with lime. After precipitation of phosphorus 10 at pH<3.5 and possible heavy metal removal, it is possible to increase the pH successively. Lime 81 is added into a build-up ion removing arrangement 85. At a pH level of about 7 (see Table 4), Mn precipitates selectively. The lime requirement for reaching pH 7 is relatively low since the main neutralization of the acid has already been done. Thereafter, it is possible to precipitate Mg selectively at a pH level of >10 (see Table 7). Precipitated build-up ions 86 are removed from the leach solution 87 by a suitable solid/liquid separator 84.

Mn and Mg can also be selectively precipitated with lime and separated from the bleed, if that approach is used.

If complete phosphorus precipitation is not achieved, the bleed contains phosphorus. In that case, phosphorus can be precipitated from the bleed with addition of lime in form of calcium phosphate at a pH lower than 5. Mn and Mg can thereafter be recovered by lime precipitation at higher pH.

Another particular embodiment starts with an ash originating from sludge in which ferric iron was used as a precipitation chemical. Ash D was obtained from mono-incineration of sludge, in which ferric iron was used as a precipitation chemical. The P/[Fe+Al] mole ratio in the obtained ash leach solution in the present embodiment regarding ash D, is controlled to be above 1.6. This means that the ash leach solution will not form gel upon lime addition.

If the iron in the sludge ash is originally in a ferric form, the dissolution of ferric iron is usually below 10 percent which is usually not sufficient for complete phosphorus precipitation at pH<3.5. It is possible, of course, to add ferric iron or aluminium in order to precipitate most of the phosphorus at pH<3.5 as described in embodiments above. Additional alternatives of processing ash D are given in the following text.

Figure 10:
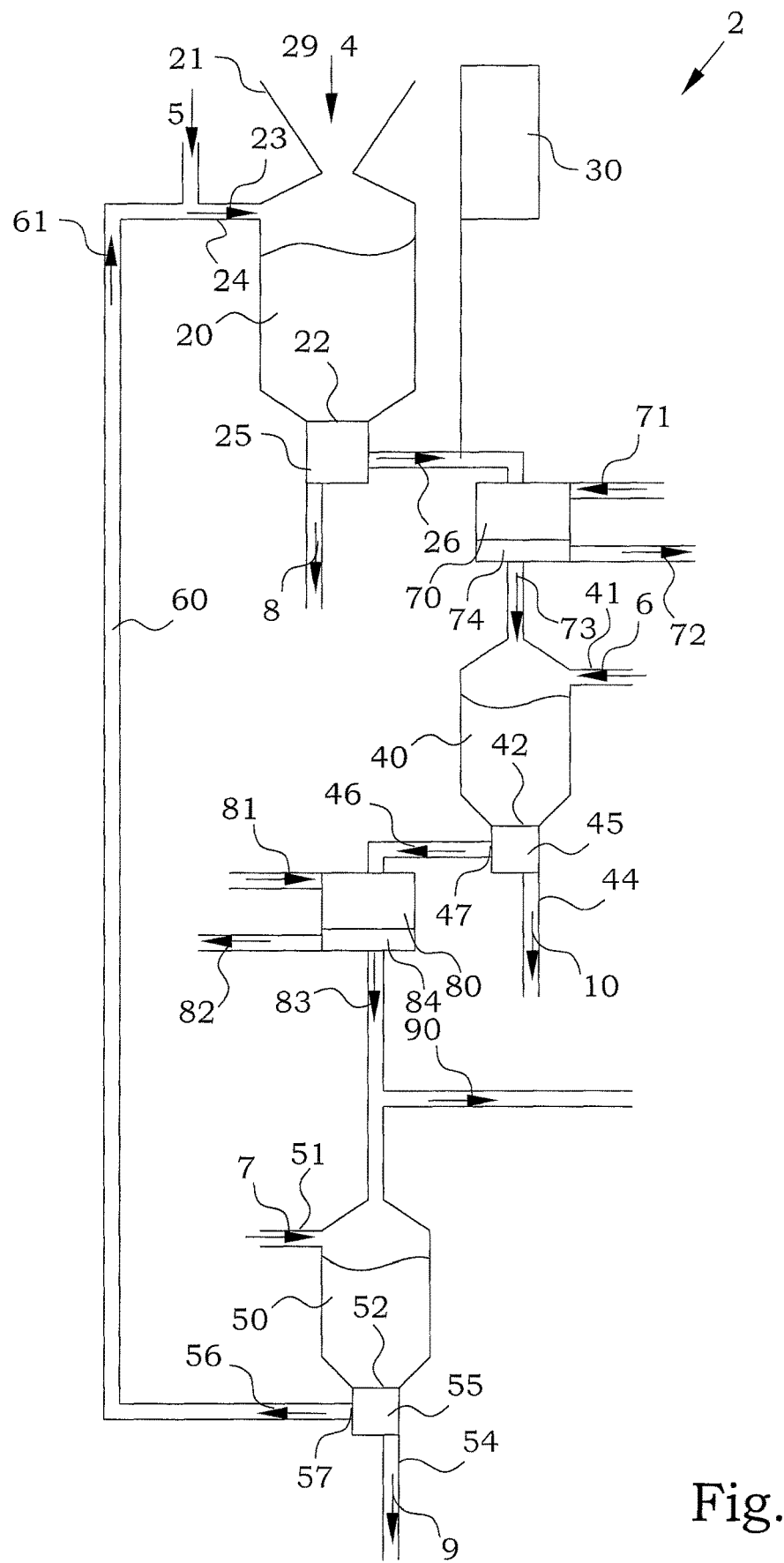
FIGS. 10-11 are block schemes of other embodiments of concentrator arrangements.

A particular embodiment concerns phosphorous precipitation at a pH of 4-7 in connection with FIG. 10.

The ash is dissolved in hydrochloric acid as before and insoluble material is separated.

A sulphide source 71, such as sodium sulphide, is added to the leach solution 26 resulting in the precipitation of heavy metal sulphides 72, as described in connection to FIG. 4.

Thereafter, lime 41 is in this embodiment added to the filtered leach solution 73 to adjust the pH to a level of pH 4-10, preferably pH 4-7. Phosphorus precipitates as a mixture of iron phosphate, aluminium phosphate and calcium phosphate. The precipitated phosphorus compounds 10 are separated from the solution by a suitable solid/liquid separator 45.

Table 10 shows the elemental composition of a precipitate formed by dissolving Ash D in hydrochloric acid and precipitating phosphorus with lime at pH 6.8.

TABLE 10

Elemental composition (% of weight) of precipitate formed after dissolving sludge ash (D) in hydrochloric acid followed by adjustment of pH to pH 6.8 with lime.
Elemental composition of precipitate (% of weight)

| pH | Al | Mn | Fe | Na | Mg | P | S | K | Ca |
|---|---|---|---|---|---|---|---|---|---|
| at 6.8 | 3.08 | 0.15 | 0.95 | 0.04 | 0.52 | 14.80 | 0.43 | 0.27 | 16.49 |

The solution after phosphorus precipitation at pH 4-7 is composed of mainly calcium chloride with low concentration of other ions such as Mg, Na, K, etc. Precipitation of calcium in form of gypsum, leach removal of Mg, Na, K, etc. and regeneration hydrochloric acid for reuse for ash dissolution can be performed according to previously presented processes.

Figure 11:
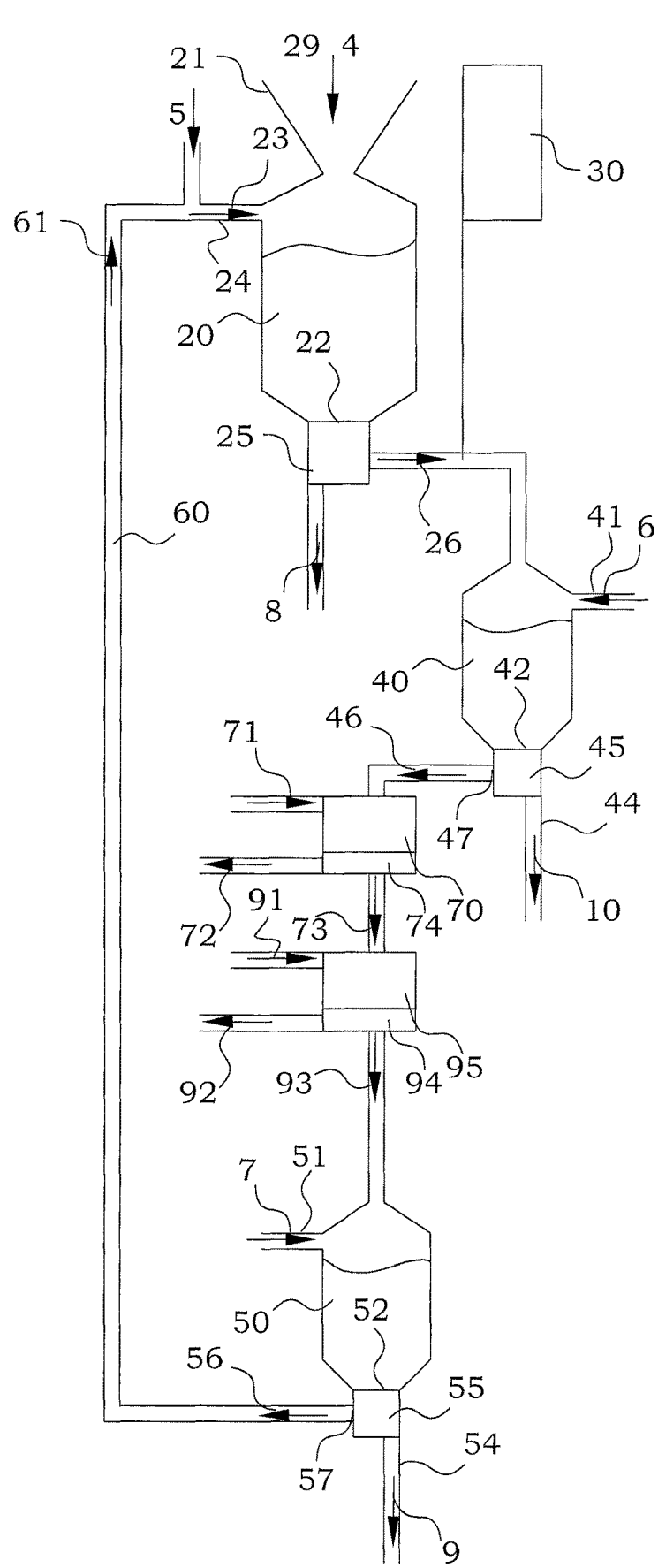

In another particular embodiment, phosphorous precipitation at pH <3.5 and at pH >3.5 are considered with reference to FIG. 11.

Dissolution and separation of insoluble material is made as described above.

Lime 41 is thereafter added to the leach solution 26 to adjust the pH to a level of pH 2-3.5, preferably pH 2-3. Phosphorus precipitates mainly in form of ferric phosphate and aluminium phosphate without significant co-precipitation of heavy metals and calcium. The precipitated phosphorus 10 is separated from the solution by a suitable solid/liquid separator 45.

A sulphide source 71 is used for removing heavy metals, in analogy with the process described in connection with FIG. 6.

After separation of heavy metals the solution is treated with an additional base. To this end, lime 91 is added into a calcium phosphate removing arrangement 95 to adjust the pH to a level above 3.5 and of pH<10 preferably pH<5. Remaining dissolved phosphorus precipitates mainly as calcium phosphate 92 which is separated from the leach solution 93 by a suitable solid/liquid separator 94. The calcium phosphate 92 can be used as feed phosphates or can be processed into fertilizers or phosphoric acid.

In FIG. 12, a flow diagram of steps of this part embodiment is illustrated. The flow starts from step 233. In step 234 additional base, preferably lime, is added to the leach solution to precipitate calcium phosphate. The precipitated calcium phosphate is removed from the leach solution in step 235. The main flow then continues with step 238 and/or 240. These steps can be performed on a part of the first leach solution after the step of removing the precipitated phosphate compounds or the entire stream. This can be performed by deviating at least a part of the first leach solution after the step of removing said precipitated phosphate compounds.

The solution after complete separation of phosphorus is composed of calcium chloride with low concentration of other ions such as Mg, Na, K, etc. Precipitation of calcium in form of gypsum, leach removal of Mg, Na, K, etc. and regeneration hydrochloric acid for reuse for ash dissolution is performed according to previously presented processes.

Ash may also originate from sludge in which aluminium was used as a precipitation chemical. Sludge ash which originates from aluminium use in the wastewater treatment plant has usually a low P/[Fe(III)+Al] mol ratio in the leach solution due to high solubility of aluminium in acid.

In many cases it is necessary to increase the phosphorus content in the leach solution in order to prevent gel formation during phosphorus precipitation with lime. With reference to FIG. 2 and FIG. 3, an increase of the phosphorus concentration in the leach solution 26 can be performed in step 215 by adding a phosphorus source, such as phosphoric acid, apatite, calcium phosphate, other P-containing sludge ash, etc. The phosphorus source, can also be precipitates of calcium phosphate or ferrous phosphate which are internally recycled. The phosphorus source can be added to the ash leaching reactor 20, either as additional raw material 31 constituting a part of the raw material 4, or as additional material 32 directly into the ash leaching reactor 20. Addition of the phosphorus source can be done to the ash before dissolution, during dissolution or after dissolution. The phosphorus source can even be added as additional ion substances 33 to the filtered leach solution 26. The further processing of the ash leachate can then be performed according to any of the previous described embodiments.

Table 11 shows elemental composition of phosphorus precipitates obtained when using hydrochloric acid for ash dissolution followed by lime precipitation according to the processes discussed above. From table 11 it can be seen that even in case of ash of co-incinerated sewage sludge with an initial phosphorus concentration <4%, the phosphorus concentration in the precipitate is high, about 18%. This high P content can be compared with P content of only about 6.5% obtained when sludge ash is dissolved in sulphuric acid and phosphorus precipitated with lime (table 12).

A main advantage of the part of the procedure according to the above description, i.e. the concentration of phosphorous compounds, is that it enables to use dilute hydrochloric acid (about 3% by weight) for ash dissolution and still obtaining a concentrated phosphorous product as intermediate product. Use of dilute acid for dissolution enables an easy filtration of the residue and precipitates due to a low viscosity as well as lower solubility for heavy metal precipitate at higher pH. A further advantage of using hydrochloric acid for sludge ash dissolution is that the weight of the residue is significantly reduced compared to the original weight of the ash. The weight reduction is usually somewhat below 50 percent. In contrast, when using sulphuric acid for ash dissolution, the weight of the residue is usually larger than the original weight of the ash due to incorporation of gypsum into the residue.

Table 11 further shows that phosphorus precipitation with metals (Fe or Al) from ash leachate is not stoichiometric. The mole ratio of P/(Fe+Al) in the precipitates is higher than 1 and in some cases even higher than 2. This means that the precipitate contains more phosphorus than the stoichiometric content in iron phosphate ($FePO_4$) or aluminium phosphate ($AlPO_4$). This is probably due to formation of precipitates with higher P/Fe mole ratio such as $Fe_2(HPO_4)_3$, etc.

However, as briefly discussed above, a product composed of iron phosphate or aluminium phosphate, even with low content of heavy metals, is not suitable for direct use as a fertilizer or feed supplement. The main reason is that iron phosphate and aluminium phosphate have low water-solubility and thus cannot release phosphorus at rates sufficient for crops when used as a fertilizer. Furthermore, such an intermediate product cannot be processed by the phosphate industry due to a too high metal content.

TABLE 11

Elemental composition of phosphorus precipitates obtained after sludge ash dissolution in hydrochloric acid followed by phosphorus precipitation with lime.

| Origin (ash) | Acid for dissolution | Additive | Precipitation chemical | pH | Al | Mn | Fe | Na | Mg | P | S | K | Ca |
|---|---|---|---|---|---|---|---|---|---|---|---|---|---|
| C | HCl | P | Ca(OH)$_2$ | 3.27 | 5.04 | 0.07 | 1.82 | 0.37 | 0.13 | 16.89 | 0.04 | 2.31 | 4.67 |
| C | HCl | P | Ca(OH)$_2$ | 1.94 | 5.40 | 0.00 | 5.14 | 0.12 | 0.04 | 19.45 | 0.04 | 2.11 | 0.70 |
| C | HCl | P | Ca(OH)$_2$ | 2.06 | 6.05 | 0.00 | 3.72 | 0.06 | 0.01 | 19.95 | 0.04 | 1.79 | 0.54 |
| A | HCl | P | Ca(OH)$_2$ | 2.97 | 6.41 | — | 1.97 | 0.07 | 0.01 | 20.21 | 0.41 | 0.53 | 2.69 |
| D | HCl | None | Ca(OH)$_2$ | 3.46 | 6.43 | 0.03 | 2.19 | 0.03 | 0.10 | 19.17 | 0.06 | 0.72 | 4.25 |
| B | HCl | Al | Ca(OH)$_2$ | 3.53 | 10.57 | 0.01 | 6.49 | 0.01 | 0.00 | 19.49 | 0.02 | 0.48 | 3.00 |
| B | HCl | Fe(III) | Ca(OH)$_2$ | 3 | 4.52 | 0.01 | 16.45 | 0.54 | 0.22 | 17.96 | 0.34 | 0.92 | 2.97 |
| B | HCl | H$_2$O$_2$ | Ca(OH)$_2$ | 3.19 | 2.29 | 0.01 | 15.35 | 0.09 | 0.07 | 15.21 | 0.03 | 0.59 | 1.29 |
| E | HCl | None | Ca(OH)$_2$ | 3.5 | 4.81 | 0.18 | 9.46 | 0.11 | 0.25 | 21.44 | 0.01 | 1.91 | 6.92 |
| E | HCl | None | Ca(OH)$_2$ | 2.68 | 5.87 | 0.03 | 7.94 | 0.01 | 0.03 | 20.98 | 0.06 | 1.48 | 1.47 |
| E | HCl | None | Ca(OH)$_2$ | 3.5 | 4.46 | 0.12 | 6.53 | 0.01 | 0.02 | 19.51 | 0.10 | 1.25 | 8.06 |
| E | HCl | None | Ca(OH)$_2$ | 3.88 | 2.87 | 0.12 | 4.54 | 0.01 | 0.02 | 18.16 | 0.29 | 0.78 | 13.27 |
| E | HCl | Fe(III) | Ca(OH)$_2$ | 3.16 | 1.94 | 0.07 | 13.53 | 0.09 | 0.23 | 12.90 | 0.10 | 1.28 | 4.15 |
| E | HCl | Fe(III) | Ca(OH)$_2$ | 3.05 | 2.15 | 0.02 | 15.53 | 0.02 | 0.03 | 14.47 | 0.02 | 1.25 | 1.04 |
| E | HCl | H$_2$O$_2$ | Ca(OH)$_2$ | 3.84 | 1.68 | 0.35 | 8.56 | 0.13 | 0.40 | 10.83 | 0.16 | 1.14 | 8.97 |
| E | HCl | H$_2$O$_2$ | Ca(OH)$_2$ | 3.3 | 2.61 | 0.10 | 12.75 | 0.08 | 0.08 | 13.81 | 0.04 | 1.15 | 1.78 |

TABLE 12

Elemental composition of phosphorus precipitate obtained after sludge ash (A) dissolution in sulphuric acid followed by phosphorus precipitation with lime. No additives.

| Origin | pH | Al | Mn | Fe | Na | Mg | P | S | K | Ca |
|---|---|---|---|---|---|---|---|---|---|---|
| A | 3.92 | 3.45 | — | 0.99 | 0.12 | 0.02 | 6.63 | 12.96 | 0.20 | 16.47 |

The intermediate phosphate product achieved from the previously described processes is therefore, as such, of low value. However, due to the high phosphorous content in the intermediate phosphate product, and the fact that it is provided as precipitated material, it is ideal for transporting purposes. It is therefore plausible that this form of intermediate phosphate product in a future may be a trade substance, e.g. produced by one actor and recovered by another.

According to the present ideas, the intermediate precipitate composed of mainly iron phosphate and aluminium phosphate, and possibly some calcium phosphate, is further processed into useful phosphorus products such as phosphoric acid or other phosphate salts such as ammonium phosphate, calcium phosphate, etc. Such compounds are valuable ingredients for production of high quality fertilizers or feed phosphates. This is achieved by the recoverer part 3 of the process according to FIG. 1.

There are several detailed alternatives for processing of the intermediate precipitate according to its composition and desired end products. Two main embodiments will be given in the following text, however, other alternatives are also possible. The first main embodiment is based on dissolution of the intermediate precipitate in an acid, and the other main embodiment is based on dissolution of the intermediate precipitate in a base.

Figure 13:
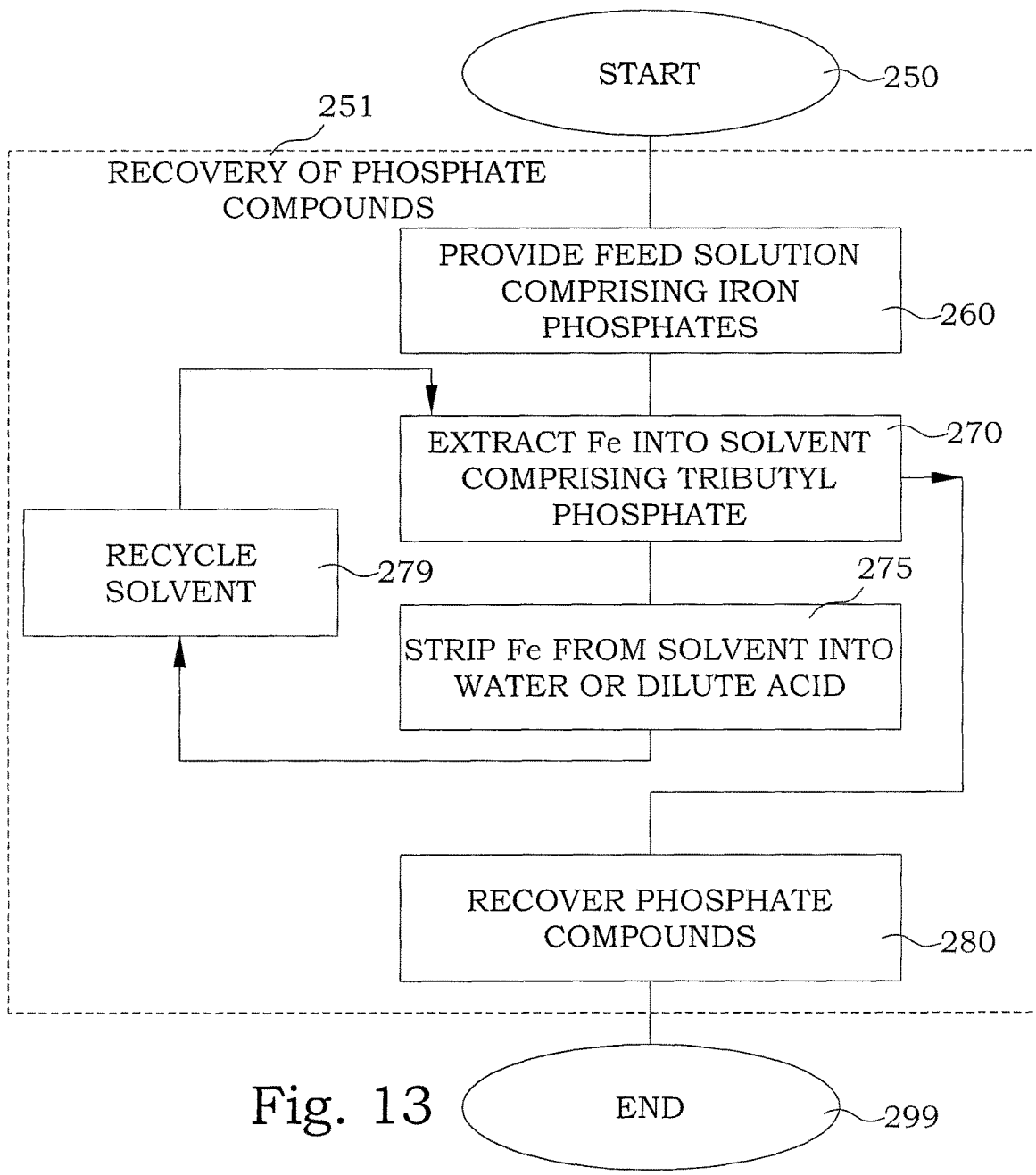
FIG. 13 is a flow diagram of steps of an embodiment of a method for recovery of phosphate compounds.

FIG. 13 illustrates a flow diagram of steps of an embodiment of a method for recovery of phosphate compounds based on the dissolution of the intermediate precipitate in an acid. The process starts in step 250. In step 260, a feed solution comprising iron phosphates is provided. In preferred embodiments, the feed solution is produced by dissolving the earlier mentioned precipitated phosphate compounds in hydrochloric acid. Iron is in step 270 extracted from the feed solution with a first organic solvent. The first organic solvent comprises tributyl phosphate, a modifier and a diluent. The first organic solvent has a first tributyl phosphate content between 5 and 60% of volume, preferably between 10 and 40% of volume.

Preferably, the modifier is dodecanol, more preferably in a concentration between 10 and 40% of volume. Preferably, the diluent is aliphatic kerosene. The extraction produces an iron depleted feed solution. The first organic solvent has a first tributyl phosphate content. In step 275, the extracted iron is stripped from the first organic solvent using water or a dilute acid. The first organic solvent is recycled in step 279 after the stripping, to be used for subsequent extracting 270 of iron. In step 280, the phosphate compounds are recovered from the iron depleted feed solution. The process ends in step 299. The entire block of steps 260-280 can be considered as an ensemble 251 of activities for recovery of phosphate compounds.

Figure 14:
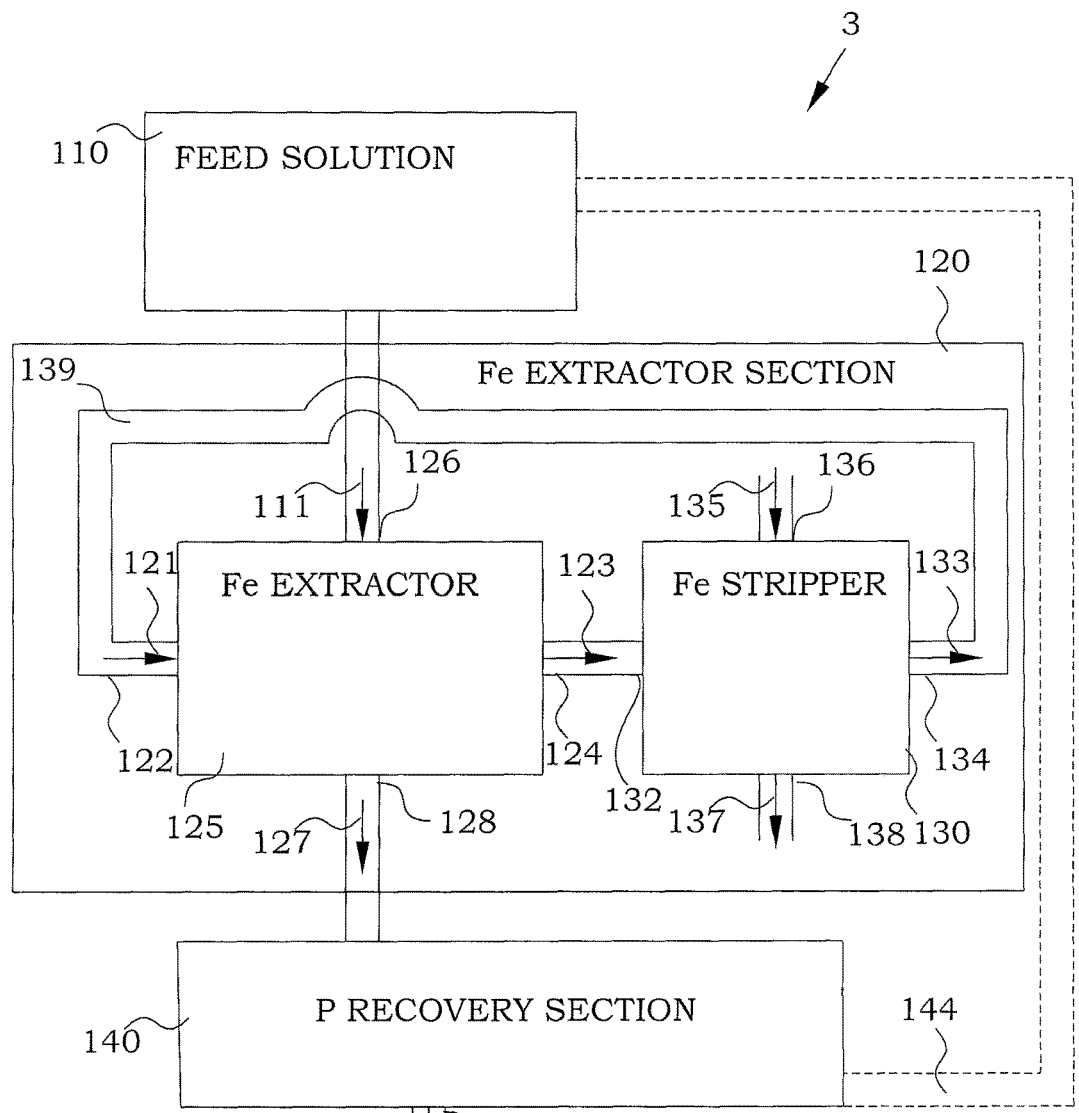
FIG. 14 is a block scheme of an embodiment of a recoverer arrangement.

In FIG. 14, a block diagram of parts of an embodiment of a system 3 for recovery of phosphate compounds is illustrated. The system 3 for recovery of phosphate compounds comprises an arrangement 110 for providing a feed solution 111 comprising iron phosphates, an iron extractor section 120 and a phosphate recovering section 140. The arrangement 110 for providing a feed solution preferably comprises means for dissolving the earlier described intermediate precipitated phosphate compounds by hydrochloric acid. Such arrangements are described more in detail in other embodiments below.

The iron extractor section 120 is connected to an outlet 112 from the arrangement 110 for providing a feed solution 111. The iron extractor section 120 is generally arranged for extracting iron from the feed solution 111 with a first organic solvent 121. This takes place in an iron extractor 125. The first organic solvent 121 comprises tributyl phosphate, a modifier and a diluent. The first organic solvent 121 has a first tributyl phosphate content. The feed solution 111 is provided to the iron extractor 125 through a first inlet 126. The first organic solvent 121 is provided to the iron extractor 125 through a second inlet 122. In the iron extractor 125, the iron ions are extracted from the feed solution 111 into the first organic solvent 121, thereby producing an iron depleted feed solution 127, provided at a first outlet 128 and an iron loaded first organic solvent 123 provided at a second outlet 124.

The iron extractor section 120 is further arranged for stripping the extracted iron from the iron loaded first organic solvent 123 in an iron stripper 130. The iron loaded first organic solvent 123 is provided at a first inlet 132. The iron stripper 130 is configured to use water or a dilute acid for the stripping action. To this end, water or a dilute acid 135 is provided at a second inlet 136. In the iron stripper 130, the iron ions are stripped from the iron loaded first organic solvent 123 into the strip liquid 135, comprising water or a dilute acid, thereby producing an iron depleted first organic solvent 133, provided at a first outlet 134 and an iron solution 137, comprising iron solved in water or dilute acid provided at a second outlet 138. The iron extractor section 120 is further arranged for recycling the iron depleted first organic solvent 133 after the stripping to be used as first organic solvent 121 for the extraction of iron.

The phosphate recovering section 140 is connected after the outlet 128 for the iron depleted feed solution 127 from the iron extractor section 125. The phosphate recovering section 140 is arranged for recovering the phosphate compounds 141, provided at an outlet 142, starting from the iron depleted feed solution 127. Preferred embodiments of the phosphate recovering section 140 are discussed more in detail below. In certain embodiments, at least parts of the remaining feed solution after recovering of phosphate compounds is recirculated to be used in the provision of the feed solution, as indicated by the broken pipe 144.

The possibilities for the systems for recovery of phosphate compounds are best understood by describing a number of preferred embodiments. Most parts of the processes are based on processing the intermediate precipitate with liquid-liquid extraction Even though it is of advantage to dissolve precipitated phosphate compounds for obtaining a concentrated feed solution for further processing, as will be described further below, there are other possible ways of obtaining a suitable feed solution to the recovery process.

For example, sludge ash can be dissolved in sulphuric acid and phosphorus can be precipitated with lime. The precipitate then contains iron/aluminium phosphate together with e.g. gypsum. The precipitate is thereafter dissolved in hydrochloric acid and acid-insoluble gypsum is removed by filtration, thus forming a feed solution with high phosphorus concentration suitable for further processing according to the general recovery process.

In another example, sludge ash is dissolved in hydrochloric acid in a way that directly results in a high phosphorous content in the leach solution. The leach solution is thereby directly suitable for further processing without forming an intermediate phosphorus precipitate.

In an additional example, industrial wastewater containing dissolved iron phosphate, e.g. obtained from treatment of iron metal with phosphoric acid, can constitute a suitable feed solution for further processing according to the recovery process.

Figure 15:
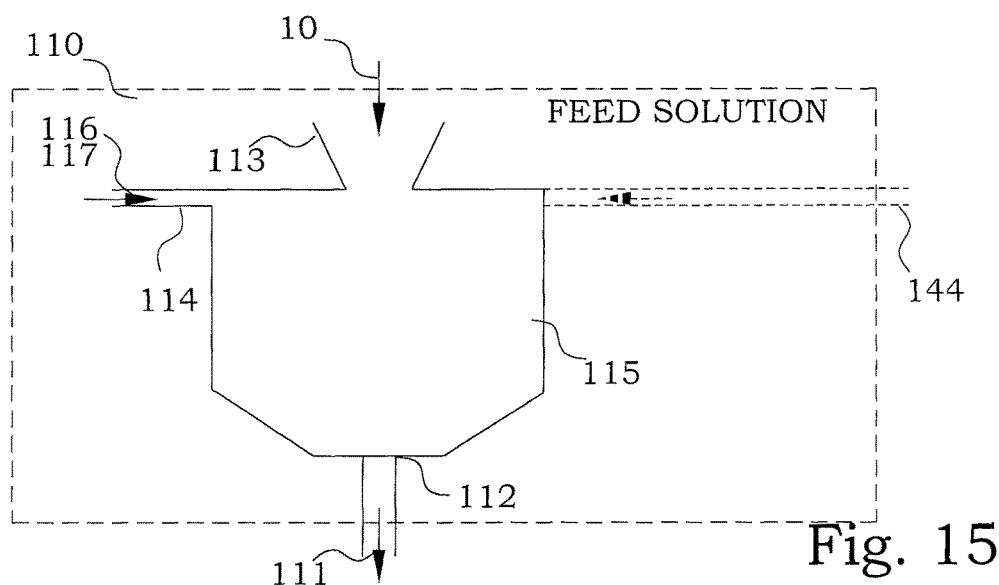
FIG. 15 is a partial block scheme of an embodiment of a recoverer arrangement.

Parts of one preferred embodiment are illustrated in a block scheme in FIG. 15. The phosphorus containing precipitate 10 is entered into a second leaching reactor 115 through a raw material inlet 113. A mineral acid 116, preferably hydrochloric acid 117, is entered into the second leaching reactor 115 through an acid inlet 114. The phosphorus containing precipitate 10 is dissolved in the mineral acid 116 forming a feed solution 111 provided through an outlet 112 for further processing in the iron extractor section 120. The leach solution is preferably pre-treated by filtration to remove insoluble matter, thus forming a feed solution with low solid content. Since the phosphorus content in the precipitate 10 is high, the concentration of hydrochloric acid during dissolution is preferably also high in an order of 3-6M.

Possible other additives may also be added through the pipe 144. It was found that it is of advantage for the subsequent liquid-liquid extraction process to have high calcium content in the feed solution 111. Calcium chloride acts as a salting out agent for both extraction of iron and extraction of phosphorus. According to a preferred embodiment, the calcium content in the feed solution 111 is increased by addition of calcium chloride source through the pipe 144. This will be discussed further below.

The liquid to solid ratio in the second leaching reactor 115 is preferably between 1 l/kg and 6 l/kg, more preferably between 2 l/kg and 4 l/kg. Dissolution takes typically place at room temperature. Dissolution time is usually between 15 and 120 minutes. The phosphorus content in the obtained feed solution 111 is between 0.2-3M, preferably higher than 1M.

Figure 16:
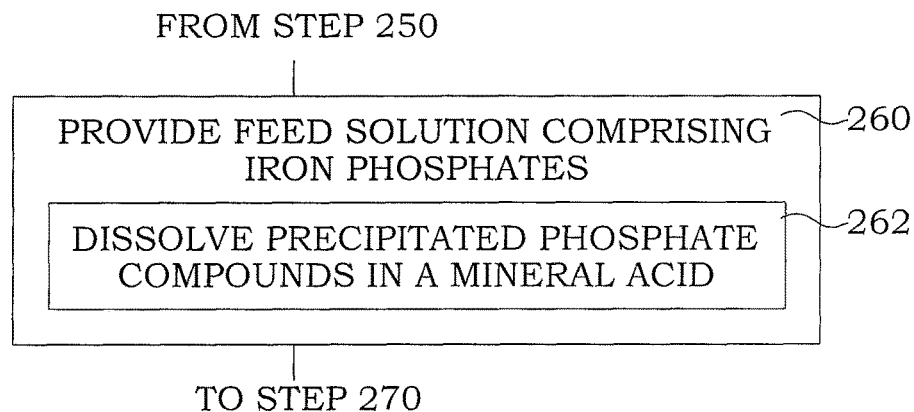
FIG. 16 is a part flow diagram of an embodiment of a method for recovery of phosphate compounds.

The embodiment can also be described in terms of part process steps. In FIG. 16, an embodiment of step 260 is illustrated. In this embodiment, step 260 comprises the step 262, in which the precipitated phosphate compounds are dissolved, by a mineral acid, into a second leach solution, forming a feed solution comprising iron phosphates. Preferably, the mineral acid is hydrochloric acid. The flow then continues with step 270.

In one embodiment, iron is separated by a liquid-liquid extraction. Parts of this embodiment are illustrated in a block scheme in FIG. 17. The feed solution 111 containing dissolved iron and phosphorus and possibly aluminium and/or calcium is first subjected to a selective extraction of iron using liquid-liquid extraction in the iron extractor 125. Liquid-liquid extraction involves selective transfer of solute between two immiscible phases, an aqueous phase and an organic phase. The two immiscible phases are first thoroughly mixed in order to facilitate the transfer of solute and then separated.

Solvents suitable for extraction of ferric iron from chloride leach solutions are mainly amines and tributyl phosphate. According to the present embodiment, extraction of ferric iron is preferably based on the use of a solvent 121 composed of tributyl phosphate as will be described further below.

The concentration of tributyl phosphate 121 in the solvent 121 of the present embodiment is preferably about 30% by volume. The solvent further comprises a modifier such as dodecanol with about 30% by volume and a diluent such as an aliphatic kerosene of about 40% by volume. However, other suitable modifiers and diluents can be utilized in alternative embodiments. The modifier and the diluent are added to the solvent in order to improve the phase separation. It has surprisingly been found that tributyl phosphate in a concentration of about 30% is suitable for separation of ferric iron from phosphate, aluminium, and calcium in a chloride solution (see table 13). Table 13 shows that extraction of iron is selective without significant co-extraction of aluminium, calcium and phosphorus.

TABLE 13

Examples of elemental composition of feed solution and raffinate after extraction with a solvent composted of 30% tributyl phosphate, 30% dodecanol and 40% kerosene at an aqueous to organic phase ratio of 1;

| | Feed solution (g/l) | | | | Raffinate (g/l) | | | |
|---|---|---|---|---|---|---|---|---|
| | Al | Fe | Ca | P | Al | Fe | Ca | P |
| Example 1 | 11.86 | 1.86 | 75.90 | 42.82 | 11.91 | 0.04 | 74.20 | 40.24 |
| Example 2 | 11.65 | 4.50 | 74.90 | 42.67 | 11.85 | 0.13 | 74.20 | 39.41 |
| Example 3 | 11.57 | 9.22 | 73.10 | 41.99 | 11.76 | 0.74 | 72.00 | 38.14 |

Extraction of ferric iron from the feed solution 111 with a solvent 121 composed of 30% tributyl phosphate is highly efficient as can be seen in the iron extraction isotherm shown in FIG. 18. The procedure for obtaining the isotherm was the following. The artificial feed solution was prepared by dissolving the following compounds in deionised water: $CaCl_3$ 240 (g/l), $AlCl_3$ 70 (g/l), $H_3PO_4$ 85% 100 (ml/l,) and HCl 37% (20 ml/l). Different amounts of $FeCl_3$ salt were added to obtain the following concentration of $FeCl_3$ (all in g/l): 5, 15, 20, 30, 70 and 100. The solvent (30% vol TBP, 30% vol dodecanol, 40% vol aliphatic kerosene) and the artificial aqueous solutions were agitated at a phase ratio of aq/org=1:1. Samples of the aqueous solution before extraction and of the raffinate were analyzed.

Extraction of iron can usually be performed in few contact stages. The number of required contact stages depends on the specific composition of the feed solution and can be calculated from FIG. 18. In general, 2 to 6 contact stages are usually sufficient for complete iron removal.

After extraction of iron in the iron extractor 125, the iron loaded solvent 124 is in the present embodiment brought to a scrubber 129. In the scrubber, the iron loaded solvent 124 is scrubbed with a scrubber liquid 117 comprising water or preferably a chloride containing solution such as calcium chloride for removal of any co-extracted phosphorus. A scrub solution 131 comprises the co-extracted phosphorus and is recycled back as a feed to the feed solution 111 again.

Figure 19:
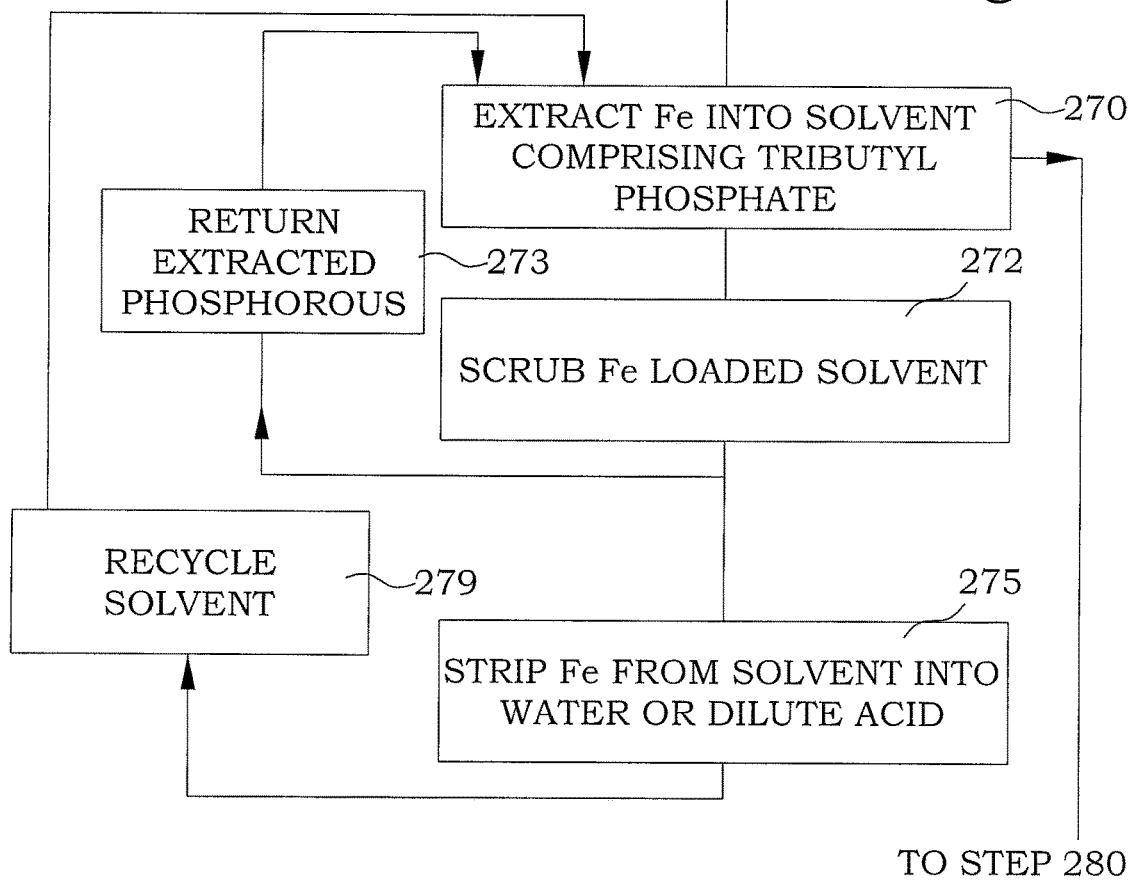
FIG. 19 is a part flow diagram of an embodiment of a method for recovery of phosphate compounds.

The embodiment can also be described in terms of part process steps. In FIG. 19, step 270 is followed by a step 272, in which the iron loaded solvent is scrubbed with a scrubber liquid for removal of co-extracted phosphorus. The scrubbing takes place after the step of extracting iron. The scrub solution, comprising the co-extracted phosphorus, is in step 273 returned back to the extraction of step 270, i.e. to the solution comprising iron phosphates. Step 275 follows on step 272.

Figure 20:
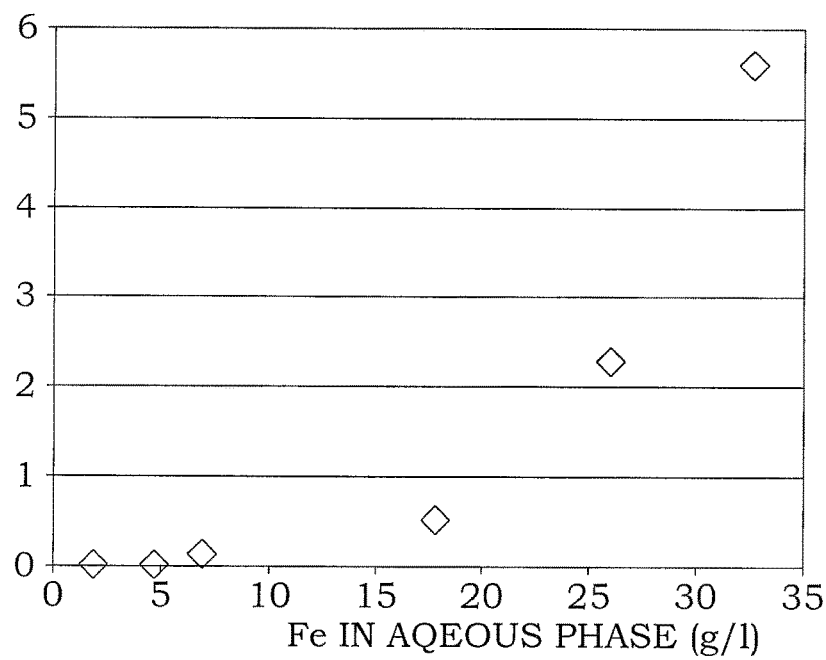
FIG. 20 is a stripping curve for ferric iron from a solvent composed of 30% TBP, 30% dodecanol in kerosene.

Returning to FIG. 17, the scrubbed iron loaded solvent 118 is after the scrubbing subjected to stripping with a strip liquid 135 comprising water or a dilute hydrochloric acid solution. A stripping isotherm for extracted iron can be seen in FIG. 20.

The result of the stripping is an iron solution 137, in the present embodiment an iron chloride. The concentration of obtained iron chloride during stripping depends on the initial iron loading of the solvent 123, the organic to aqueous phase ratio during stripping and the number of contact stages. The concentration of iron in the strip liquid 135 is generally above 40 g Fe/l and can reach over 80 g Fe/l. The obtained iron solution, here the iron chloride solution is suitable to be recycled as a chemical for phosphorus precipitation in wastewater treatment plants.

After selective extraction of iron, the iron depleted feed solution 127 is composed of mainly phosphorus, and possibly aluminium and/or calcium, all as chlorides.

In one embodiment, the iron depleted feed solution 127 is subjected to a phosphorus extraction step based on liquid-liquid extraction. Parts of this embodiment, connected to the phosphorous recovery section 140 are illustrated in a block scheme in FIG. 21. In this embodiment, the phosphorous recovery section 140 comprises a phosphoric acid extractor 150, a scrubber 155 and a phosphoric acid stripper 160. The iron depleted feed solution 127 is provided to an inlet to the phosphoric acid extractor 150. A solvent 151 is used to selectively extract phosphorous. The solvent 151 used in the present embodiment is also based on tributyl phosphate but at a higher concentration compared with the Fe extraction. The concentration of tributyl phosphate is typically about 80% by volume in a dilutent such as aliphatic kerosene or other suitable diluent. As a modifier 1-2% by volume of dodecanol can optionally be added or other suitable modifier.

In the present embodiment, it was found that tributyl phosphate is a suitable solvent for separating phosphoric acid from aluminium and calcium. Table 14 shows that phosphoric acid can be selectively extracted from the raffinate after iron extraction, i.e. the iron depleted feed solution 127, with very low co-extraction of aluminium and calcium.

TABLE 14

Elemental composition of feed solution and raffinate after extraction of phosphoric acid from an aluminium chloride solution using a solvent composed of 80% TBP in kerosene at an aq/org phase ratio of 1.
(All concentrations are in g/l)

| Initial Al | Initial Ca | Initial P | Raffinate Al | Raffinate Ca | Raffinate P |
|---|---|---|---|---|---|
| 9.32 | 64.4 | 46.61 | 9.64 | 63.7 | 35.4 |
| 9.82 | 67.6 | 48.65 | 9.96 | 67.1 | 37.54 |
| 9.76 | 66 | 47.57 | 9.66 | 62.3 | 34.89 |
| 9.77 | 68.2 | 49.18 | 9.99 | 65.6 | 36.46 |
| 6.23 | 66.7 | 48.35 | 6.49 | 67.8 | 34.91 |
| 6.04 | 67.9 | 49.05 | 6.19 | 67.4 | 34.8 |
| 6.03 | 67 | 48.35 | 6.26 | 67.7 | 34.05 |
| 6.11 | 68.1 | 48.85 | 6.29 | 67.9 | 34.09 |

Figure 22:
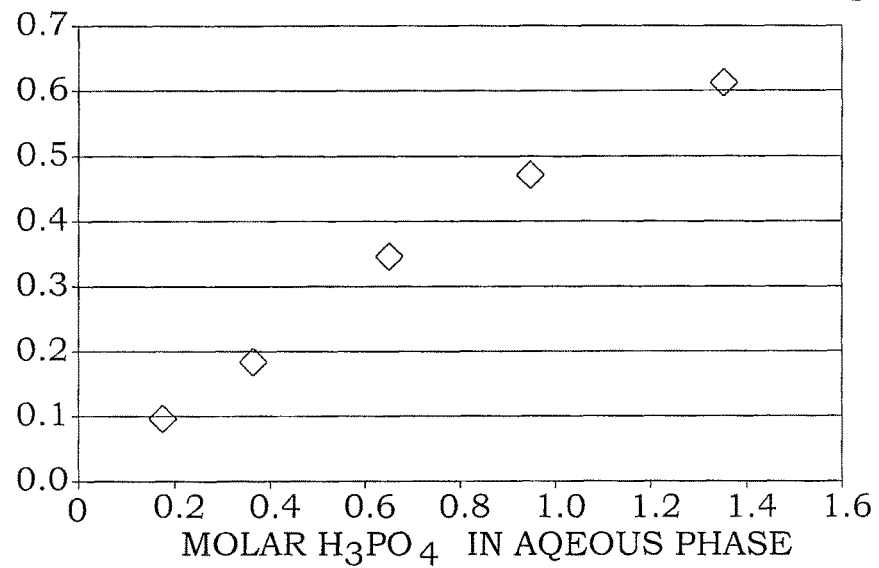
FIG. 22 is an extraction isotherm for H3PO4 in a background of AlCl3 (59 g/l) and CaCl2) (200 g/l) using 80% TBP in kerosene as a solvent.

Extraction of phosphoric acid is very efficient as can be seen from the extraction isotherm in FIG. 22. Extraction of phosphoric acid usually requires between 3 to 6 contact stages. The result is a solvent loaded with phosphoric acid 152 and a phosphorus depleted feed solution 156.

In the present embodiment the solvent loaded with phosphoric acid 152 is fed to the scrubber 155. A scrubbing solution 153 is provided to an inlet of the scrubber for removal of co-extracted calcium in the solvent loaded with phosphoric acid 152. A scrubbed solvent 158 is provided to the phosphoric acid stripper 160, and a scrubbing solution loaded with calcium 154 is extracted.

In an alternative embodiment, the scrubber 155 can be omitted, in particular if the concentration of calcium is low in the feed solution.

Figure 21:
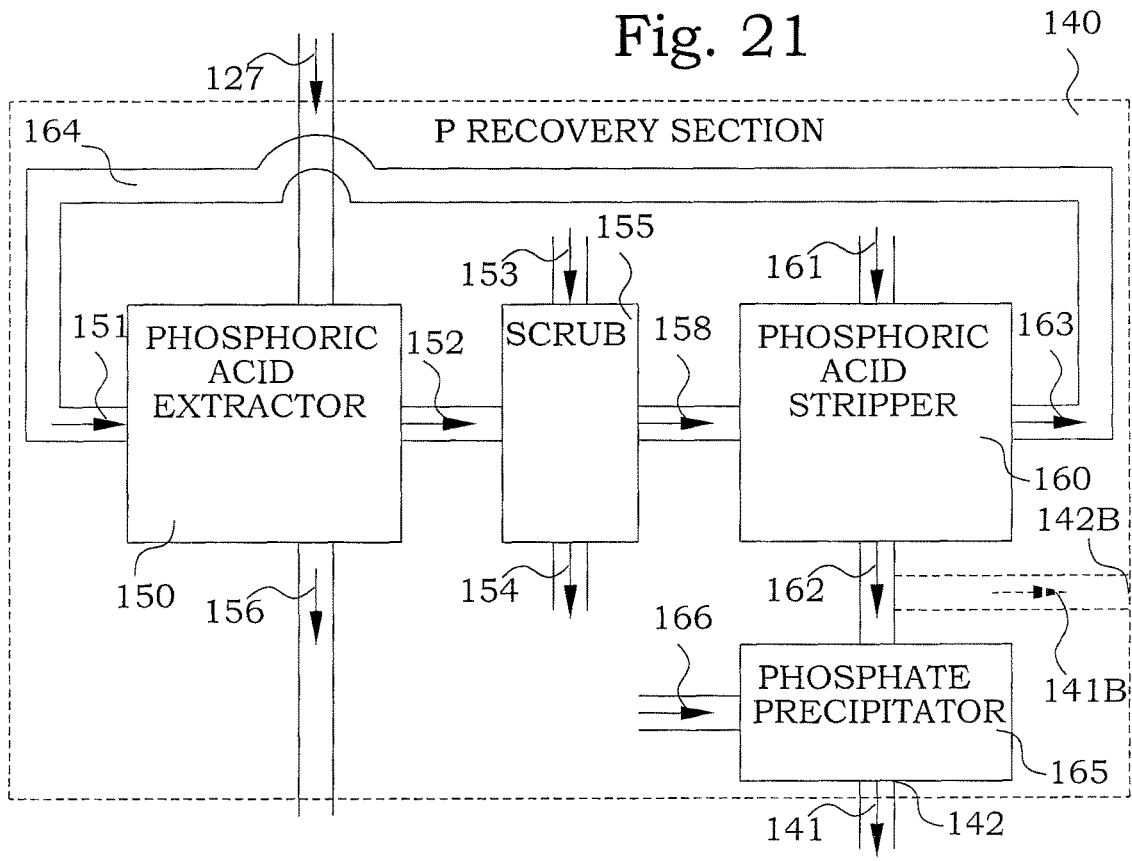
FIG. 21 is a partial block scheme of an embodiment of a recoverer arrangement.

In the embodiment of FIG. 21, phosphoric acid can thereafter be re-extracted from the scrubbed solvent 158 with an aqueous solution 161, e.g. water, to produce a purified phosphoric acid 162. The phosphorous depleted solvent 163 is recycled by a recycle arrangement 164 to be used in the phosphoric acid extractor 150 for further extraction.

There are several important advantages of the above described liquid-liquid extraction process.

The possibility of using the same solvent (tri butyl phosphate) for both extraction of iron and phosphoric acid is advantageous. A common problem during liquid-liquid extraction using two different solvents in subsequent extractions is that the downstream extraction solvent becomes with time contaminated with the upstream solvent, which may lead to serious operational problems. Since, in the process according to the embodiment presented here above, the solvent used for the two following extraction steps has the same ingredients but only in different concentration, the problem of contaminating one solvent with the other is therefore reduced.

An additional advantage of using tributyl phosphate for iron extraction compared with the use of other solvents such as amines is that tributyl phosphate can be stripped with water, which is very cost effective. In contrast, solvents such as amines require use of both base and acid for stripping.

In the present embodiment, the purified phosphoric acid 162 is transformed into phosphate compounds 141, e.g. any suitable salt form, in a phosphate precipitator 165 by addition of suitable cations 166. Di-calcium phosphate of feed quality can be produced by precipitation with lime. Alternatively, phosphoric acid in the solvent can be extracted directly as ammonium phosphate by providing ammonium-containing solutions to the phosphate precipitator 165. This can e.g. be performed according to the processes and arrangements disclosed in the published International Patent Applications WO 2010/138045 and WO 2008/115121.

In an alternative embodiment, the purified phosphoric acid 162 can be used as such as a phosphate compound 141B, provided at an outlet 142B, as indicated with the broken lines in FIG. 21.

Figure 23:
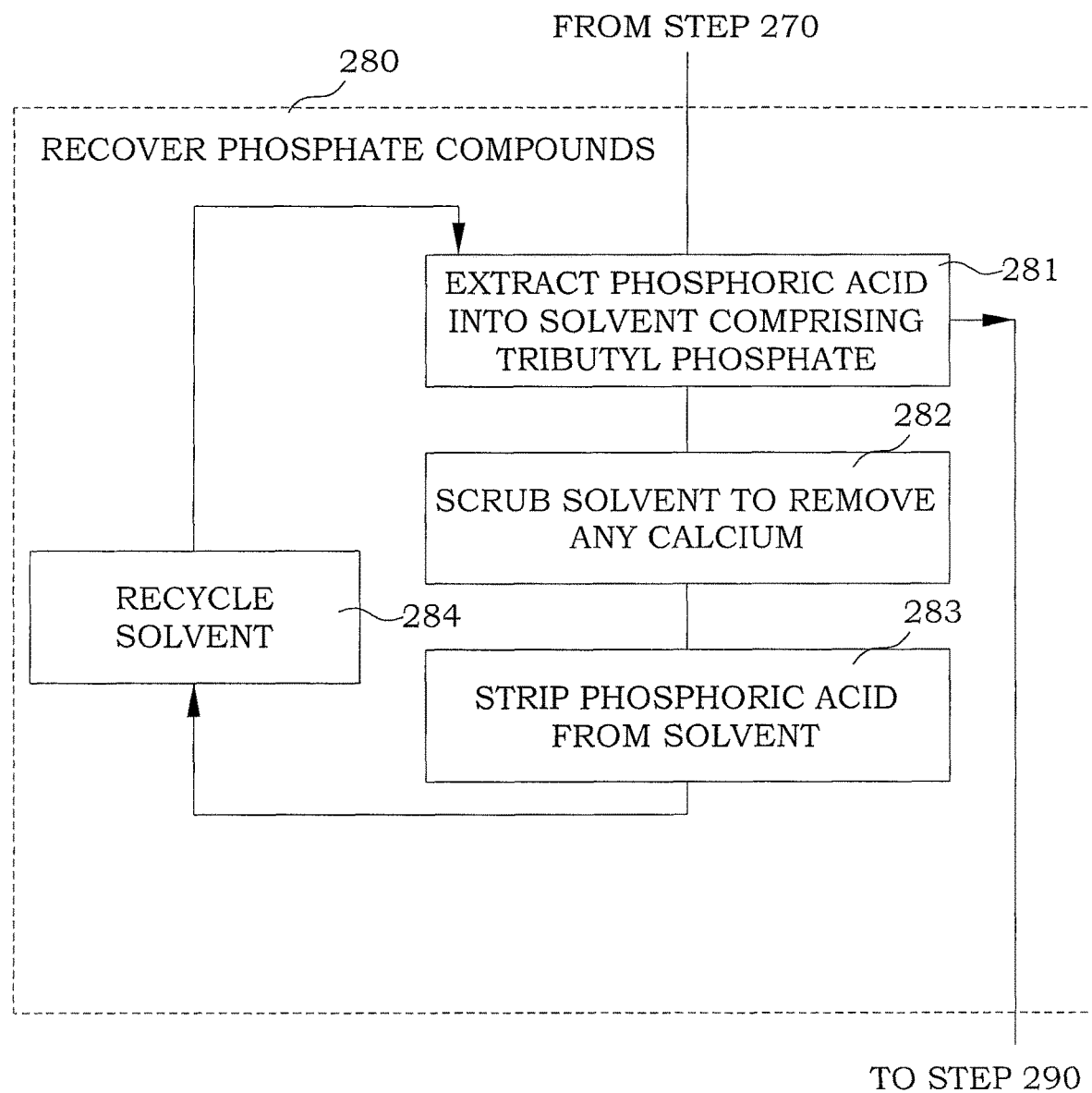
FIG. 23 is a flow diagram of steps of an embodiment of a method for recovery of phosphate compounds.

In FIG. 23, a flow diagram of a step 280 of recovering the phosphate compounds from said iron depleted solution according to the above presented lines is illustrated. The process is intended as a continuation of step 270. The step 280 of recovering said phosphate compounds from the iron depleted solution in turn comprises step 281, in which phosphoric acid is extracted from the iron depleted feed solution with a second organic solvent, producing a phosphorus depleted feed solution. The second organic solvent comprises tributyl phosphate, and preferably a modifier and a diluent. The second organic solvent has a higher concentration of tributyl phosphate than the first organic solvent. The second organic solvent has preferably a concentration of tributyl phosphate between 70 and 100% by volume. The modifier in the second organic solvent is preferably dodecanol. The diluent in the second organic solvent is preferably kerosene. In step 282, the second organic solvent loaded with phosphoric acid is scrubbed, to remove any co-extracted amounts of calcium. In step 283, the extracted phosphoric acid is stripped from the second organic solvent by an aqueous solution. The second organic solvent is in step 284 recycled, after the stripping of the extracted phosphoric acid, to be used for the step 281 of extracting phosphoric acid. The process is intended to continue with step 290 (as will be described further below) or step 299.

In an alternative embodiment, step 282 can be omitted.

Figure 24:
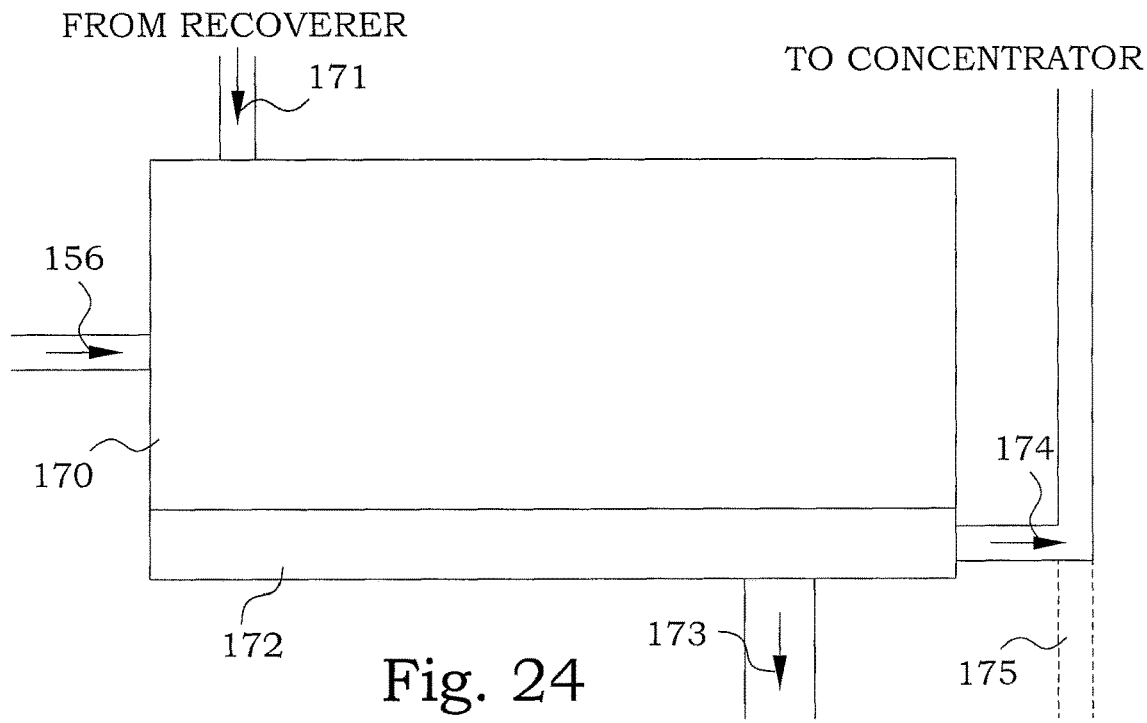
FIG. 24 is a partial block scheme of an embodiment of an aluminium removing arrangement used in connection with a recoverer arrangement.

In one embodiment, where an aluminium-containing original feed solution is used, after extraction of phosphoric acid, the feed solution is typically mainly composed of aluminium chloride and calcium chloride. According to the present embodiment, illustrated by the part block scheme of FIG. 24, aluminium is recovered from the raffinate 156 by chemical precipitation in an aluminium removing section 170. In general, any alkali chemical 171 can be added to the phosphorous depleted feed solution 156, which is entered into the aluminium removing section 170, in order to precipitate aluminium as mainly aluminium hydroxide. Most suitable chemicals are lime ($Ca(OH)_2$), sodium hydroxide (NaOH) and ammonia ($NH_3$). Precipitated aluminium hydroxide 173 is separated by a filter 172, resulting in an aluminium depleted solution 174.

When precipitating aluminium from an aluminium chloride solution, it was found that the pH has to be neutral to alkaline in order to obtain a filterable aluminium precipitate. In an acidic pH, a gel is formed which render the process non-operational. Examples 1 to 3 described here below demonstrate precipitation of aluminium hydroxide from aluminium chloride using lime, sodium hydroxide or ammonia.

In example 1, a solution containing 50 g/l $AlCl_3$ was neutralized with $Ca(OH)_2$ to a pH of 9.2. The filterable precipitate had the composition of 9% by weight Al and 11% by weight Ca. The solution after precipitation had an aluminium content of 0.00012 g/l of Al.

In example 2, a solution containing 30 g/l Al in the form of $AlCl_3$ was neutralized with NaOH to a pH of 10.2. The filterable precipitate had the composition of 10.23% by weight Al and 0.016% by weight Ca. The solution after precipitation had an aluminium content of 0.012 g/l of Al.

In example 3, a solution containing 50 g/l $AlCl_3$ was neutralized with concentrated aqueous ammonia in excess. The filterable precipitate had the composition of 12% by weight Al and 0.16% by weight Ca.

Precipitated aluminium hydroxide 173 can be converted to a suitable salt form such as aluminium sulphate or aluminium chloride by addition of sulphuric acid or hydrochloric acid, respectively. Aluminium sulphates or aluminium chlorides are suitable to be reused as chemicals for phosphorus precipitation in wastewater treatment plants.

In a particular embodiment, if lime is used as alkali chemical 171 for aluminium precipitation, the solution 174 after precipitation is composed of mainly calcium chloride. The calcium chloride solution can then be recycled in the process as a calcium source for obtaining a salting out effect during extraction of iron and phosphoric acid, as described further above.

Since aluminium precipitation requires a high pH it can be advantageous in a particular embodiment to recycle a part of the acid solution, i.e. the phosphorous depleted feed solution 156 after extraction of phosphoric acid back to a dissolution reactor, e.g. the second leaching reactor 115 (FIG. 15). Build-up of calcium in the circulating solution can then be controlled by a bleed 175 (FIG. 24), which is composed of mainly calcium chloride. The calcium in the bleed 175 can be precipitated as gypsum by addition of sulphuric acid. If the concentrator 2 (FIG. 1) and recoverer 3 (FIG. 1) are co-located, this can be done by recycling the bleed 175 to the gypsum precipitation in the concentrator 2 (FIG. 1). Alternatively the calcium content can be controlled by addition of sulphuric acid directly to the calcium chloride solution 174.

Figure 25:
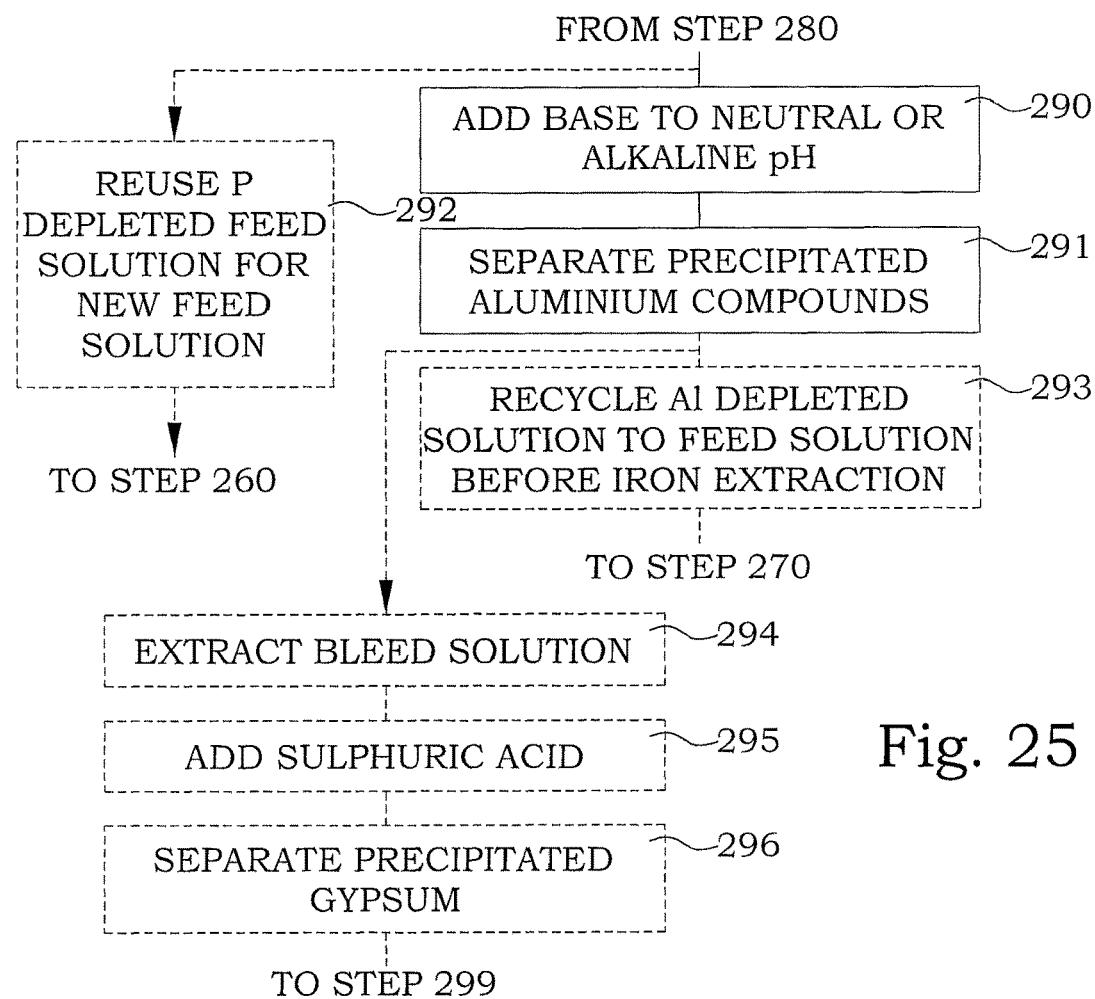
FIG. 25 is a part flow diagram of an embodiment of a method for recovery of phosphate compounds.

In FIG. 25, a flow diagram of steps of recovering aluminium compounds from the phosphorus depleted feed solution according to the above presented lines is illustrated. The process is intended as a continuation of step 280. In step 290, a base is added to at least a part of the phosphorus depleted feed solution to obtain a neutral or alkaline pH, causing an aluminium compound, in this embodiment aluminium hydroxide, to precipitate. Preferably, the base added to the phosphorus depleted feed solution comprises at least one of lime, sodium hydroxide and ammonia. In step 291, the precipitated aluminium compound, in this embodiment the aluminium hydroxide, is separated from the phosphorus depleted solution, producing an aluminium depleted feed solution. In a preferred embodiment, also a step 292 is present, in which the part of the phosphorus depleted feed solution not being used in the step of separating precipitated aluminium hydroxide used for providing the feed solution comprising iron phosphates. In a preferred embodiment, also a step 293 is present, in which at least a part of the aluminium depleted feed solution is recycled into the feed solution comprising iron phosphates before the extraction of iron. In a preferred embodiment, also steps 294-296 are present. In step 294, at least a bleed solution is extracted from the aluminium depleted feed solution. In step 295, sulphuric acid is added to the bleed solution, causing gypsum to precipitate. In step 296, precipitated gypsum is separated from the bleed solution. The process is intended to continue with step 299.

In an alternative embodiment, aluminium can be removed by means of precipitation as aluminium phosphate. The arrangement of FIG. 24 can almost be used also for this embodiment, however, the addition of the alkali chemical 171 is exchanged for an addition of calcium phosphate and/or a base. These additions are made in order to achieve an acid pH above 1.5. At these conditions, aluminium precipitates as aluminium phosphate. The precipitated aluminium phosphate can thereafter be separated from the phosphorus depleted solution, producing an aluminium depleted feed solution. In analogy with what was described before, in a preferred embodiment, the phosphorus depleted feed solution not being used in the separation of precipitated aluminium phosphate is recycled to be used in the provision of the original feed solution.

A method according to the ideas about precipitation of aluminium as phosphate can be performed basically according to the steps of FIG. 25, with the step 290 modified to comprise addition of calcium phosphate and optionally a base.

Even though, according to the invention, heavy metals are preferably removed by sulphide precipitation in the concentrator part of the arrangement/process, possibilities also exist for removal of heavy metals later, in the recoverer part of the arrangement/process.

For example, phosphorus can in the concentrator be precipitated in two fractions; a first fraction at pH<3.5 in form of ferric phosphate and aluminium phosphate without significant co-precipitation of heavy metals, and a second fraction at pH >3.5 in form of calcium phosphate or ferrous phosphate with significant co-precipitation of heavy metals. The first fraction can be dissolved in hydrochloric acid and treated for ferric iron extraction and preferably followed by phosphoric acid extraction in the arrangements and methods described here above.

The second fraction is in one embodiment dissolved separately in hydrochloric acid. The feed solution from dissolution of the second fraction is composed of dissolved calcium phosphate or ferrous phosphate with a significant, or at least non-negligible, content of heavy metals. The feed solution is therefore preferably treated for removal of heavy metals in the recovering process.

Several alternatives exist for removal of heavy metals. In a first alternative, heavy metals are removed by sulphide precipitation from the feed solution at pH<4 prior to extraction of phosphorus. In a second alternative, heavy metals are selectively extracted in form of chloride complexes from the feed solution by liquid-liquid extraction using suitable solvents such as tributyl phosphate or amines prior to phosphorus extraction. In a third alternative, heavy metals are allowed to be co-extracted together with phosphoric acid in form of chloride complexes using tributyl phosphate as a solvent. After re-extraction of phosphoric acid, heavy metals can be removed from the strip solution by precipitation in form of phosphates by adding a base such as lime, ammonia, etc. Heavy metals can also be precipitated from the strip solution as sulphides by adding a sulphide source.

Another alternative for processing the intermediate precipitate, as discussed before, is based on dissolution of the intermediate precipitate in a base.

It is known according to the published international patent application WO 03/000620 to treat a residue from super- critical water oxidation of sludge with alkali, e.g. sodium hydroxide, in order to dissolve phosphorus, followed by precipitation of phosphorus from the obtained leach solution with lime. However, this approach cannot be applied with high efficiency to sludge ash. The reason is that sludge ash has usually high calcium content in relation to phosphorus. Calcium phosphate is insoluble in alkali which means that phosphorus recovery rates of dissolving sludge ash in alkali are usually very low.

For example, Table 15 shows the elemental composition of leach solution and residue obtained from dissolving ash E in one molar sodium hydroxide at a liquid to solid ratio of 6. From Table 15 it can be seen that the phosphorus concentration in the leach solution (0.59 g/l) corresponds to a phosphorus dissolution efficiency of only 8.9% (P content in ash E is 3.96%, see Table 1). Furthermore, the iron content in the residue is only 8.6% and phosphorus is enriched in the residue reaching 5% by weight. Since heavy metals are not dissolved to a large extent in alkali, they are concentrated in the residue. Thus, in addition to a very low phosphorus recovery rate, a large amount of contaminated residue is formed which is difficult to find a use for it. Furthermore, the residue cannot be processed for recovery of iron as a precipitation chemical. If the residue is dissolved in an acid both phosphorus and iron dissolves which means that the obtained dissolved iron solution will have a high phosphorus content (usually higher concentration of phosphorus on a mole bases compared to iron). Therefore, dissolved iron cannot be used for phosphorus precipitation in wastewater treatment plants.

According to one embodiment, sludge ash is processed in a way in which all the above mentioned drawbacks are omitted. The process enables recovery of iron, phosphorus and aluminium at a very high efficiency. The approach is based on a feed solution comprising phosphate ions, and aluminium ions. This can be achieved e.g. by dissolving an intermediate precipitate in alkali. In order for the process to be efficient, the intermediate precipitate should then have relatively low calcium content. This can be obtained by treating sludge ash according to part embodiments described earlier in the description.

Figure 26:
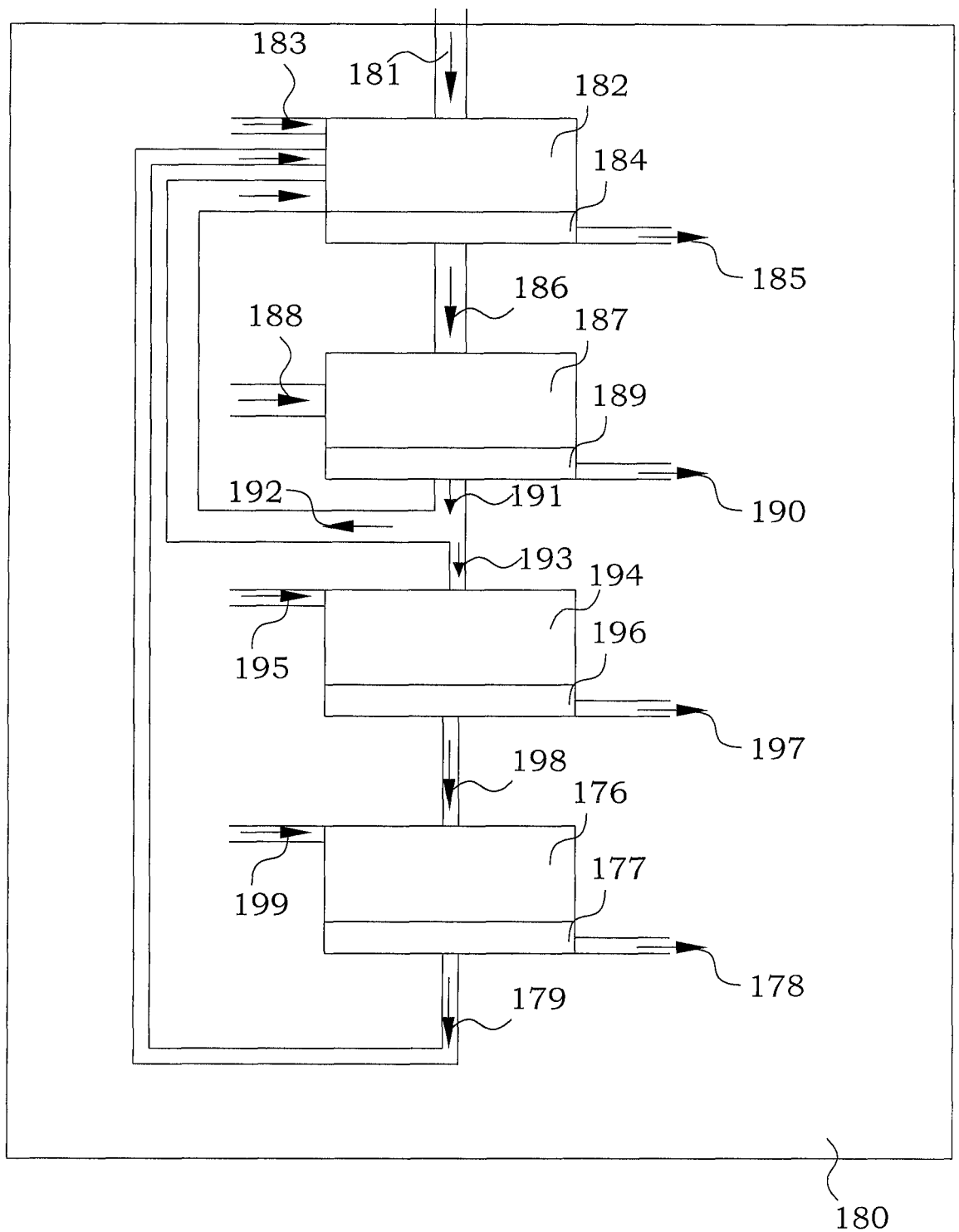
FIG. 26 is a block scheme of an embodiment of an arrangement for recovery of phosphorus and aluminium and possibly iron.

In FIG. 26, a schematic block scheme of an embodiment of an arrangement 180 for recovery of phosphorus and aluminium and possibly iron. A phosphorus precipitate 181 is input into a dissolution reactor 182. As will be discussed further below, this phosphorus precipitate 181 can be the earlier mentioned phosphorus containing precipitate 10 (FIG. 1), or an internal precipitate within the recoverer.

TABLE 15

Elemental composition of leach solution and residue obtained by leaching ash E with 1M NaOH at a liquid to solid ratio of 6:1.

|  | Ca | P | Mg | Na | Fe | Al | Mn | K | S |
|---|---|---|---|---|---|---|---|---|---|
|  | mg/L | | | | | | | | |
| Leach solution | 0.689 | 599 | <0.1 | 3203 | 2.124 | 199.9 | 0.1436 | 1101.45 | 337 |
|  | g/kg | | | | | | | | |
| Residue | 80.5 | 50 | 12.4 | 36.33 | 86.7 | 8.57 | 2.293 | 17.325 | 1.896 |

The phosphorus precipitate 181 is dissolved in an alkaline solution in the dissolution reactor 182. The alkaline solution is obtained by adding to the dissolution reactor 182 an alkali 183 such as sodium hydroxide or potassium hydroxide. Addition of alkali 183 is done to obtain a pH >9, preferably >12, in the dissolution reactor 182.

In general, dissolution efficiency is affected by both pH and temperature, in which a higher pH and higher temperature results in higher dissolution rate. For example, at room temperature a dissolution efficiency of about 80% was achieved at pH 11.5 whereas a dissolution efficiency of about 100% was achieved at pH 12.5. In another example, a lower dissolution efficiency of about 80% was obtained at room temperature (pH=12.5) whereas for the same material a dissolution efficiency of 100% was obtained at 50° C. (pH=12.5).

In a particular embodiment, the liquid (l) to solid (kg) ratio in the dissolution reactor 182 is preferably between 2 and 50, more preferably between 3 and 20. Dissolution can take place at room temperature. Dissolution time is usually between 15 and 120 minutes.

In the embodiment of FIG. 26, the obtained residue 185 is separated from the outgoing leach solution 186 by a suitable solid/liquid separator 184, e.g. a filter.

Table 16 shows the elemental composition of a residue 185 obtained by dissolving in alkali, here sodium hydroxide, an intermediate phosphorus precipitate 181 originating from ash E. The iron content in the residue 185 corresponds to 55.8% by weight and the phosphorus content to only 1.8%. The phosphorus dissolution efficiency was 97.2%. The high iron content in relation to phosphorus makes the residue a suitable raw material for production of coagulant. In addition, heavy metals were removed before formation of the intermediate phosphorus precipitate 181, enabling recovery of iron without significant content of heavy metals. If the content of heavy metals is to be further reduced, this can be done according to the embodiment described later in the text.

TABLE 16

Elemental composition of iron hydroxide obtained by dissolving an intermediate precipitate originating from ash E in 1M NaOH at a liquid to solid ratio of 6:1.

g/kg

| | Ca | P | Mg | Na | Fe | Al | Mn | K | S |
|---|---|---|---|---|---|---|---|---|---|
| Iron hydroxide | 42.29 | 18.09 | 2.637 | 50.1 | 558 | 2 | 1.055 | 0.875 | 0.1106 |

The residue 185 can be treated with sulphuric acid or hydrochloric acid forming iron sulphates or iron chlorides which are suitable for use as precipitation chemicals in wastewater treatment plants.

The leach solution 186 after filtration of the residue 185 is in the present embodiment composed of mainly dissolved phosphorus and aluminium and the cations of the added alkali. Lime 188 is added to the leach solution 186 in a mixing volume 187. The lime 188 is added in an amount sufficient for precipitating at least a part of the dissolved phosphorus in form of calcium phosphate 190. The precipitated calcium phosphate 190 is separated from the outgoing solution 191 with a suitable solid/liquid separator 189, typically a filter. It was found that the calcium phosphate precipitate is mainly in the form of hydroxyapatite with very low fluorine content. It was also found that in some cases a minor amount of non-dissolved calcium hydroxide can be present in the hydroxyapatite precipitate. Several alternatives exist for removal of residual non-dissolved calcium hydroxide, if present. In a first alternative, residual calcium hydroxide can be reacted with phosphoric acid to form calcium phosphates such as apatite, di-calcium phosphate or mono-calcium phosphate. In a second alternative, residual calcium hydroxide can be washed with hydrochloric acid forming calcium chloride. In a third alternative, residual calcium hydroxide can be washed with a dilute ammonium chloride solution. Carbon dioxide is thereafter added to the wash solution forming a precipitate of calcium carbonate in a dilute ammonium chloride solution. After separation of precipitated calcium carbonate the ammonium chloride solution can be re-used for further washing.

Table 17 shows the elemental composition of calcium phosphate 190 obtained by addition of lime to an alkaline leach solution from an intermediate precipitate 181 originating from ash E. The phosphorus concentration in the calcium phosphate 190 was about 17% by weight and the heavy metal content was very low (see Table 17). The precipitated calcium phosphate is optionally washed with an alkaline solution for removal of adhering sodium aluminate. The calcium phosphate 190 can be used as feed phosphate, processed into dicalcium phosphate, mono-calcium phosphate or used for fertilizer production.

TABLE 17

Elemental composition of calcium phosphate obtained by adding lime to an alkali leach solution originating from an intermediate precipitate from ash E in 1M NaOH.

g/kg

| | Ca | P | Mg | Na | Fe | Al | Mn | K | F |
|---|---|---|---|---|---|---|---|---|---|
| Calcium phosphate | 365 | 169 | 3.7 | 2.46 | 2.5 | 1.69 | 0.01 | 0.12 | 0.1 |

| | S | Cr | Co | Ni | Cu | Zn | Cd | Pb |
|---|---|---|---|---|---|---|---|---|
| Calcium phosphate | 0.111 | 0.0146 | 0.326 | 0.0018 | 0.0051 | 0.204 | $2.45 \cdot 10^{-5}$ | 0.001 |

After precipitation of calcium phosphate 190 with lime 188 the solution 191 has a high pH level and at least a part stream is optionally recycled 192 to the dissolution reactor 182.

In the present embodiment, the aluminium concentration in the circulating solution is kept at a constant level by removing aluminium in a bleed 193. If the bleed solution contain residual dissolved phosphorus it is optionally pre-treated for precipitation of residual phosphorus by addition of lime in excess to phosphorus.

Residual phosphorus precipitates in form of calcium phosphate together with excess of lime and can be used as a part of the source of lime 188 used for phosphorus precipitation in the mixing volume 187 or the source of lime 6 used for phosphorous precipitation in the mixing volume 40. The bleed 193 is thereafter treated with an acid 195 in an aluminium removing volume 194. The acid 195 is added in an amount for lowering the pH of the solution to below pH 12, preferably below pH 11, resulting in precipitation of aluminium hydroxide 197. Precipitated aluminium hydroxide 197 is separated from the depleted bleed solution 198 with a suitable solid/liquid separator 196, typically a filter.

If the acid 195 is a mineral acid, such as sulphuric acid, then the neutralized bleed solution 198 is composed of mainly the cation of the added alkali in form of sulphate. The neutralized bleed solution 198 can be discharged or used for further processing. If the acid 195 is a gaseous carbon dioxide, then the neutralized bleed solution 198 is composed of mainly the cation of the added alkali in form of carbonate. In such, a case lime 199 may thereafter be added to the neutralized bleed solution 198 in a mixing volume 176 resulting in the precipitation of calcium carbonate 178 and regeneration of the dissolved cations of the added alkali from a carbonate form to a hydroxide form. The precipitated calcium carbonate 178 is separated from the solution with a suitable solid liquid separator 177. The solution 179 after separation of calcium carbonate 178 is recycled to the dissolution reactor 182 as an alkali source. In that way, addition of alkali 183 is only needed for compensating losses since the system is based on closed recirculation of alkaline solution.

In a preferred embodiment, addition of carbon dioxide into mixing volume 194 is done by scrubbing carbon dioxide gas into at least a part of the neutralized bleed solution 198. Since the neutralized bleed solution 198 is composed of mainly the cation of the added alkali in form of carbonate, the solution can scrub carbon dioxide gas by converting the alkali carbonate into alkali bicarbonate. The alkali bicarbonate solution is then fed into the mixing volume 194 as the acid 195.

Table 18 shows the elemental composition of aluminium hydroxide 197 obtained by addition of an alkali (sodium) bicarbonate solution 195 to a bleed solution 191 after precipitation of hydroxyapatite 190. The bleed solution 191 originates from processing an intermediate precipitate 181 originating from ash E.

It was found that crystal size of precipitated aluminium hydroxide is affected by the conditions during precipitation. In general, a slow addition of sodium bicarbonate solution and a higher temperature reduces supersaturation in solution and promotes crystal growth instead of crystal nucleation. This promotes formation of larger crystals of aluminium hydroxide which filter easily. Addition time of sodium bicarbonate solution of about one hour is usually sufficient for obtaining aluminium hydroxide precipitate which filter easily.

TABLE 18

Elemental composition of aluminium hydroxide.
g/kg

| | Al | Ca | P | Cu | Fe | As | Cd | Co |
|---|---|---|---|---|---|---|---|---|
| Aluminium hydroxide | 171 | 14 | 3.1 | 0.09 | 0.07 | <0.007 | <0.0001 | 0.00014 |

| | Hg | Ni | Pb | Cr |
|---|---|---|---|---|
| Aluminium hydroxide | <0.0002 | 0.0025 | 0.0009 | 0.0012 |

Precipitated aluminium hydroxide 197 can be converted to a suitable salt form such as aluminium sulphate or aluminium chloride by addition of sulphuric acid or hydrochloric acid, respectively, in analogy with earlier description.

Figure 27:
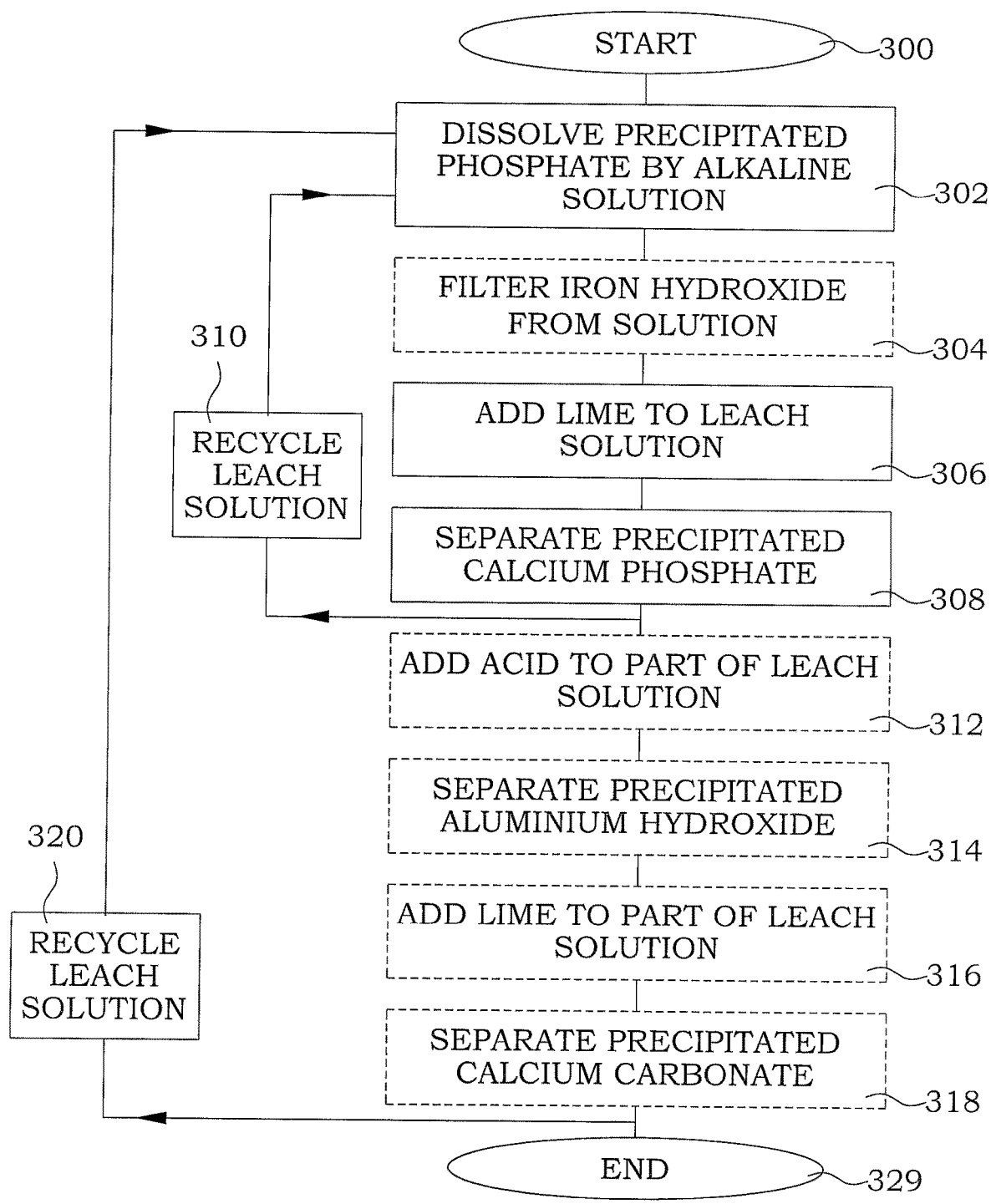
FIG. 27 is a flow diagram of an embodiment of a method for recovery of phosphorus and aluminium and possibly iron.

FIG. 27 illustrates a flow diagram of steps of part of an embodiment of a method for recovery of phosphorus and aluminium and possibly iron. The process starts in step 300. In step 302, precipitated phosphate is dissolved by an alkaline solution into a second leach solution. The alkaline solution is preferably sodium hydroxide or potassium hydroxide. The precipitated phosphate is preferably precipitated phosphate compounds as obtained in step 225 (FIG. 2) or precipitated aluminium phosphate from the ensemble 251 (FIG. 13) of activities for recovery of phosphate compounds. In step 306, lime is added into the second leach solution, which causes precipitation of calcium phosphate. In step 308, precipitated calcium phosphate is separated from the second leach solution. After the step 308 of separating precipitated calcium phosphate, the second leach solution is recycled in step 310 to be used in the step 302 of dissolving.

In one particular embodiment, where the precipitated phosphate comprises iron, the method further comprises a step 304, before the step 306 of adding lime, in which iron hydroxide is filtered from the second leach solution.

In one preferred embodiment, the method further comprises a step 312, in which an acid is added to at least a deviated part of the second leach solution. This step is performed after the step 308 of separating precipitated calcium phosphate. The addition of acid causes precipitation of aluminium hydroxide. The acid 195 is preferably added in an amount for lowering the pH of the solution to below pH 12, preferably below pH 11. In step 314, the precipitated aluminium hydroxide is separated from the deviated part of the second leach solution.

In the case, the addition of acid comprises addition of carbonic acid or gaseous carbon dioxide, the method preferably comprises further steps. In step 316, lime is added to the deviated part of the second leach solution after the step 314 of separating the precipitated aluminium hydroxide. The addition of lime causes precipitation of calcium carbonate. The precipitated calcium carbonate is in step 318 separated from the deviated part of the second leach solution. The deviated part of the second leach solution is, after the separation of the precipitated calcium carbonate in step 318, recycled to be used in the step 302 of dissolving, as illustrated by step 320. The process ends in step 329.

In the embodiments described above, the source phosphorus precipitate 181 was assumed to come from the concentrator 2 (FIG. 1). However, also other embodiments are feasible, as have been indicated. The recovery of aluminium in a valuable form by chemical precipitation can be employed to any precipitate comprising phosphorus, aluminium and possibly iron.

The above described processing of the intermediate precipitate in a base opens for a synergetic combination with production of the intermediate precipitate as will be described in the following text.

Figure 33:
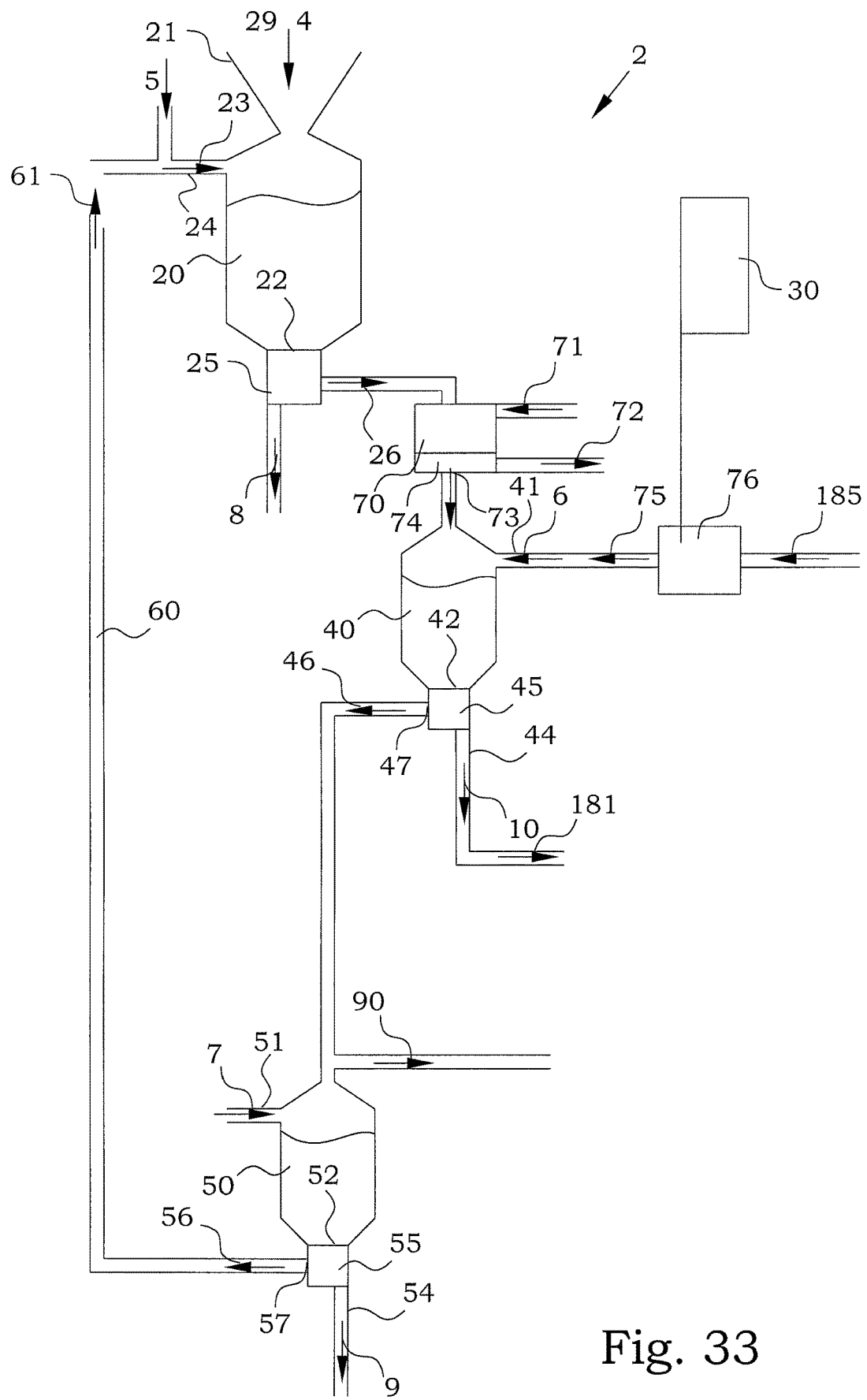
FIG. 33 is a block diagram of an embodiment of a concentrator arrangement.

According to a preferred embodiment, illustrated in FIG. 33, phosphorus is precipitated from ash leach solution with the use of iron hydroxide cake. The iron hydroxide cake is obtained by treating an intermediate precipitate with alkali as described before.

In the embodiment, sludge ash 4 is dissolved in hydrochloric acid 23, forming a first leach solution 26, as described before. After ash dissolution 20, the insoluble material 8 is separated 25. Heavy metals are separated 74 from the first leach solution 26 in form of sulfides 72. Thereafter, an iron hydroxide cake 185 is added to the leach solution as the source of both ferric ions 76 and base 6. After agitation, the added iron hydroxide cake 185 converts into iron phosphate 10 which is separated 45 from the solution. It is of advantage to operate with a certain level of excess dissolved phosphorus during the phosphorus precipitation meaning that precipitation of phosphorus is not carried out to completeness. This improves the filtration characteristics of the precipitated iron phosphate 10, as well as, assures that the P/[FeIII-+Al] mol ratio during precipitation is above 1. After separation 45 of iron phosphate 10, sulfuric acid 7 is added in order to precipitate dissolved calcium in form of gypsum 9 and to regenerate hydrochloric acid 23 for reuse in ash dissolution 20 as described before. After precipitation of gypsum 9, dissolved phosphorus is in the form of phosphoric acid meaning that ash dissolution 20 is practically performed with a mixture of hydrochloric acid and phosphoric acid.

According to the present embodiment iron hydroxide 185 is used as the source of both ferric iron 76 and base 6 simultaneously. It has surprisingly been found that iron hydroxide cake 185 can be used efficiently for the precipitation of phosphorus 10 from the first ash leach solution 26. In general, fresh precipitates have higher solubility than precipitates after a long period of ageing. Examples 4 and 5 described here below demonstrate precipitation of phosphorus from ash leach solution with iron hydroxide cake.

In example 4, sludge ash, in which ferric iron was used as a precipitation chemical, was dissolved in recycled process acid composed of a mixture of hydrochloric acid and phosphoric acid. The solid to liquid ratio during sludge ash dissolution was controlled to obtain a pH of 1.79 in the leach solution. Iron hydroxide cake composed of 64% Fe, 5.6% Ca and 3.5% P (by dry weight) was added to the ash leach solution. After one hour of agitation, the pH of the solution increased to 2.33 and the iron hydroxide converted into a precipitate of iron phosphate composed of 20.5% P, 34.5% Fe and 6.2% Ca. The experiment showed that despite the relatively high pH of the solution (pH=1.78) the iron hydroxide reacted with phosphorus forming a precipitate product with high phosphorus concentration.

In example 5, the same experiment was repeated with the difference that the pH of the ash leach solution was controlled to pH=1. Iron hydroxide cake was added to the ash leach solution resulting in a pH increase from pH=1 to pH=1.73. The pH level was further increased by addition of lime to pH=2.33. The added iron hydroxide converted to an iron phosphate composed of 23% P, 22% Fe and 7.8% Ca.

After addition of iron hydroxide cake 185 to the first leach solution 26, the pH increases and an iron phosphate 10 with high phosphorus content is obtained (usually up to 20% P by weight). The obtained iron phosphate 10 has usually a red color indicating that dissolution of iron hydroxide 185 is not complete. However, high phosphorus content in the intermediate precipitate 10 shows that iron hydroxide 185 is an effective scavenger for phosphorus by dissolution-precipitation and/or adsorption mechanisms.

The obtained iron phosphate is thereafter, with reference to FIG. 26, dissolved as intermediate precipitate 181 in an alkaline solution 183 forming a second leach solution 186 as described before. During alkaline dissolution 182, the iron phosphate 181 converts into solid iron hydroxide 185 which is separated 184 from the second leach solution 186. Thereafter, lime 188 is added into the second leach solution 186 causing the precipitation of calcium phosphate 190. The precipitated calcium phosphate 190 is separated 189 from the second leach solution 191. The second leach solution 191 after the step of separating 189 precipitated calcium phosphate 190 is recycled to the step of iron phosphate dissolution 182.

The aluminium content in the circulating second leach solution 186 is controlled, as described before, by adding an acid 195, preferably carbon dioxide, into a deviated part of the second leach solution 193 causing precipitation of aluminium hydroxide 197 which is separated 196. Thereafter, lime 199 is added to the deviated part of the second leach solution 198 after separation of aluminium hydroxide 197 in order to precipitate calcium carbonate 178 and to regenerate the alkaline solution 179 for reuse in the step of iron phosphate dissolution 182.

The obtained iron hydroxide cake 185 is reused for phosphorus precipitation 40 (FIG. 33) from the first ash leach solution 26 (FIG. 33).

The advantage of combining the alkaline processing of the intermediate precipitate and formation of iron hydroxide cake with precipitation of the intermediate precipitate using the formed iron hydroxide cake is high chemical efficiency of the process in total. The high chemical efficiency is mainly due to that the added lime has several chemical functions in both concentrator and recoverer systems which give a high chemical efficiency for the system in total.

The lime 188 provides calcium ions for the precipitation of calcium phosphate 190 (FIG. 26). At the same time, the lime 188 provides hydroxide ions for the regeneration of the alkaline solution 192 used for dissolving 182 the intermediate precipitate 181. Simultaneously, the lime 188 provides hydroxide ions, which indirectly via the iron hydroxide cake 185, neutralize the first leach solution 26 (FIG. 33) and by that reduce the amount of base 6 required for that purpose. In addition, the iron hydroxide cake 185 contains residual alkaline mother liquor which neutralizes the first leach solution 26 and by that reduces the amount of base 6 required for that purpose.

The obtained calcium phosphate 190 and aluminium hydroxide 197 have low heavy metal content, since heavy metals are not dissolved to a large extent in the second alkaline leach solution 186. This means that complete removal of heavy metals from the circulating first leach solution 26 is not absolutely necessary. The level of heavy metals in the first leach solution 26 needs only to be controlled to a steady state. This improves the chemical efficiency of heavy metal sulfide precipitation 70.

Sludge ash contains ferric iron, which is dissolved in the first leach solution 26. This results in an increasing amount of iron hydroxide cake 185 with time. In order to keep the amount of iron hydroxide cake 185 at a steady level, the excess iron hydroxide cake 185 is removed.

According to a preferred embodiment, excess iron hydroxide cake 185 is dissolved in hydrochloric acid forming a third leach solution. Iron in the third leach solution is extracted into a suitable organic solvent such as tributyl phosphate with suitable modifier and diluent. It was found that ferric iron can be extracted with tributyl phosphate in preference to heavy metals, calcium and phosphorus (see table 19). The table presents elemental composition of an aqueous solution, obtained by dissolving iron hydroxide cake in hydrochloric acid, before and after extraction with a solvent composed of 30% tributyl phosphate, 30% dodecanol and 40% kerosene at a phase ratio of aqueous to organic=1:1. A ferric iron removal efficiency of 96.5% was obtained, while heavy metals, calcium and phosphorus remained in the aqueous solution. The raffinate from iron extraction containing residual iron, heavy metals, calcium, hydrochloric acid and phosphorus is preferably recycled to the ash dissolution step 20.

TABLE 19

Elemental composition of aqueous solution obtained by dissolving iron hydroxide cake in hydrochloric acid.

|  | Fe g/L | Co g/L | Ni g/L | Cd g/L | Al g/L | Mn g/L | Cr g/L | Cu g/L |
|---|---|---|---|---|---|---|---|---|
| Initial solution | 21.42 | 0.23 | 0.01 | 0.01 | 3.36 | 0.36 | 0.03 | 0.10 |
| Raffinate | 0.74 | 0.22 | 0.01 | 0.01 | 3.49 | 0.37 | 0.02 | 0.09 |

|  | Zn g/L | Na g/L | Mg g/L | P g/L | S g/L | K g/L | Ca g/L |
|---|---|---|---|---|---|---|---|
| Initial solution | 0.43 | 0.59 | 1.17 | 26.69 | 0.08 | 4.59 | 68.30 |
| Raffinate | 0.43 | 0.63 | 1.21 | 27.53 | 0.07 | 4.85 | 69.60 |

Figure 32:
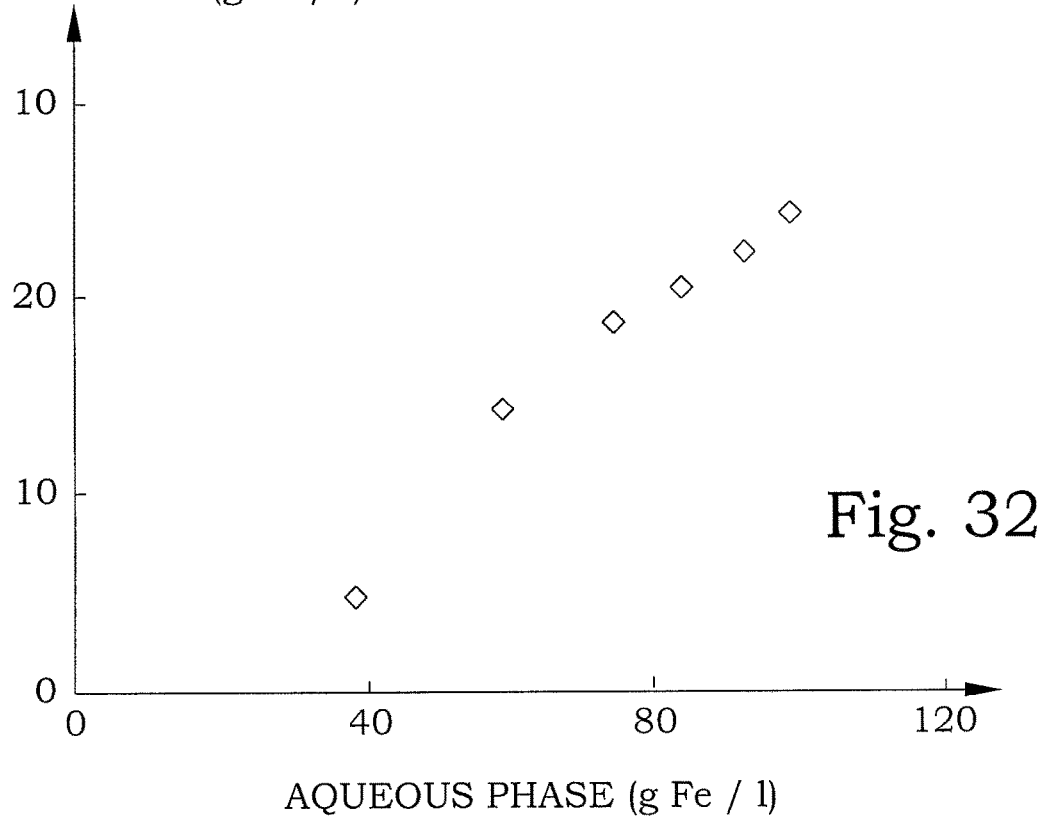
FIG. 32 is a diagram illustrating a stripping curve.

Stripping of the iron loaded solvent is performed with water or dilute acid forming a purified iron chloride solution suitable for use as a coagulant in wastewater treatment plants. It was found that during stripping with water or dilute acid the concentration of obtained iron chloride can be up to 100 g Fe/l, see e.g. FIG. 32. In FIG. 32, a stripping curve for ferric chloride in 6 mixer settler stages is illustrated. The solvent was composed of 30% TBP, 30% dodecanol and 40% kerosene. The aqueous to organic phase ratio was 1:5. The strip solution was composed by 1% HCl.

An additional general advantage of using iron hydroxide cake as the source of base for precipitation of phosphorus from ash leach solutions is that it can be used for phosphorus precipitation from ash leach solutions in which the ash is directly dissolved in sulfuric acid without dilution of precipitated phosphorus with gypsum as in the case of using lime as discussed before. The disadvantages of dissolving sludge ash directly in sulfuric acid are, however, reduced chemical efficiency of sulfuric acid and production of large amount of gypsum containing residue as discussed before.

Figure 34:
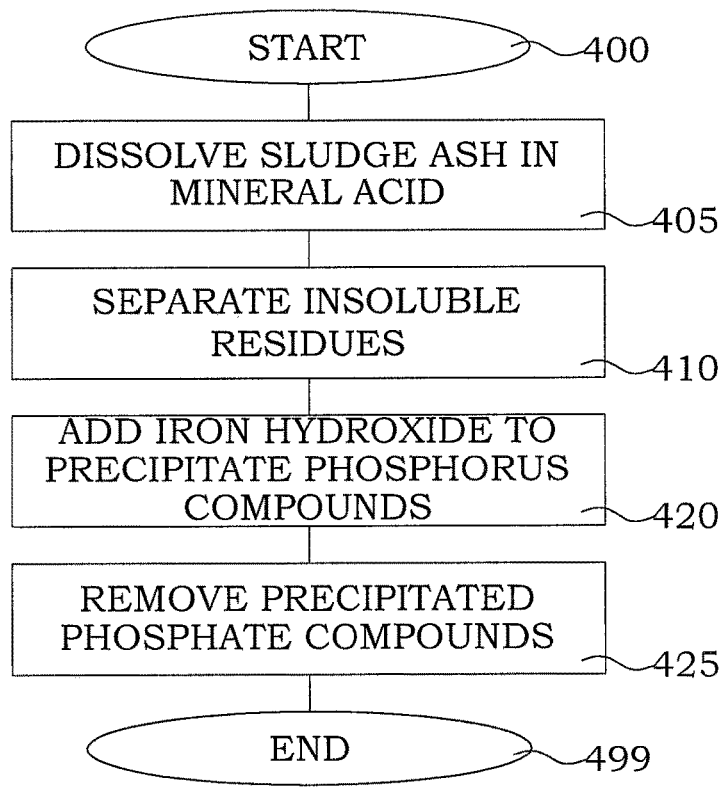
FIG. 34 is a flow diagram of an embodiment of a method for concentration of phosphate compounds.

FIG. 34 illustrates an embodiment of a method for concentration of phosphate compounds that preferably can be used together with the method for recovery of phosphate compounds of FIG. 27 (when including step 304). The method starts in step 400. In step 405, Sludge ash is dissolved in a liquid comprising mineral acid into a primary leach solution. In step 410, insoluble residues are separated from the primary leach solution. In step 420, a base, comprising iron hydroxide, is added to the primary leach solution for causing precipitation of phosphate compounds, e.g. iron phosphates. The iron hydroxide is preferably at least a part of the iron hydroxide produced in the step 304 (FIG. 27). In step 425, the precipitated phosphate compounds are removed from the primary leach solution. Preferably, the removed precipitated phosphate compounds are used as the precipitated phosphate of step 302 (FIG. 27). The process ends in step 499.

Figure 35:
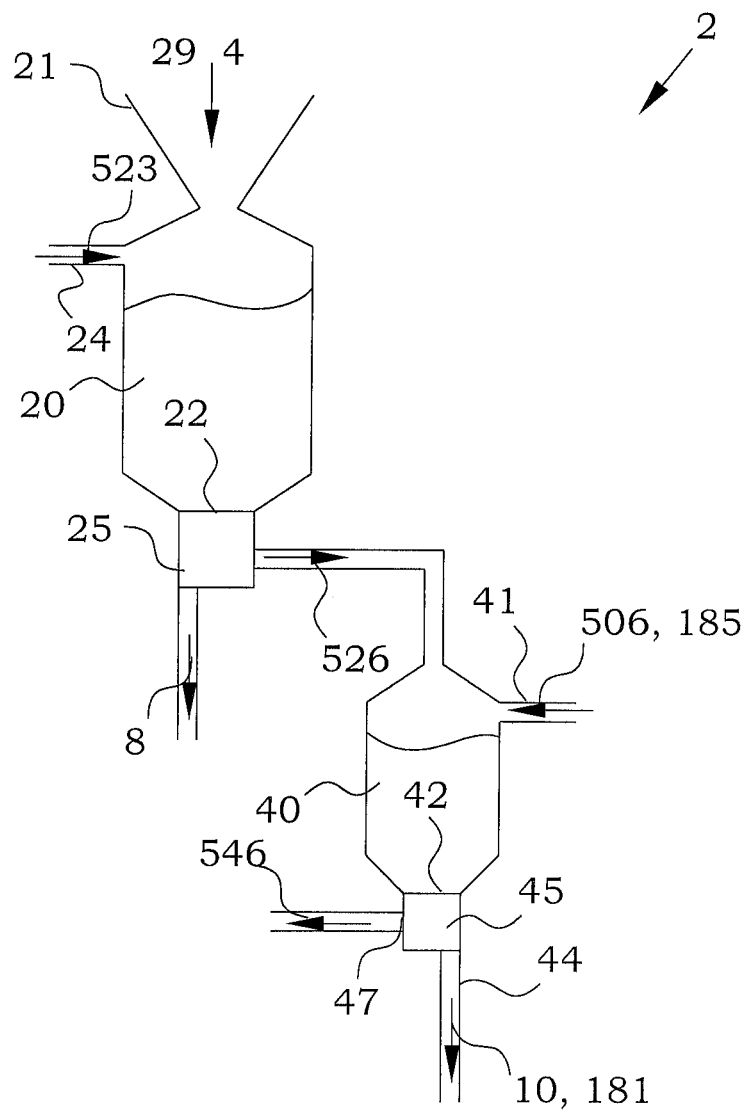
FIG. 35 is a block diagram of an embodiment of a concentrator arrangement.

FIG. 35 illustrates a block scheme of an embodiment of a system for concentration of phosphate compounds that preferably can be used together with the system for recovery of phosphate compounds of FIG. 26. Raw material 4, comprising a sludge ash 29, which in turn comprises phosphorus and iron, is entered into an inlet 21 of an ash leaching reactor 20. The ash leaching reactor 20 has an inlet 24 for dissolving acid, in this case a liquid comprising mineral acid 523. The ash leaching reactor 20 is arranged for dissolving the raw material 4 in the mineral acid 523. A residue separator 25 is connected to an outlet 22 of the leaching reactor 20. The residue separator 25 is arranged for separating insoluble residues 8 from the ash leaching reactor 20. A primary leach solution 526 is thereby formed.

A base mixing arrangement 40 is connected after an outlet from the residue separator 25. The base mixing arrangement 40 is arranged for adding a base, comprising at least iron hydroxide 506, to the primary leach solution 526 through an inlet 41. The iron hydroxide is preferably at least to a part the iron hydroxide 185 of FIG. 26. The addition of the iron hydroxide 506 causes precipitation of phosphate compounds comprising iron from the primary leach solution within the base mixing arrangement 40. A phosphate separator 45 is connected to an outlet 42 of the base mixing arrangement 40. The phosphate separator 45 is arranged for removing the precipitated phosphate compounds 10 from the primary leach solution through a precipitated phosphate compound outlet 44. The precipitated phosphate compound is preferably used at least to a part as the phosphate compounds 181 of FIG. 26. The remaining primary leach solution 546 exits through an outlet 47.

It is, of course, clear that other combinations of using by-products from the recoverer as raw materials for use in the concentrator are possible. For example, produced aluminium hydroxide 197 in the recoverer can be used as both the source of aluminium ions and base in the concentrator according to the principles described before. Another example is use of by-product calcium carbonate 178 from the recoverer as a raw material for neutralizing acid in the concentrator and at the same time generating carbon dioxide gas 195 which can be used as a raw material for aluminium precipitation in the recoverer as described before.

In addition, different combinations of operating the recoverer with acid and alkali according to the described principles are possible. According to one embodiment, an intermediate precipitate can first be processed with a liquid-liquid extraction of iron and then precipitation of a phosphorus precipitate 181 and subsequent dissolution in alkali. In such an embodiment, the arrangement 180 for recovery of iron, phosphorus and aluminium can be used as the phosphorus recovery section 140 (FIG. 14).

Figure 28:
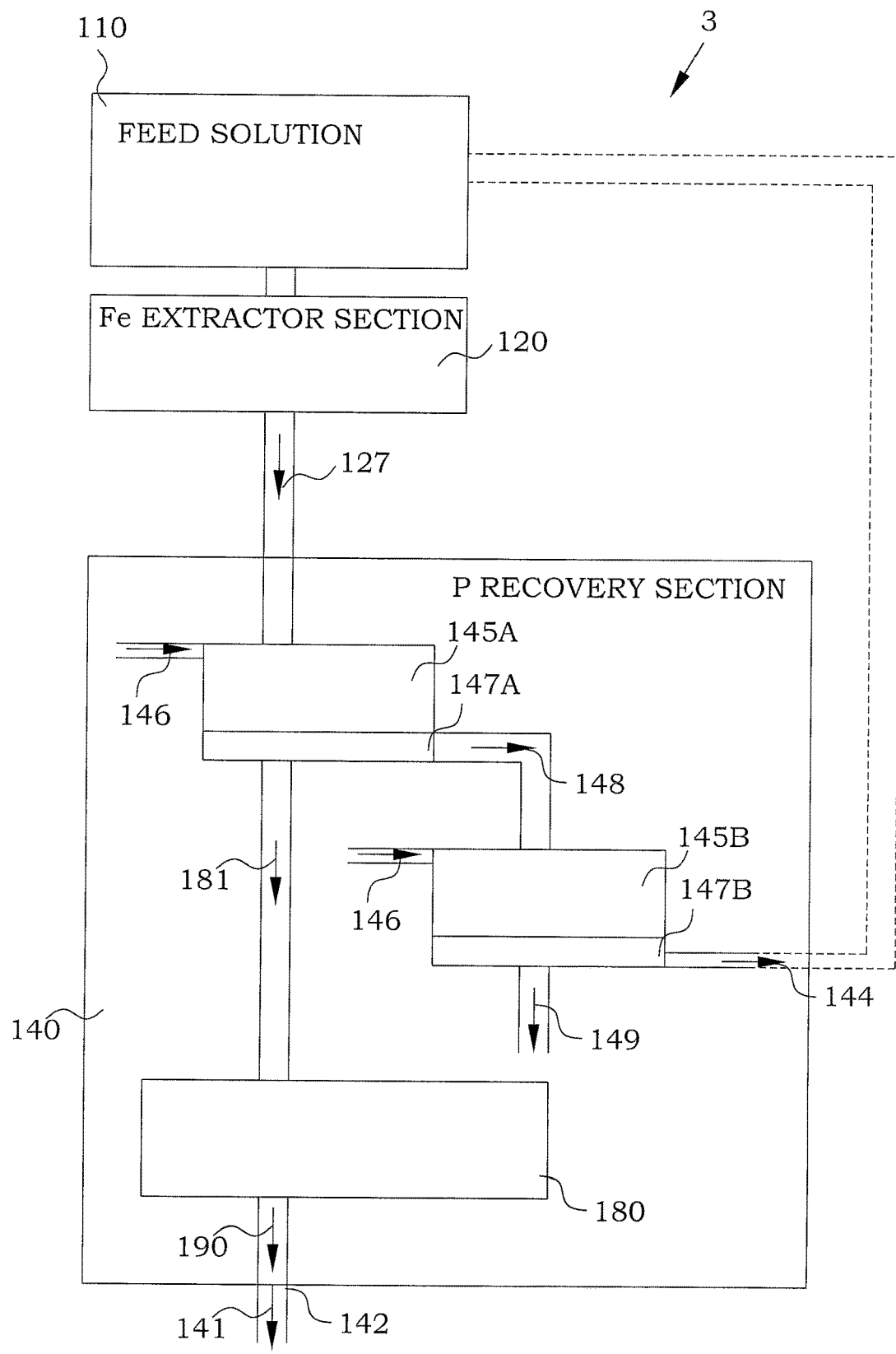
FIG. 28 is a block scheme of an embodiment of a recoverer arrangement.

FIG. 28 illustrates schematically a block diagram of an embodiment of a recoverer 3 based on such ideas. The provision of the feed solution and the iron extractor section 120 are operated in similar ways as described before and will not be described again. A feed solution 127 at least partially depleted in iron is thereby provided from the iron extractor section 120. The feed solution 127, or raffinate, is composed of mainly phosphorus, aluminium and calcium as chlorides.

The feed solution 127 is provided to a mixing volume 145A of the phosphorous recovery section 140. Lime 146 is added to the raffinate or feed solution 127 to adjust the pH, preferably to a level of between 1.5 and 4, more preferably between pH 2 and pH 3. Aluminium and iron (if there are any remaining amounts present) precipitates in form of mainly aluminium phosphate 181 which is removed from the remaining solution 148 with a suitable solid/liquid separator 147A, e.g. a filter.

After removal of aluminium phosphate 181, more lime is added to the solution, in a mixing volume 145B, to adjust the pH further to a level of between pH 4 and pH 7, preferably between pH 4 and pH 5. This increase in pH results in the precipitation of calcium phosphate 149 which is removed from the solution with a suitable solid/liquid separator 147B, e.g. a filter.

The mixing volumes 145A and 145B as well as the solid/liquid separators 147A and 147B can be provided as separate physical units. In alternative embodiments, the mixing volumes 145A and 145B and/or the solid/liquid separators 147A and 147B can be combined into one and the same unit, where the mixing and separating operations are performed separated in time.

The calcium phosphate 149 can be used as feed phosphate or for fertilizer production.

The solution after precipitation of calcium phosphate is composed of mainly calcium chloride and can be recycled as a calcium chloride source 144 to e.g. a dissolution reactor of the arrangement 110 for providing a feed solution.

Build-up of calcium in the circulating solution is controlled by a bleed composed of mainly calcium chloride, according to the ideas presented in connection with FIG. 25. The calcium in the bleed is then precipitated as gypsum by addition of sulphuric acid. Alternatively calcium content can be controlled by addition of sulphuric acid directly to the calcium chloride solution.

The aluminium phosphate precipitate 181 is fed to the arrangement 180 for recovery of phosphorus and aluminium and possibly iron. The processes within the arrangement 180 follows the same principles as discussed above.

An embodiment of a method corresponding to the above discussed ideas can be considered as the method according to FIG. 27 as step 280 of FIG. 13, with a few additional steps. These steps are illustrated in FIG. 29. The feed solution is assumed to comprise aluminium. The part process is then intended to continue on step 270. In step 330, a base is added to the iron depleted feed solution to obtain a pH >1.5, preferably between 2 and 3. Such addition causes aluminium phosphate to precipitate. In step 332, the precipitated aluminium phosphate is separated from the iron depleted solution, producing an aluminium and iron depleted feed solution. The part process is then intended to continue with step 302 (FIG. 27). Preferably, the method also comprises a step 334, in which lime is added to the aluminium and iron depleted feed solution to obtain a pH between 4 and 5. This causes calcium phosphate to precipitate. In step 336, the precipitated calcium phosphate is separated from the aluminium and iron depleted feed solution. The part process is then intended to continue with step 260 and/or 294 (FIGS. 13, 25).

In an alternative embodiment the precipitation of phosphorus with lime, described here above, can be exchanged for extraction with tributyl phosphate according to earlier embodiments.

One of the advantageous aspects of the general process disclosed here is that the process can be divided into two parts (as illustrated by FIG. 1). The two parts of the process can, if requested, be operated independent of each other, and even at different locations. For example, the first part of the process which is based on only chemical precipitation and filtration can be located near sources of sludge ash while the concentrated phosphorus precipitate can be transported to a different location for further processing. In that manner, a single plant for processing iron/aluminium phosphate can receive raw material (intermediate precipitates) from several smaller plants for sludge ash processing. In that way, transportation costs can be reduced due to transport of an intermediate precipitate with a higher phosphorus content compared to ash.

Figure 30:
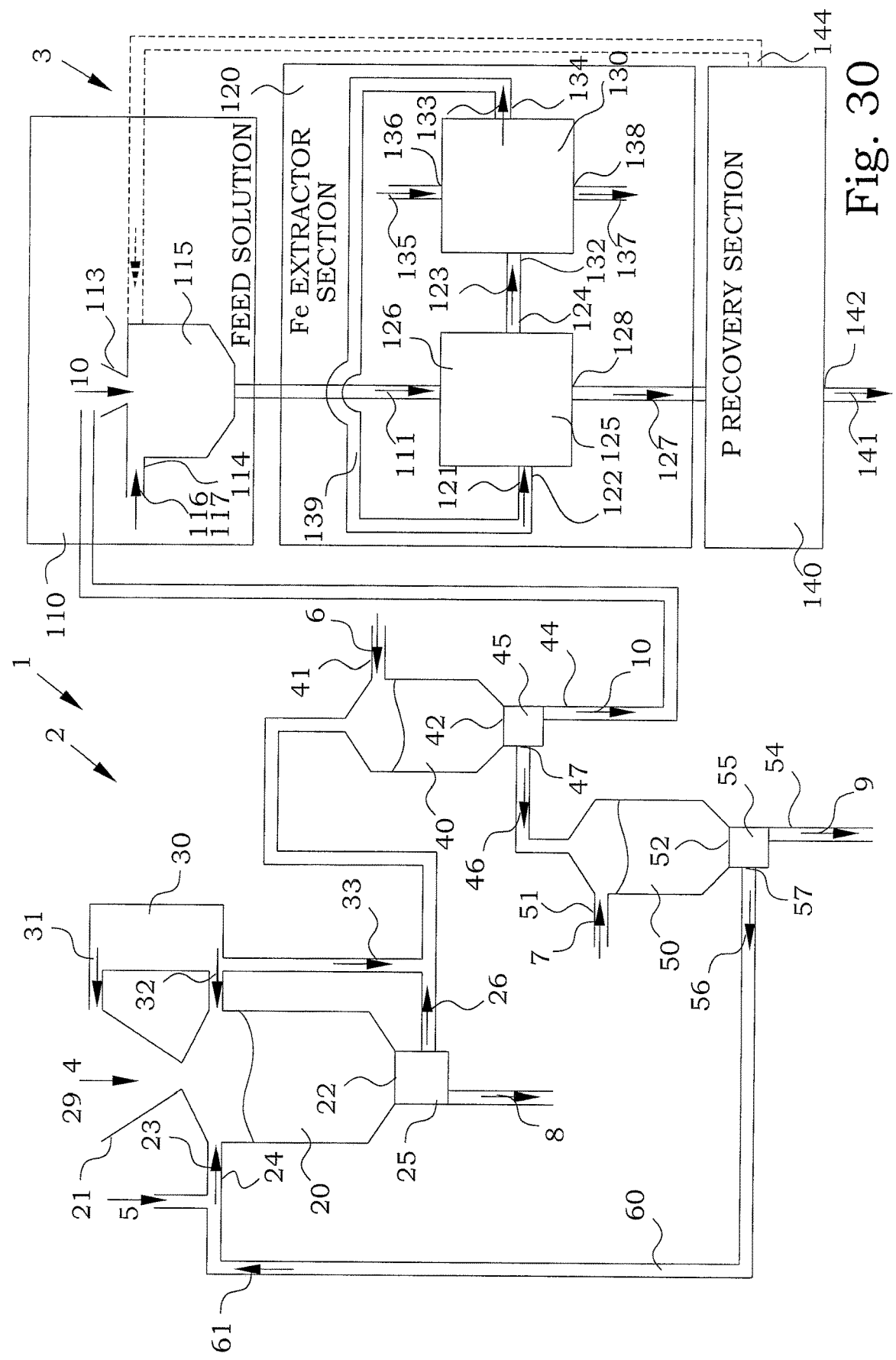
FIG. 30 is a block scheme of an embodiment of a system for the production of phosphate compounds.

However, the two "parts" can also be provided together. In FIG. 30, an embodiment of a system 1 for the production of phosphate compounds is illustrated. An ash leaching reactor 20 is arranged for dissolving a raw material 4 comprising sludge ash 29 in hydrochloric acid 23. The sludge ash 29 comprises phosphorus and at least one of iron and aluminium. A residue separator 25 is connected to an outlet 22 of the leaching reactor 20. The residue separator 25 is arranged for separating insoluble residues 8 from the ash leaching reactor 20, thereby forming a first leach solution 26. The first leach solution 26 has a mole ratio of phosphorus to a sum of ferric iron and aluminium. The system comprises means 30 for controlling the mole ratio to be larger than 1. A base mixing arrangement 40 is connected after an outlet from the residue separator 25. The base mixing arrangement 40 is arranged for adding a base 6 to the first leach solution. This causes precipitation of phosphate compounds 10 comprising iron and/or aluminium from the first leach solution 26. A phosphate separator 45 is connected to an outlet 42 of the base mixing arrangement 40. The phosphate separator 45 is arranged for removing the precipitated phosphate compounds 10 from the first leach solution 46. A sulphur mixing arrangement 50 is connected after an outlet 47 for the first leach solution 46 from the phosphate separator 45. The sulphur mixing arrangement 50 is arranged for adding sulphuric acid 7 to the first leach solution 46, causing precipitation of sulphate compounds 9. A sulphate separator 55 is connected to an outlet 52 of the sulphur mixing arrangement 50. The sulphate separator 55 is arranged for separating the precipitated sulphate compounds 9 from the first leach solution 56. A recycling arrangement 60 is connected between an outlet 57 of the sulphate separator 55 and an inlet 24 to the ash leaching reactor 20. The recycling arrangement 60 is arranged for recycling at least a part of the leach solution 56.

The system further comprises an arrangement 110 for providing a feed solution comprising iron phosphates. The arrangement for providing a feed solution has a phosphate compound leaching reactor 115, connected to an outlet 44 of precipitated phosphate compound 10 of the phosphate separator 45. The phosphate compound leaching reactor 115 is arranged for dissolving the precipitated phosphate compounds 10 into a second leach solution, forming the feed solution 111 comprising iron phosphates. The second leach solution is optionally treated by filtration to remove insoluble matter. An iron extractor section 120 is connected to an outlet from the arrangement 110 for providing a feed solution. The iron extractor section 120 is arranged for extracting iron from the feed solution 111 with a first organic solvent 121 comprising tributyl phosphate, a modifier and a diluent, producing an iron depleted feed solution. The first organic solvent 121 has a first tributyl phosphate content. The iron extractor section 120 is further arranged for stripping the extracted iron from the first organic solvent using water or a dilute acid. The iron extractor section 120 is further arranged for recycling the first organic solvent 133 after the stripping to be used for the extraction of iron. A phosphate recovering section 140 is connected after an outlet for the iron depleted feed solution 127 from the iron extractor section 120. The phosphate recovering section 140 is arranged for recovering the phosphate compounds from the iron depleted feed solution 127.

FIG. 31 illustrates a flow diagram of steps of an embodiment of a method for the production of phosphate compounds. The process starts in step 200. In step 205, a raw material comprising sludge ash is dissolved in hydrochloric acid. The sludge ash comprises phosphorus and at least one of iron and aluminium. In step 210, insoluble residues from the dissolving step are separated, thereby forming a first leach solution. The first leach solution has a mole ratio of phosphorus to a sum of ferric iron and aluminium. The mole ratio is in step 215 controlled to be larger than 1. In step 220, a base is added to the first leach solution, causing precipitation of phosphate compounds from the first leach solution. In step 225, the precipitated phosphate compounds are removed from the first leach solution. Sulphuric acid is in step 240 added to the first leach solution after step 225, causing precipitation of sulphate compounds. In step 245, the precipitated sulphate compounds are separated from said first leach solution. In step 248, at least a part of the leach solution after the step 245 of separating the precipitated sulphate compounds is recycled as the hydrochloric acid in step 205 of dissolving sludge ash.

In step 260 a feed solution is formed. This is performed by step 261 in which the precipitated phosphate compounds are dissolved into a second leach solution. Iron is in step 270 extracted from the feed solution with a first organic solvent comprising tributyl phosphate, a modifier and a diluent, producing an iron depleted feed solution. The first organic solvent has a first tributyl phosphate content. In step 275, the extracted iron is stripped from the first organic solvent using water or a dilute acid. The first organic solvent after the stripping is in step 279 recycled to be used for the step 270 of extracting iron. In step 280, the phosphate compounds are recovered from the iron depleted feed solution.

The detailed embodiments described above are only a few examples of how a method and arrangement for processing ash of incinerated sewage sludge can be arranged. In conclusion, the embodiments described above are to be understood as illustrative examples of the present invention. It will be understood by those skilled in the art that various modifications, combinations and changes may be made to the embodiments without departing from the scope of the present invention. The scope of the present invention is, however, defined by the appended claims.

The invention claimed is:

1. A method for the production of phosphate compounds, comprising the steps of:
    dissolving a raw material comprising sludge ash, comprising phosphorus, aluminium and iron, in a liquid comprising at least mineral acid;
    separating insoluble residues from said dissolving step, thereby forming a primary leach solution;
    adding a base comprising iron hydroxide to said primary leach solution, after said step of separating insoluble residues, causing precipitation of phosphate compounds comprising iron and aluminium from said primary leach solution;
    removing said precipitated phosphate compounds from said primary leach solution;
    dissolving said phosphate compounds by an alkaline solution into a second leach solution;
    filtering iron hydroxide from said second leach solution;
    adding lime into said second leach solution after said step of filtering iron hydroxide, causing precipitation of calcium phosphate;
    separating precipitated calcium phosphate from said second leach solution;
    recycling said second leach solution after said step of separating precipitated calcium phosphate to be used in said step of dissolving phosphate compounds by an alkaline solution.

2. The method according to claim 1, wherein at least a part of said iron hydroxide used in said step of adding a base comprises at least a part of said filtered iron hydroxide obtained in said step of filtering iron hydroxide from said second leach solution.

3. The method according to claim 1, comprising the further steps of:
    adding an acid to at least a deviated part of said second leach solution after said step of separating precipitated calcium phosphate, causing precipitation of aluminium hydroxide; and
    separating said precipitated aluminium hydroxide from said deviated part of said second leach solution.

4. The method according to claim 2, comprising the further steps of:
    adding an acid to at least a deviated part of said second leach solution after said step of separating precipitated calcium phosphate, causing precipitation of aluminium hydroxide; and
    separating said precipitated aluminium hydroxide from said deviated part of said second leach solution.

5. The method according to claim 3, wherein said acid used in said step of adding an acid to said deviated part of said second leach solution comprises carbonic acid or gaseous carbon dioxide, wherein said method comprises the further steps of:
    adding lime to said deviated part of said second leach solution after said step of separating said precipitated aluminium hydroxide, causing precipitation of calcium carbonate;
    separating said precipitated calcium carbonate from said deviated part of said second leach solution; and
    recycling said deviated part of said second leach solution after said separating of said precipitated calcium carbonate to be used in said step of dissolving phosphate compounds by an alkaline solution.

6. The method according to claim 4, wherein said acid used in said step of adding an acid to said deviated part of said second leach solution comprises carbonic acid or gaseous carbon dioxide, wherein said method comprises the further steps of:
    adding lime to said deviated part of said second leach solution after said step of separating said precipitated aluminium hydroxide, causing precipitation of calcium carbonate;
    separating said precipitated calcium carbonate from said deviated part of said second leach solution; and
    recycling said deviated part of said second leach solution after said separating of said precipitated calcium carbonate to be used in said step of dissolving phosphate compounds by an alkaline solution.

* * * * *

UNITED STATES PATENT AND TRADEMARK OFFICE
CERTIFICATE OF CORRECTION

PATENT NO. : 10,745,279 B2  
APPLICATION NO. : 16/017839  
DATED : August 18, 2020  
INVENTOR(S) : Yariv Cohen et al.

Page 1 of 1

It is certified that error appears in the above-identified patent and that said Letters Patent is hereby corrected as shown below:

On the Title Page

Item (30), change "1350538" to --1350538-3--.

Signed and Sealed this
Twentieth Day of October, 2020

Andrei Iancu
*Director of the United States Patent and Trademark Office*